United States Patent
Pederson

(10) Patent No.: US 9,414,458 B2
(45) Date of Patent: *Aug. 9, 2016

(54) LED LIGHT CONTROL ASSEMBLY AND SYSTEM

(71) Applicant: Federal Law Enforcement Development Services, Inc., St. Cloud, MN (US)

(72) Inventor: John C. Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,518

(22) Filed: Jan. 15, 2015

(65) Prior Publication Data

US 2015/0163881 A1 Jun. 11, 2015

Related U.S. Application Data

(63) Continuation-in-part of application No. 14/208,125, filed on Mar. 13, 2014, now Pat. No. 9,258,864, and a continuation-in-part of application No. 13/427,358, filed on Mar. 22, 2012, now Pat. No. 8,744,267, which (Continued)

(51) Int. Cl.
*H04B 10/00* (2013.01)
*H05B 33/08* (2006.01)
(Continued)

(52) U.S. Cl.
CPC .......... *H05B 33/0869* (2013.01); *H04B 10/116* (2013.01); *H04B 10/1143* (2013.01); *H04B 10/1149* (2013.01); *H05B 33/0845* (2013.01); *H05B 33/0863* (2013.01)

(58) Field of Classification Search
CPC ............. H04B 10/114; H04B 10/1141; H04B 10/1143; H04B 10/1149; H04B 10/116; H04B 10/80; H04B 10/803; H04B 10/801; H04B 10/808

See application file for complete search history.

(56) References Cited

U.S. PATENT DOCUMENTS

| 700,678 A | 5/1902 | Downie |
| 2,082,279 A | 6/1937 | Fore |

(Continued)

FOREIGN PATENT DOCUMENTS

| AU | 2006201345 | 10/2007 |
| AU | 2007202909 | 2/2008 |

(Continued)

OTHER PUBLICATIONS

Akhavan et al., "High-Speed Power-Efficient Indoor Wireless Infrared Communication Using Code Combining—Part I," IEEE Trnsactions on Communications, vol. 50, No. 7, Jul. 2002, pp. 1098-1109.

(Continued)

*Primary Examiner* — Daniel Dobson
(74) *Attorney, Agent, or Firm* — Vidas, Arrett & Steinkraus, P.A.

(57) ABSTRACT

An LED light and communication system is in communication with a broadband over power line communications system. The LED light and communication system includes at least one optical transceiver light fixture. The optical transceiver light fixture includes a plurality of light emitting diodes, at least one photodetector, and a processor. A facility control unit is in communication with the light emitting diode light fixtures and a control server. The facility control unit is constructed and arranged to control the operation of the optical transceiver light fixtures.

14 Claims, 23 Drawing Sheets

Related U.S. Application Data is a continuation of application No. 12/126,342, filed on May 23, 2008, now abandoned, application No. 14/597,518, filed on Jan. 15, 2015, which is a continuation-in-part of application No. 14/270,670, filed on May 6, 2014.

(60) Provisional application No. 61/927,638, filed on Jan. 15, 2014, provisional application No. 61/778,672, filed on Mar. 13, 2013, provisional application No. 60/931,611, filed on May 24, 2007, provisional application No. 61/819,861, filed on May 6, 2013.

(51) Int. Cl.
*H04B 10/114* (2013.01)
*H04B 10/116* (2013.01)
*H04J 14/00* (2006.01)

(56) References Cited

U.S. PATENT DOCUMENTS

| | | |
|---|---|---|
| 3,469,686 A | 9/1969 | Gutsche et al. |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,099,346 A | 3/1992 | Lee et al. |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,247,380 A | 9/1993 | Lee et al. |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |

(56) References Cited

U.S. PATENT DOCUMENTS

| | | |
|---|---|---|
| 5,566,022 A | 10/1996 | Segev |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,783,909 A | 7/1998 | Hochstein |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A | 11/1998 | Katyl |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,188,738 B1 | 2/2001 | Sakamoto |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,815 B1 | 8/2001 | Yang |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 | 7/2002 | Leeb |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,504,646 B1 | 1/2003 | Amoruso |

(56) References Cited

U.S. PATENT DOCUMENTS

| | | |
|---|---|---|
| 6,532,212 B1 | 3/2003 | Soloway |
| 6,547,410 B1 | 4/2003 | Pederson |
| 6,548,967 B1 | 4/2003 | Dowling |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,023,469 B1 | 4/2006 | Olson |
| 7,046,160 B2 | 5/2006 | Pederson |
| 7,102,665 B1 | 9/2006 | Chandler |
| 7,103,614 B1 | 9/2006 | Kucik |
| 7,183,895 B2 | 2/2007 | Bazakos |
| 7,230,884 B2 | 6/2007 | Shemesh |
| 7,289,731 B2 | 10/2007 | Thinguldstad |
| 7,309,965 B2 | 12/2007 | Dowling |
| 7,321,757 B2 | 1/2008 | Yamashita |
| 7,323,991 B1 | 1/2008 | Eckert |
| 7,324,757 B2 | 1/2008 | Wilson |
| 7,352,972 B2 | 4/2008 | Franklin |
| 7,439,847 B2 | 10/2008 | Pederson |
| 7,439,874 B2 | 10/2008 | Sotiriou |
| 7,529,488 B2 | 5/2009 | Burdick |
| 7,548,698 B2 | 6/2009 | Yamamoto |
| 7,557,521 B2 | 7/2009 | Lys |
| 7,583,901 B2 | 9/2009 | Nakagawa |
| 7,689,130 B2 | 3/2010 | Ashdown |
| 7,912,377 B2 | 3/2011 | Koga |
| 7,940,191 B2 | 5/2011 | Hierzer |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2 | 6/2012 | Roberge |
| 8,421,588 B1* | 4/2013 | Ross ................... G08C 17/02 340/5.1 |
| 8,538,692 B2 | 9/2013 | Wurman |
| 8,571,411 B2 | 10/2013 | Pederson |
| 8,593,299 B2 | 11/2013 | Pederson |
| 8,687,965 B2 | 4/2014 | Pederson |
| 8,729,833 B2 | 5/2014 | Chemel |
| 8,744,267 B2 | 6/2014 | Pederson |
| 8,886,045 B2 | 11/2014 | Pederson |
| 8,890,773 B1 | 11/2014 | Pederson |
| 8,891,962 B2 | 11/2014 | Du et al. |
| 8,902,076 B2 | 12/2014 | Pederson |
| 2002/0109892 A1 | 8/2002 | Seto |
| 2002/0168958 A1 | 11/2002 | Ford |
| 2002/0181044 A1 | 12/2002 | Kuykendall, Jr. |
| 2003/0025608 A1 | 2/2003 | Pederson |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1 | 12/2003 | Dowling |
| 2004/0028349 A1 | 2/2004 | Nagasaka |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111533 A1 | 5/2005 | Berkman et al. |
| 2005/0111700 A1 | 5/2005 | OBoyle |
| 2005/0169643 A1 | 8/2005 | Franklin |
| 2005/0231128 A1 | 10/2005 | Franklin |
| 2006/0039698 A1 | 2/2006 | Pautler |
| 2006/0056855 A1 | 3/2006 | Nakagawa |
| 2006/0132382 A1 | 6/2006 | Jannard |
| 2006/0149813 A1 | 7/2006 | Janik |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0253598 A1 | 11/2006 | Nakamura et al. |
| 2006/0275040 A1 | 12/2006 | Franklin |
| 2007/0041732 A1 | 2/2007 | Oki |
| 2007/0104239 A1 | 5/2007 | Koga |
| 2007/0110446 A1 | 5/2007 | Hong |
| 2007/0145915 A1 | 6/2007 | Roberge |
| 2007/0147843 A1 | 6/2007 | Fujiwara |
| 2007/0160373 A1 | 7/2007 | Biegelsen |
| 2007/0165244 A1 | 7/2007 | Yukhin |
| 2007/0195263 A1 | 8/2007 | Shimizu |
| 2007/0269219 A1 | 11/2007 | Teller |
| 2007/0285026 A1 | 12/2007 | Johler et al. |
| 2007/0294029 A1 | 12/2007 | DAndrea |
| 2008/0044188 A1 | 2/2008 | Kagawa |
| 2008/0063404 A1 | 3/2008 | Broyde |
| 2008/0138077 A1 | 6/2008 | Stretton |
| 2008/0154101 A1 | 6/2008 | Jain |
| 2008/0170536 A1 | 7/2008 | Marshack |
| 2008/0227463 A1 | 9/2008 | Hizume |
| 2008/0292320 A1* | 11/2008 | Pederson ........... H04B 10/1143 398/128 |
| 2009/0002265 A1 | 1/2009 | Kitaoka |
| 2009/0102396 A1 | 4/2009 | Petrucci |
| 2009/0129782 A1 | 5/2009 | Pederson |
| 2009/0157545 A1 | 6/2009 | Mobley |
| 2009/0262760 A1 | 10/2009 | Krupkin |
| 2009/0315481 A1 | 12/2009 | Zhao |
| 2009/0315485 A1 | 12/2009 | Verfuerth |
| 2010/0111538 A1 | 5/2010 | Arita |
| 2010/0209105 A1 | 8/2010 | Shin |
| 2011/0006898 A1 | 1/2011 | Kruest |
| 2011/0305460 A1 | 12/2011 | Snyder |
| 2012/0202520 A1 | 8/2012 | George |
| 2012/0230696 A1 | 9/2012 | Pederson |
| 2013/0221848 A1 | 8/2013 | Miesak |
| 2014/0153923 A1 | 6/2014 | Casaccia |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1205763 | 5/2002 |
| EP | 1564914 | 8/2005 |
| FR | 2658024 | 8/1991 |

(56) References Cited

FOREIGN PATENT DOCUMENTS

| | | |
|---|---|---|
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |
| JP | 06333403 | 12/1994 |
| JP | 8002341 | 1/1996 |
| JP | 08002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |
| WO | 02073836 | 9/2002 |
| WO | 2007003037 | 11/2007 |

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Jeffrey B. Carruthers, "Wireless Infrared Communications," Wiley Encyclopedia of Telecommunications, 2002.

Kahn et al., "Wireless Infrared Communications," Proceedings of the IEEE, vol. 85, No. 2, Feb. 1997, pp. 265-298.

Komine T. et al., "Integrated System of White LED Visible-Light Communicaiton and Power-Line Communication," Sep. 15, 2002-Sep. 18, 2002, vol. 4, Sep. 15, 2002, pp. 1762-1766.

Pacific Northwest National Laboratory: Demonstration Assement of Light-Emitting Diode (LED) Parking Lot Lighting, Phase 1, Jun. 2010, pp. 1-37.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date 1, Feb. 2003 pp. 71-79.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

* cited by examiner

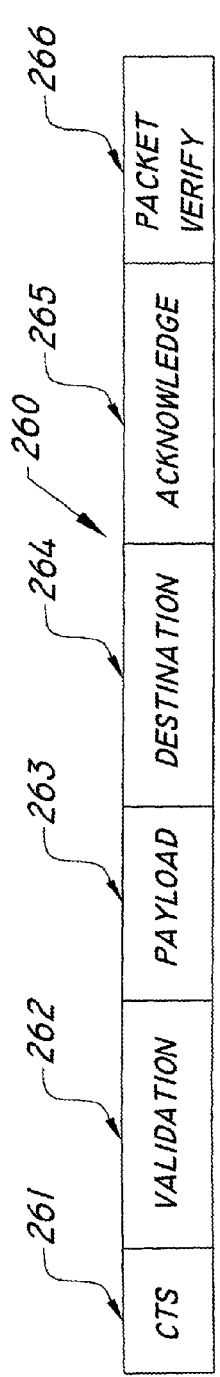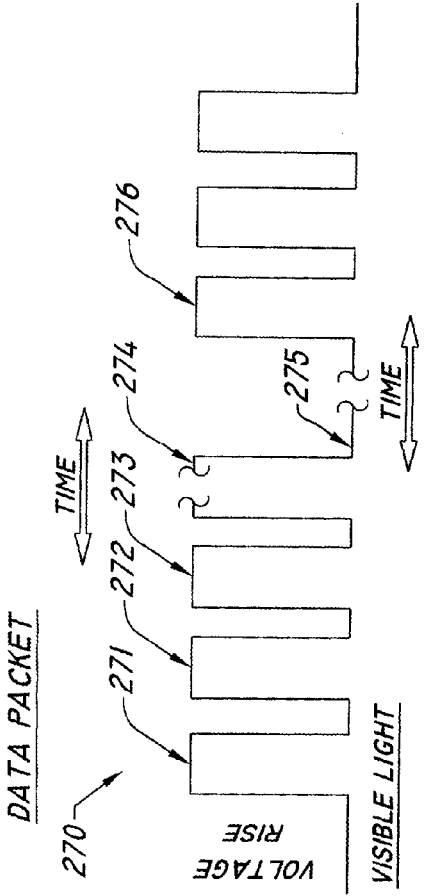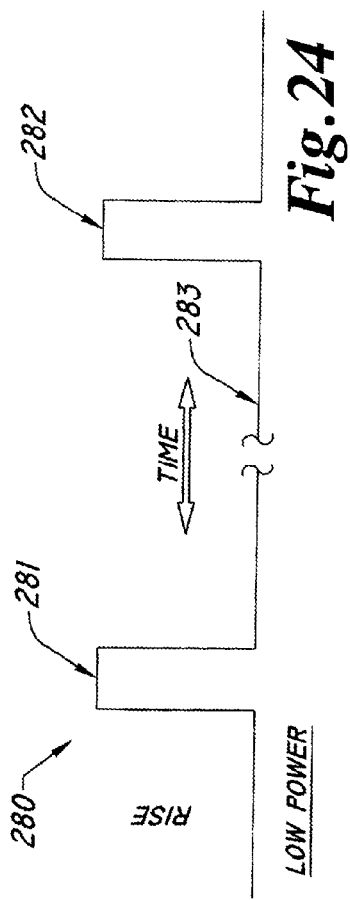

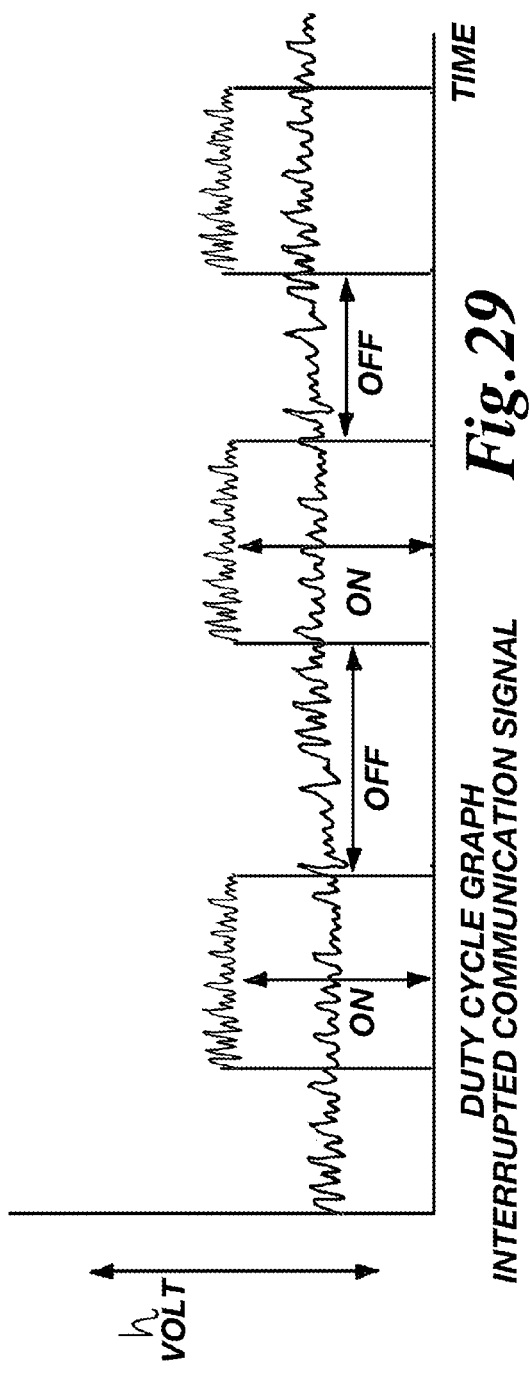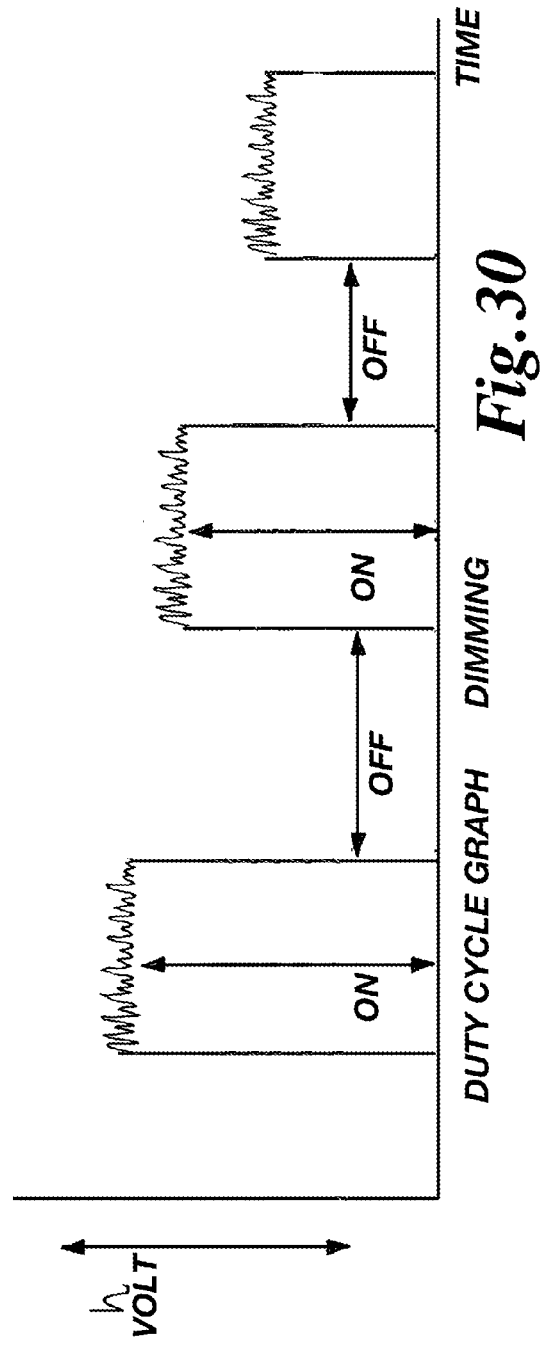

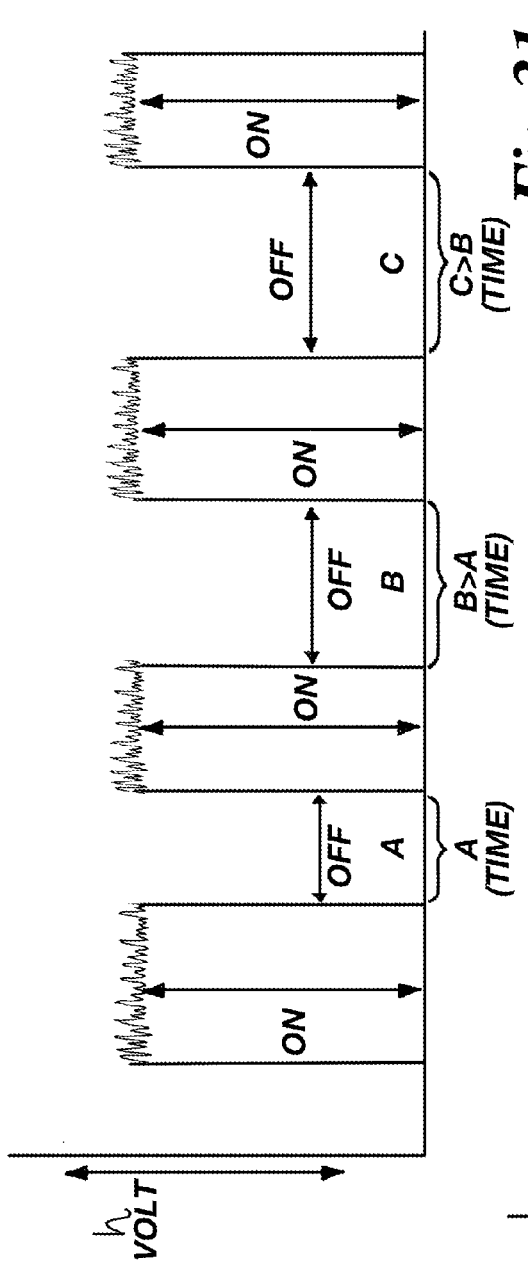
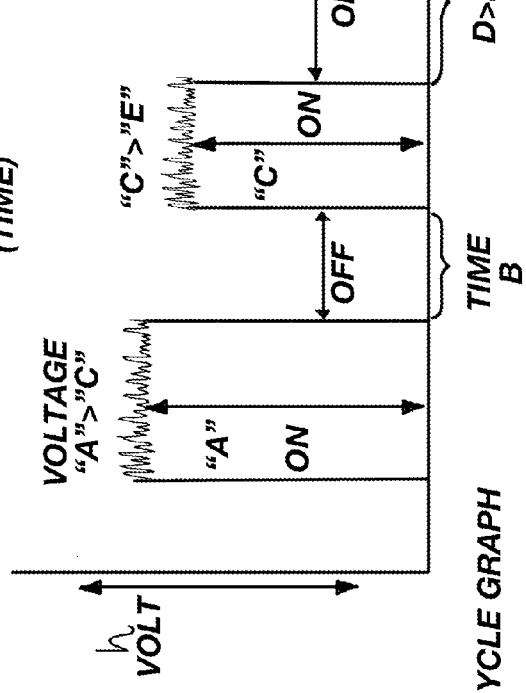

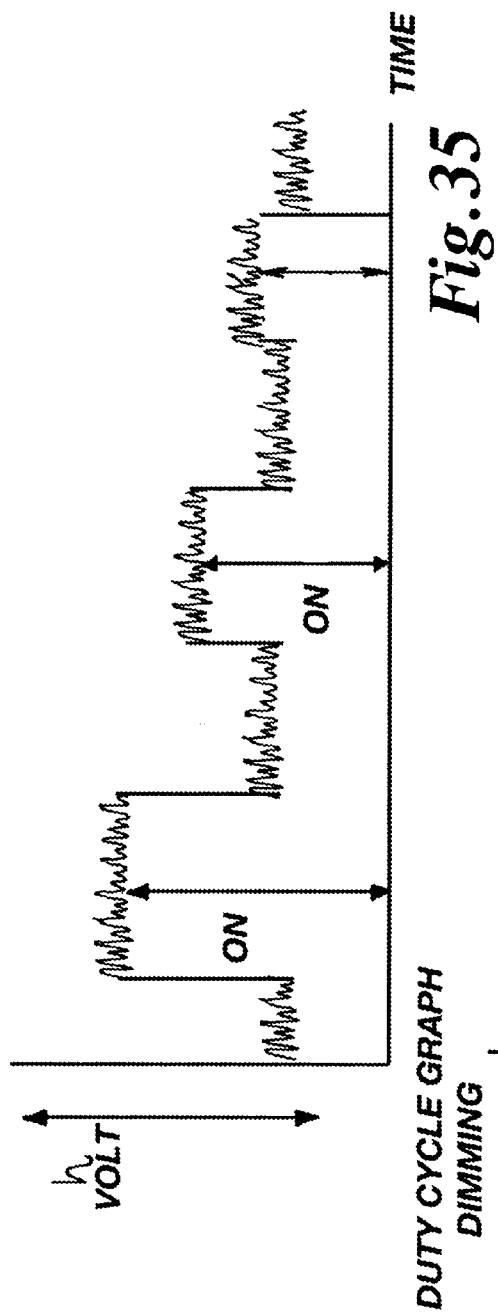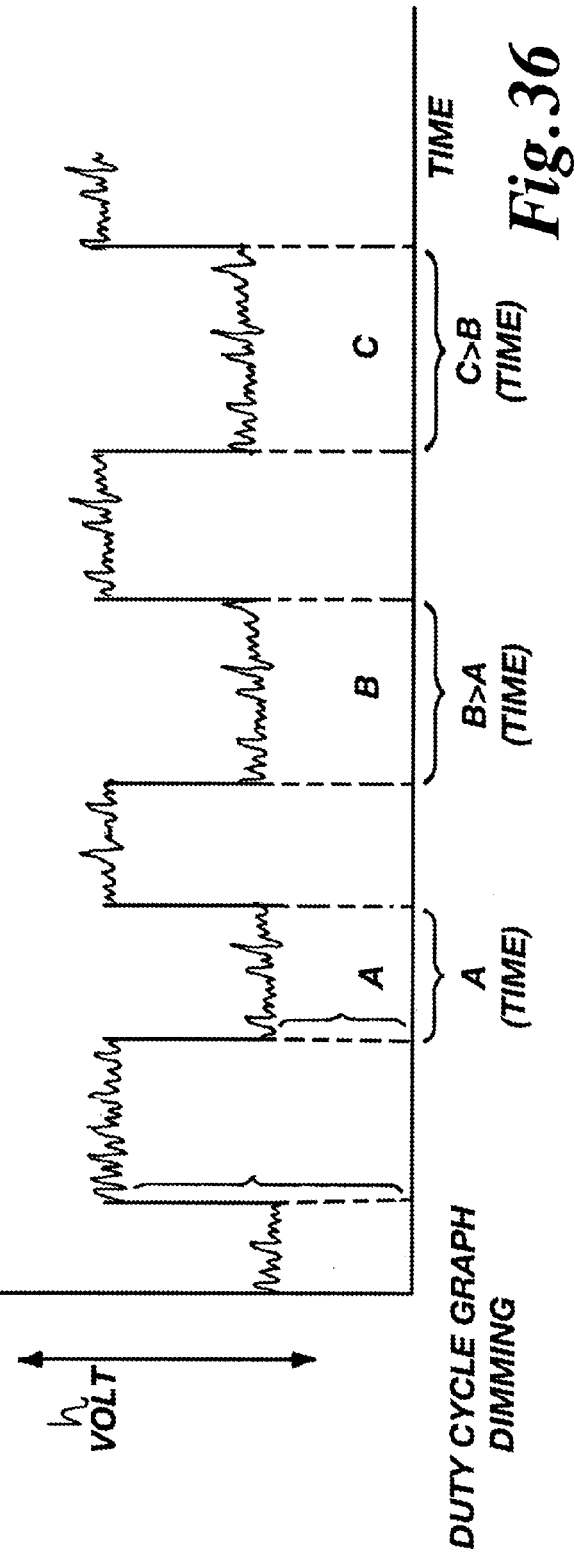

LED LIGHT CONTROL ASSEMBLY AND SYSTEM

CROSS-REFERENCE TO RELATED APPLICATIONS

This application claims priority to Provisional Application No. 61/927,638, filed Jan. 15, 2014, the disclosure of which is expressly incorporated herein by reference.

This application is also a continuation-in-part of U.S. patent application Ser. No. 14/208,125 filed on Mar. 13, 2014 which claims benefit of 61/778,672, filed Mar. 13, 2013. This application is also a continuation-in-part of U.S. patent application Ser. No. 13/427,358, filed Mar. 22, 2012, now U.S. Pat. No. 8,744,267 which is a continuation of U.S. patent application Ser. No. 12/126,342 filed May 23, 2008 now abandoned which claimed priority to U.S. Provisional Patent Application Ser. No. 60/931,611 filed May 24, 2007 the disclosures all of which are expressly incorporated by reference herein in their entireties.

This application is a continuation-in-part of U.S. patent application Ser. No. 14/270,670 filed May 6, 2014 which claims benefit of 61/819,861 filed May 6, 2013, the disclosures all of which are incorporated by reference herein in their entireties.

FIELD OF THE INVENTION

In some embodiments, the present invention is generally directed to light emitting diodes (LEDs) and applications thereof. In particular, some embodiments of the present invention are directed to using LEDs to provide illumination as well as internet access and communication capability to individuals and businesses.

BACKGROUND OF THE INVENTION

Light transmissions used for communication are extremely secure due to the fact that the light transmission is focused within a narrow beam, requiring placement of equipment within the beam itself to establish a communication link. Also, because light transmissions in the visible spectrum are not regulated by the FCC, light transmissions may be used for communications purposes without the need of a license. Light transmissions are also not susceptible to interference nor do they produce noise that may interfere with other devices.

Light emitting diodes (LEDs) may be used as light sources for data transmission, as described in U.S. Pat. Nos. 6,879,263 and 7,046,160, the entire contents of each being expressly incorporated herein by reference. LED technology provides a practical opportunity to combine lighting and communication. This combination of lighting and communication allows ubiquitous light sources to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated.

Another very important consideration associated with building management is energy management. Energy management is quite challenging to design into a building, because many human variables come into play within different areas within a building structure. Different occupants will have different preferences and habits. One occupant may require full illumination for that occupant to operate efficiently or safely within a space, while a second occupant might only require a small amount or local area of illumination. Further complicating the matter of energy management is the fact that many commercial establishments may experience rates based upon peak usage. A business with a large number of lights that are controlled with a common switch may have peak demands which are large as compared to total consumption of power, simply due to the amount of power that will rush into the circuit. Breaking the circuit into several switches may not adequately address inrush current, since a user may switch more than one switch at a time, such as by sliding a hand across several switches at once. Additionally, during momentary or short-term power outages, the start-up of electrical devices by the power company is known to cause many problems, sometimes harming either customer equipment or power company devices.

Energy management may also include consideration for differences in temperature preferred by different occupants or for different activities. Heating, Ventilation, and Air Conditioning (HVAC) demand or need is dependent not only upon the desired temperature for a particular occupant, but also upon the number of occupants within a relatively limited space With careful facility design, considerable electrical and thermal energy can be saved. Proper management of electrical resources affects every industry, including both tenants and building owners. In many instances facility design has been limited to selection of very simple or basic switches, and thermostats, and particular lights, all fixed at the time of design, construction or installation.

Modern communications systems interconnect various electrical, electromechanical, or electrically controlled apparatuses. These connections may be referred to as connections between client devices and host devices. Host devices are simply parts of a network that serve to host or enable communications between various client devices. Generally speaking, host devices are apparatuses that are dedicated to providing or enabling communications. Peer-to-peer networks may also exist wherein, at any given moment, a device may be either client or host. In such a network, when the device is providing communication, data, information or services, it may be referred to as the host, and when the same device is requesting information, it may be referred to as the client.

Client devices may commonly include computing devices of all sorts, ranging from hand-held devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, smart phones, mobile applications and so forth. Essentially, any device which incorporates or can be made to incorporate sufficient electronic circuitry may be so linked as a client to a host.

Most current communications systems rely upon wires and/or radio waves to link clients and hosts. Existing client devices are frequently designed to connect to host network access points through wired connections, fiber optic connections, or as wireless connections, such as wireless routers or wireless access points.

Buildings frequently incorporate wireless networks which are subject to a number of limitations. One of these is the lack of specific localization of a signal and device. For exemplary purposes, even a weak Radio-Frequency (RF) transceiver, in order to communicate reliably with all devices within a room, will have a signal pattern that will undoubtedly cross into adjacent rooms. When many rooms are to be covered by different transceivers, signal overlap between transceivers requires more complex communications systems, including incorporating techniques such as access control and device selection based upon identification. Radio frequency systems are subject to outside tapping and corruption, since containment of the signal is practically impossible for most buildings.

In addition to data communications, buildings and other spaces may also have a number of needs including, for exemplary illumination, fire and smoke detection, temperature control, and public address to name a few. With regard to illumination, buildings and other spaces are designed with a particular number and placement of particular types of light bulbs. Most designers incorporate incandescent or fluorescent bulbs to provide a desirable illumination within a space. The number and placement of these bulbs is most commonly based upon the intended use of the space.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below. A brief abstract of the technical disclosure in the specification is provided for the purposes of complying with 37 C.F.R. §1.72.

GENERAL DESCRIPTION OF THE INVENTION

A plurality of light supports incorporating light emitting diodes or solitary light emitting diode light sources may be electrically coupled in either a parallel or series manner to a controller. The controller is also preferably in electrical communication with the power supply and the LED's, to regulate or modulate the light intensity for the LED light sources. The individual LED's and/or arrays of LED's may be used for transmission of communication packets of data or information formed of light signals embedded within illumination. The light signals are not observable to the unaided eyes of an individual.

The controller for the LED light support may generate and/or recognize pulsed light signals used to communicate information. The LED light system may also include a receptor or photodiode coupled to the controller, where the receptor or photodiode is constructed and arranged for receipt of pulsed LED light signals for conversion to digital information, and for transfer of the digital information to the controller for analysis and interpretation. The controller may then issue a light signal or other communication signal to communicate the content of received information transmitted via a pulsed LED light carrier.

According to one embodiment of the invention, there is provided an illumination apparatus that is capable of illuminating a space and simultaneously capable of communicating through visible light directly with a number of adjunct devices. In addition to human communications, communications with adjunct devices may effect various convenience, security, energy management and related functions. The illumination apparatus further enables control over intensity, color, and temperature of light without requiring any physical change of the illumination apparatus.

Visible Light Embedded Communication, or VLEC, as disclosed herein is a secure last mile solution to many diverse communications needs. Last mile refers to the final portion of any communications system. It is commonly known that the last mile of most systems is responsible for the vast majority of expense and difficulty in establishing and maintaining a communication system.

Light Emitting Diodes, or LEDs, provide with other apparatus a communications channel while simultaneously affording flexible illumination within a space or building. Using LEDs to provide visible lighting and to embed communications therein enables the present invention to improve security and provide higher communication and/or data transmission capacity as compared to lighting systems as known. The LED link is untethered and enables a communication link with nomadic devices. The link is untethered in that the user is independent of any one host, and may get the same information at other optical hosts locations.

A VLEC system designed in accord with the teachings of the present invention may interface with new or existing building internal electrical wiring. By positioning architectural lighting fixtures that perform dual functions as VLEC and/or server optical transceiver (XCVR) transceivers, a building space may be efficiently illuminated while accomplishing high-speed secure wireless data communication. In some embodiments, a VLEC and an XCVR may be used interchangeably. The LEDs that are incorporated into VLEC transceivers are environmentally friendly and relatively insensitive to atmospheric conditions. A VLEC system has the added benefit of communicating by pulsing the LEDs in such a way as to communicate data at nearly the same rate or capacity, or a faster rate or capacity, as compared to modern fiber optic channels.

Embodiments designed in accord with the teachings of the present invention may be fully integrated into existing networks and infrastructures presently in use. Security and access levels may be controlled on the back end of a network by employing known equipment such as a firewalls, routers and hubs. Embodiments of the present invention are meant to improve and compliment communication areas that fall short in today's existing infrastructure, from full duplex communications of voice to ultra high speed broadband packet data transfers for full motion video, on highly reliable, scalable, stable and fully redundant infrastructures. Most deployments are easily started by taking advantage of existing infrastructures and applying low cost fill-in or gap solutions. Many modulations schemes are available today, such as CDMA, OFDM, TDM, PWM, PPM, PDM, AM, BPSK and specific layers of QAM, to name a few, which may be used in conjunction with the present invention. Low-power BPL/PLC systems may be used to provide high speed digital communications capabilities by coupling RF energy onto the power lines inside a building. In addition, higher speeds than available from existing Access BPL technology may be obtained in the preferred embodiments by encasing the electrical wire in conduit, thereby implementing Shielded BPL (S-BPL) in accord with the present teachings.

In some embodiments, the present invention has the capacity to provide low power communications for energy management, emergency back-up, security and special applications utilizing alternative power sources such as batteries or solar cells.

The present invention also has the ability to provide embedded communications through visible light, whether or not the visible light is at an intensity great enough, or for sufficient duration, to be detected by the human eye.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 22 illustrates by block diagram an alternative embodiment of a data packet in accord with an embodiment of the LED light control assembly and system.

FIG. 23 illustrates a wave form of a visible light emission from an active and visually illuminated LED in accord with an alternative embodiment of the invention.

FIG. 24 illustrates a waveform of an invisible or barely perceptible light emission from an active and dark LED in accord with one alternative embodiment of the invention.

FIG. 29 is an alternative waveform diagram of an alternative duty cycle for the LED light control assembly and system.

FIG. 30 is an alternative waveform diagram of an alternative duty cycle for the LED light control assembly and system.

FIG. 31 is an alternative waveform diagram of an alternative duty cycle for the LED light control assembly and system.

FIG. 32 is an alternative waveform diagram of an alternative duty cycle for the LED light control assembly and system.

FIG. 35 is an alternative waveform diagram of an alternative duty cycle for the LED light control assembly and system.

FIG. 36 is an alternative waveform diagram of an alternative duty cycle for the LED light control assembly and system.

DETAILED DESCRIPTION OF THE PREFERRED EMBODIMENTS

Figure 1:
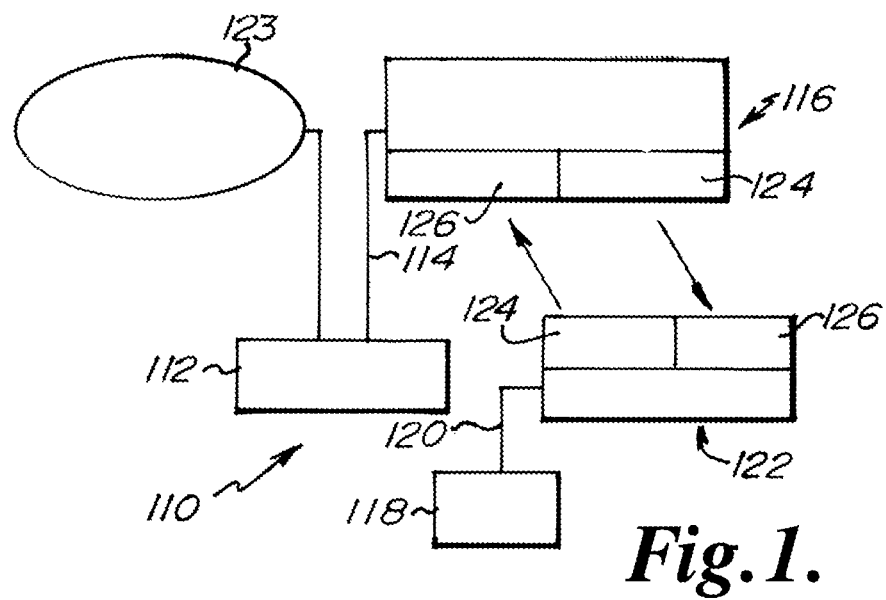
FIG. 1 is a block diagram of one embodiment of LED light control assembly and system.

While this invention may be embodied in many different forms, there are described in detail herein specific alternative embodiments of the invention. This description is an exemplification of the principles of the invention and is not intended to limit the invention to the particular embodiments illustrated. For the purposes of this disclosure, like reference numerals in the figures shall refer to like features unless otherwise indicated.

In each of the embodiments discussed below, the LEDs 124, 2100 may be formed of the same or different colors. The LED's 124, 2100 are in communication with a controller 20 which may be configured to select the color of the LEDs 124, 2100 to be illuminated forming the light signal.

It should be noted that in some embodiments, the LED's 124, 2100 can both emit and receive light. In such an embodiment, the LED's 124, 2100 can act both as a transmitter or receiver. More information on such bi-directional LEDs can be found in U.S. Pat. No. 7,072,587, the entire contents of which are expressly incorporated herein by reference.

In some embodiments, controlling of the relative power applied to each one of the red, green, blue LEDs, 124, 2100 enables different colors of light to be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors.

Through the use of RGB LEDs, the color temperature of an LED light panel or LED light fixture 10 may be adjusted or controlled, and may be varied in real time without making any hardware or apparatus changes. Instead, power applied to the RGB LEDs is adjusted to favor one or another of the RGB LEDs. Since the light emitted from the RGB LEDs is approximately full-spectrum light, the color-rendering index may also be relatively high, particularly when compared to mercury or sodium vapor lamps, making the light feel very natural.

Figure 2:
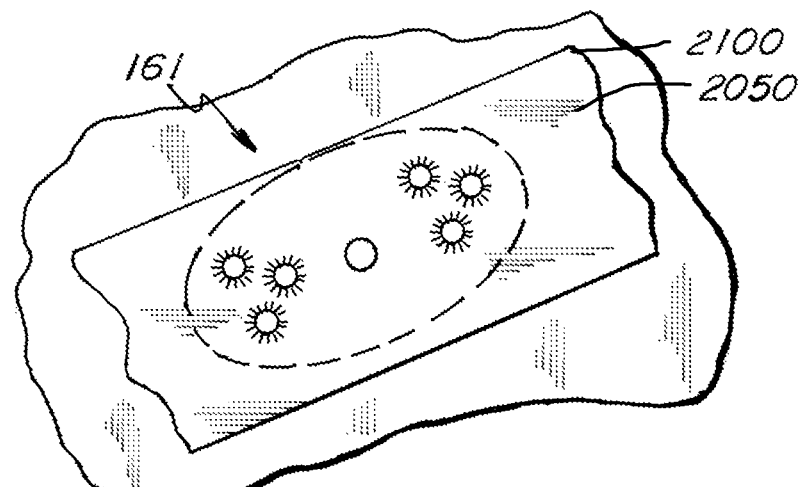
FIG. 2 is a detailed view of an LED light source in any exemplary embodiment of the present invention.

A variety of physical and electrical configurations are contemplated herein for LED light source 161. As illustrated in FIG. 2, light source 161 may replace a standard fluorescent tube light fixture. This can be accomplished by replacing the entire fixture, such that ballasts and other devices specific to fluorescent lighting are replaced.

In one embodiment, line voltage, such as 120 VAC at 60 Hertz as used in the United States, may pass through the electrical connector pins. LED base 2050, in such case, may be designed to insert directly into a standard fluorescent socket, such as, for exemplary purposes only, and not limited thereto, the standard T8 and T12 sockets used in the United States. In such case, either RGB LEDs 2100 are arranged and wired to directly operate from line voltage, or appropriate electronics will need to be provided directly in LED base 2050 to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

For LED light source 161 to replace an existing bulb, regardless of type, and benefit from the many features enabled in the disclosed embodiments, communications circuitry must also be provided. This communications circuitry is necessary to properly illuminate each of the red, green and blue LEDs 2100 to desired color, to transport data through a optical communication channel.

Standard LED lights come in a variety of color temperatures, from 'warm' yellows to 'cool' whites. In facilities such as hospitals and offices, color temperature may significantly affect mood and productivity, where making a long-term commitment to a color temperature when converting to LED lighting may be a strong barrier to entry into LED lighting. In at least one embodiment, the LED's within the VLEC system have adjustable color temperature. In some embodiments, the VLEC LED light fixtures 10 may be programmed to mimic the changing color temperate of sunlight as the day progresses or as the seasons progress throughout the year.

Figure 4:
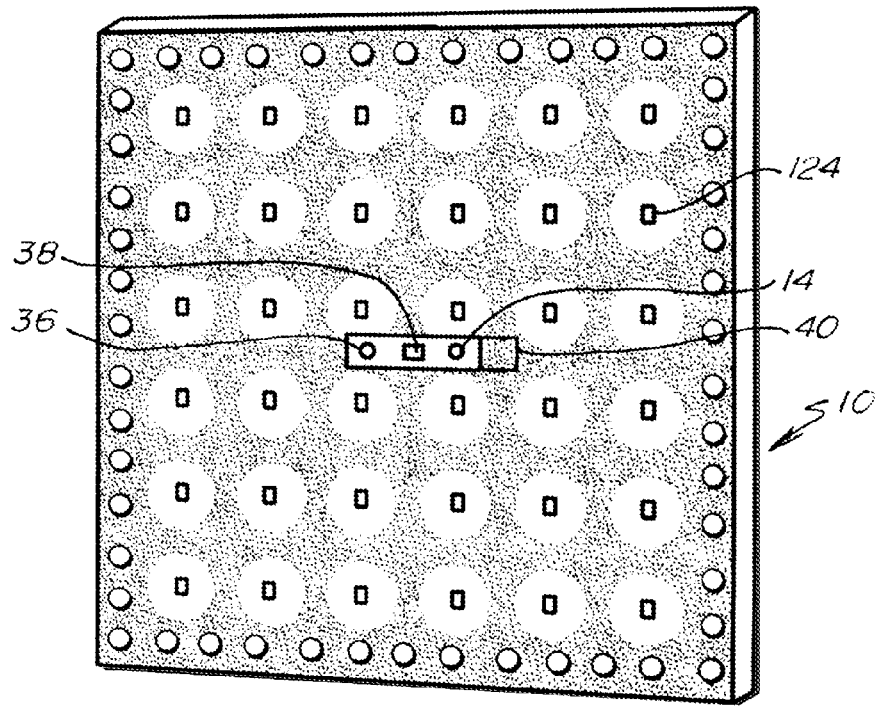
FIG. 4 is a front view of one alternative embodiment of an LED light fixture.

In some embodiments, a variety of physical and electrical configurations are contemplated herein for LED light fixture 10 (FIG. 4). Light fixture 10 may replace a standard fluorescent tube light fixture. The LED light fixture 10 may be wired for any suitable or desired voltage, and where a voltage or current different from standard line voltage is used, transformers or power converters or power supplies may be provided. When a building is either initially being constructed, or so thoroughly remodeled to require replacement of wires, the voltage may be generated in transformers which may be located outside of the occupied space, such as on the roof, in a utility room, basement or attic.

In some embodiments, visible light communication may reduce or eliminate the need for future or additional wiring within an existing or planned facility networks environment. Visible light communication may also augment existing networks.

Figure 3:
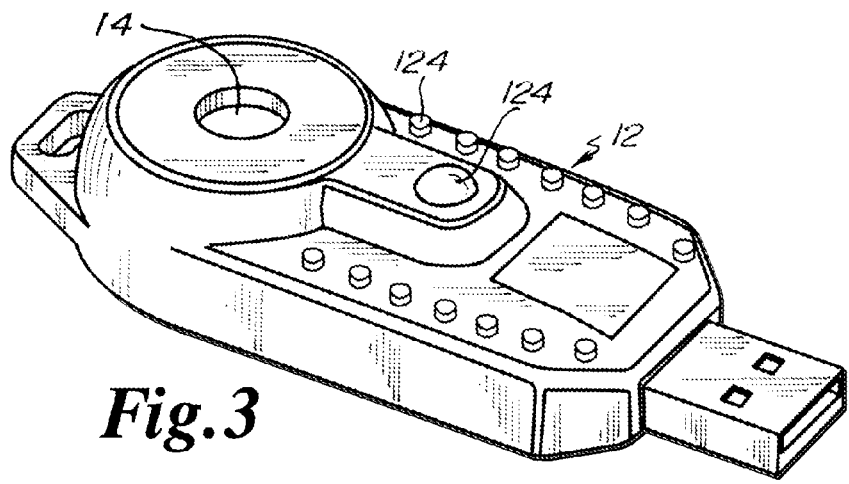
FIG. 3 is an isometric view of one alternative embodiment of a USB dongle or key interface device.
Figure 6:
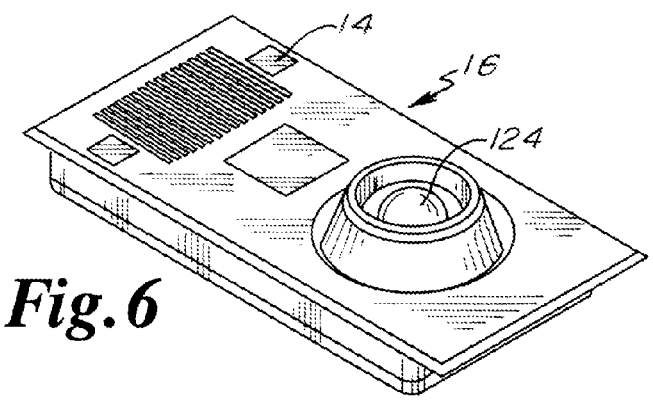
FIG. 6 is an isometric view of one alternative embodiment of a control unit.
Figure 7:
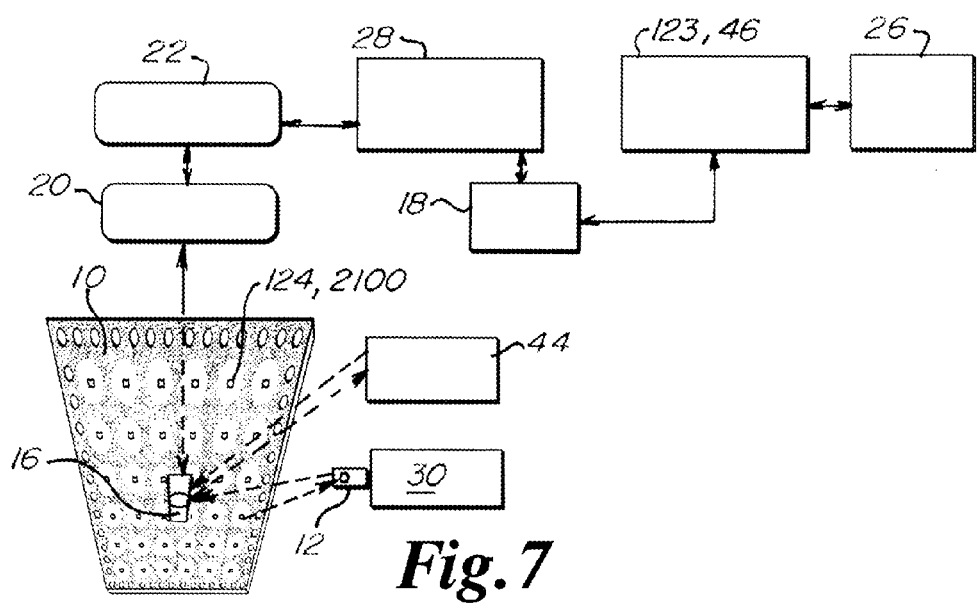
FIG. 7 is a block diagram of an alternative embodiment of the LED light control assembly and system.

In some embodiments, each LED light fixture 10, LED dongle or key device 12 (FIG. 3), and each control unit 16 (FIG. 6) includes processors/controllers 20, LED's 124, and photodetectors 14 to be in communication with a pulsed light communication system. The pulsed light communication system receives pulsed light signals and generates pulsed light signals to communicate information as to the status of a LED light fixture 10, dongle or key 12 or control unit 16. In some embodiments, each control unit 16 of a building system, such as a lighting system, heating system, security system, public address system, monitoring system, metering system, recording system, speaker system, elevator system to name a few, either has an integral LED photodetector 14 and/or controller 20 and LED's 124 for pulsed light communication. Each control unit 16 may be retro-fitted to include an LED communication device such as a dongle or key device 12 to receive pulsed LED light communication signals from an LED light fixture 10, and to generate and communicate LED light signals for receipt by an LED light fixture 10 to provide information in response to a status request.

In some embodiments, each control unit (Charlie unit) 16 may include sensors, meters, controllers/processors 20, photodetectors 14, and LED's 124 to receive and to generate pulsed light communication signals to a facility control unit 18. In some embodiments, each facility control unit 18 may function to be electrically connected to, and in communication with, motors, devices, servo motors, solenoids, or other electronic devices which are used to alter the status of a building system or system element 44 such as a door lock, a thermostat, a light switch, an elevator control, a speaker, a microphone, a monitor to name a few. It should be noted that the identified elements for the control elements, building systems, system elements 44, or other identifiers herein are not intended to be exhaustive, and should be interpreted as expansive and are not intended to be limiting as to the specific elements or types of elements as identified herein.

Figure 5:
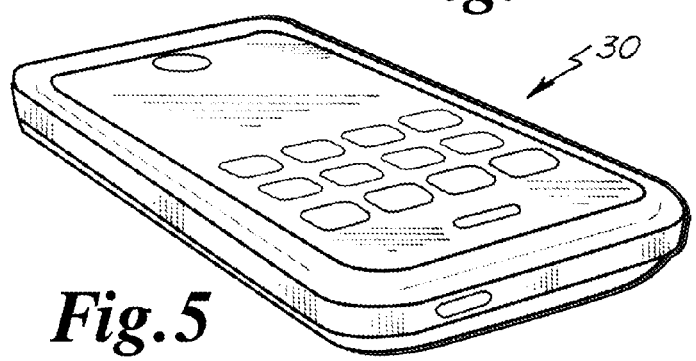
FIG. 5 is an isometric view of one an alternative embodiment of an electronic device.

In some embodiments each of the LED light fixtures 10 may have a controller 20 and photodetector 14 which allows pulsed light communications with a client or electronic device 30 (FIG. 5). The client or electronic device 30, USB interface devices 12, may be attached to laptops or computers. The drivers for those devices may be installed on another type of electronic device 30 such as a tablet, smart phone, computer or other electronic device with or without the use of an application, or laptop or through an Ethernet connection.

In at least one embodiment the LED light fixtures 10 may be connected to a power unit 22 through an Ethernet plug. The Pro FTM signals, called the data, may be communicated over the same lines that are providing power prior to transmission through pulsed light signals. Three modules may be provided which are used in decoding of information and/or communication signals. Decoding is occurring and overriding the power line radio wave signals, the OFTM signals, and is communicated back into an Ethernet standard computer format, which then is communicated through LED pulsed light communication signals.

In some embodiments, modules on the LED light fixture 10 decode pulsed light communications information. In some embodiments, the LED light fixture 10 receives OFTM signals and converts the signals into an Ethernet standard computer format which then may be injected down into a facility control unit 18.

In at least one embodiment each LED light fixture 10 will include one or more cameras 36, speakers 40, or microphones 38 and any combination thereof. In addition, in some embodiments a dongle device 12 will include a camera 36, microphone 38, or a speaker 40 or any combination thereof. In some embodiments, each light fixture control unit 16 or dongle device 12 may include voice activation and/or recognition software, facial recognition software and/or motion sensors or detectors which may be used to active one or more features on an LED light fixture 10, or to an electronic device 30 engaged to a dongle device 12.

In some embodiments an individual may activate and initiate illumination or pulsed light communications by movement proximate to an LED light fixture 10 or dongle device 12. Movement relative to the position of the LED light fixture or dongle device 12, or by speaking to the LED light fixture 10, or by speaking to the dongle device 12 or by facial recognition motion recognition or gesture recognition may either activate or deactivate illumination or pulsed light communication. In some embodiments, the dongle devices 12 and/or the LED light fixture 10 includes cameras in communication with facial recognition software, where illumination or pulsed light communications may be either initiated or terminated by a facial gesture, eye movement, or movement of a head, or entry into a space, shaking of a head, or movement of a hand, arm, or other portion of a body, to name a few examples.

Figure 8:
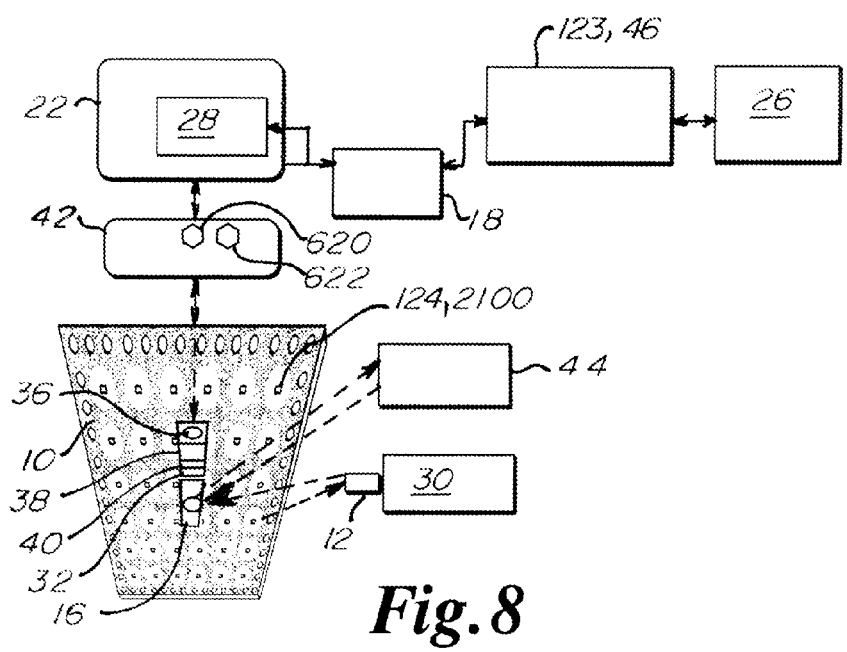
FIG. 8 is a block diagram of an alternative embodiment of the LED light control assembly and system.
Figures 9, 10:
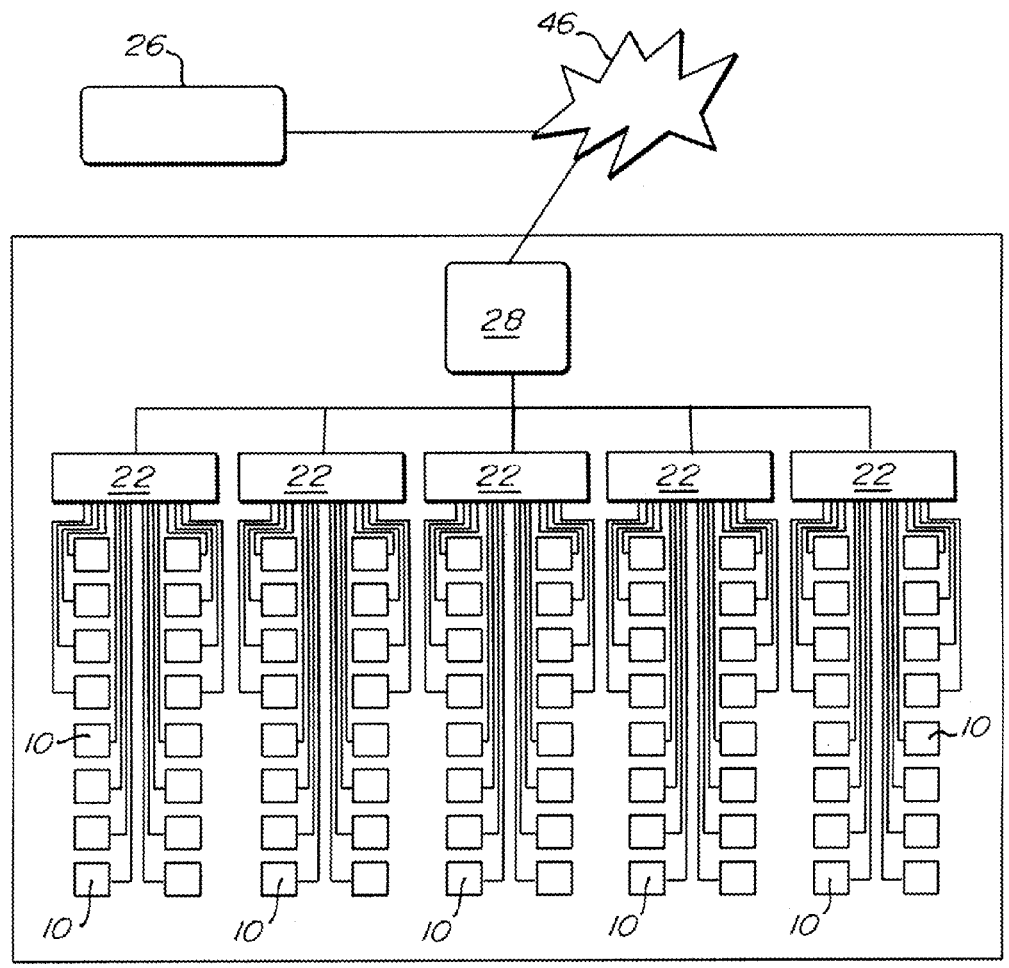
FIG. 9 is a block diagram of an alternative embodiment of an identifier.
FIG. 10 is a block diagram of one alternative embodiment of the LED light control assembly and system.
Figure 11:
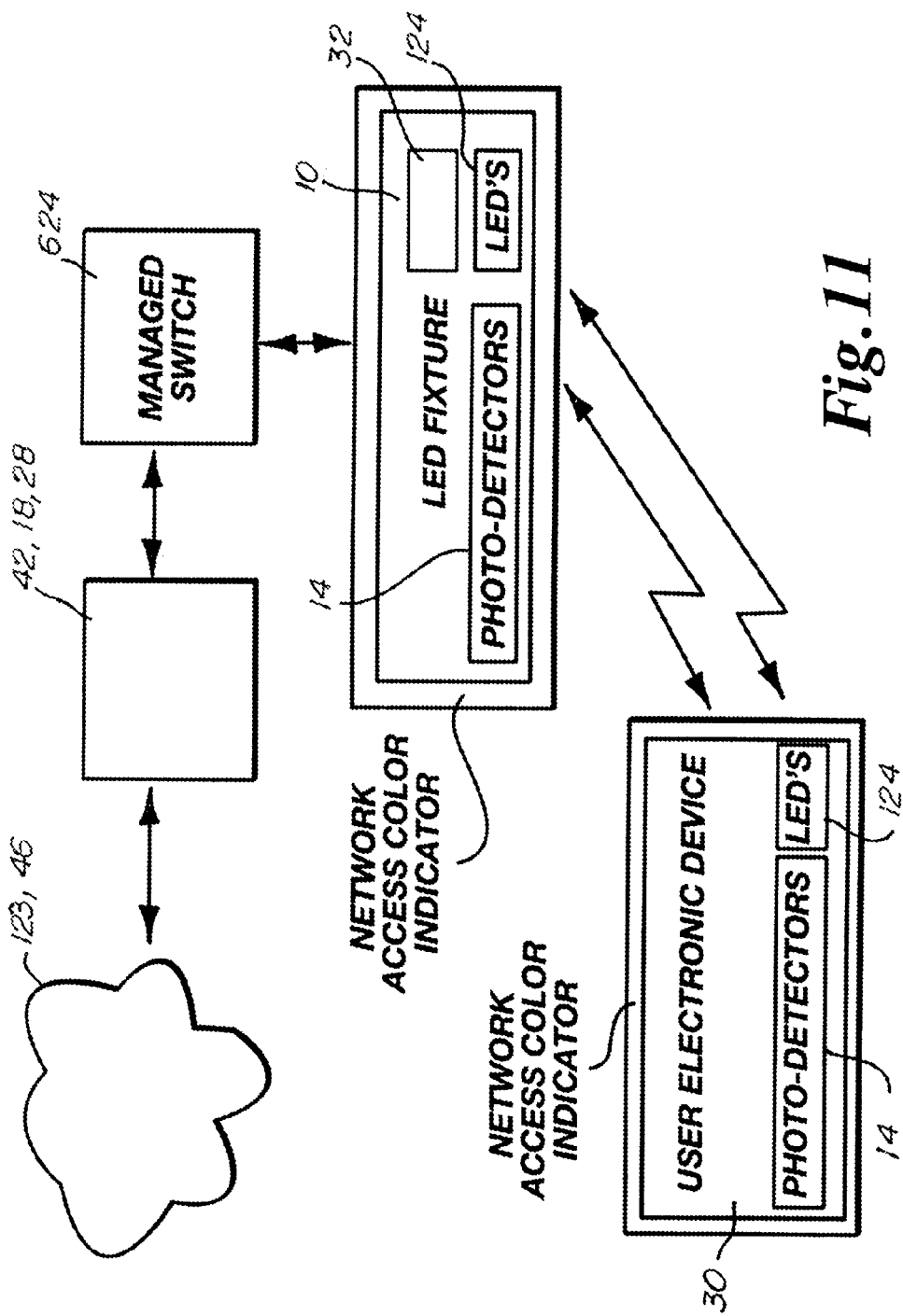
FIG. 11 is a block diagram of an alternative embodiment of the LED light control assembly and system.

In some embodiments, an individual may initiate a communication such as a telephone call through the exclusive use of LED pulsed light communications. In some embodiments, an individual may be able to initiate a voice and/or video communication with another individual by looking at an LED light fixture 10 or dongle device 12 and speaking terms such as "call John" where a real time voice, and/or voice and visual communication may be initiated. In some embodiments, LED light fixtures 10 may easily identify who is looking at the light fixture 10 or who is looking at the proximity of the light fixture 10 where an individual may issue a command through voice recognition. Because of voice or facial recognition an individual may be permitted to issue a command as ""I would like to call my wife." An individual may speak to the light fixture 10 and the sensor will recognize the individual. The control server 26 or central processor may then establish a connection to another individual. Communication may occur onto one PBX's or onto a landline so that a user could just say I need to speak with another individual and the system will open a communication link. Communication may therefore be conducted over and through the use of the pulsed LED light communication signals, eliminating the need for a cell phone. In at least one embodiment, the LED light fixtures 10 may be in electrical communication with a control server 26 which may include or be in communication with a database of information to answer any inquiries of a user. LED pulsed light communications may occur because each LED light fixture 10 and/or electronic device 30 interfaced with a dongle device 12 will include an identifier 24 (FIG. 8) which may include a device identification number and/or may also include a location identifier, which may be active or static, where in one embodiment the location identifier includes GPS location information, an account or premises number, and/or elevation information, unit numbers or another type of location or device identifier such as for example a numeric volume interfaced with a known database.

In some embodiments the identifier 24 may also include facility, environment, or type information which may be a character designating for example that the communication or data transfer is issuing from a location or vehicle such as a building, boat or vessel, land vehicle, plane or satellite, or other device capable of identification.

In some embodiments, communications may occur through a control server 26 which may include location identification routing capabilities so that a pulsed light communication may be efficiently routed from an origin address to a destination address through intermediate LED pulsed light receiving and generation units or LED light fixtures 10. The control server 26 may also have route optimization analysis software as well as LED pulsed light system usage software, so that optimal re-routing of a pulsed light communication signal may occur and if necessary may occur around a high volume traffic location or to divert around an LED pulsed light receiving and generation unit or LED light fixture 10 being replaced or serviced.

In at least one embodiment, the dongle device 12 includes, or is in communication with, voice recognition software, voice activation software, camera, facial recognition software, gesture recognition software, voice conversion software, motion recognition software and communication interface software, where an individual may activate an electronic device 30 through the dongle device 12 and the electronic device 30 will receive processed information as received and detected by the dongle device 12. The electronic device 30 then, as an option to a user, may re-transmit or re-communicate the original communication over wireless telephone as known. In this embodiment, an individual may use a dongle device 12 as connected to an electronic device 30, where the individual is located in an airplane during flight, or at some other location where direct pulsed light communication is not available, and the dongle device 12 may be used as the communication interface to transmit communication signals wirelessly, or through cellular telephone communications, microwave or otherwise, such as through a telecommunications satellite.

In at least one embodiment more or less than six of the 22"×36" panel light fixtures 10 may be used in a structure. The light fixtures 10 may be connected back to the power unit 22. The power units 22 can support up to sixteen light fixtures 10 at a time. The power units 22 inject power into the light fixtures 10 and the data leaving the power unit 22 travels back through wires, to a power unit controller 28.

In at least one embodiment, a control unit 16 may be in communication with a computer and a user may hit a button to initiate transmission of secure information via pulsed light, to complete or to initiate a communication transaction. An individual may transport a dongle or key 12 for connection to an electronic device for activation of a button to initiate transmission or communication via pulsed light.

In some embodiments, each LED light fixture 10 may also include a digital potentiometer.

In at least one embodiment, each LED light fixture 10 includes a light sensor 32 which may be used to record illumination from an LED light fixture 10 which in turn may be used to calculate data lumen hours (DLh).

In some embodiments, a room may include any number of LED light fixtures 10. Each LED light fixture 10 may be operating the same, or have a different settings resulting in different operation. In at least one embodiment, the data lumen hours or minutes for each LED light fixture 10 may be recorded or regulated independently with respect to any other LED light fixture 10. A composite amount of data lumen hours or minutes may be calculated from the independent LED light fixtures 10 and communicated to a facility control unit 18 or a control server 26.

The dongle device 12 with the built in voice and/or facial recognition software in some embodiments, may function as security for the electronic device 30 preventing activation until such time an authorized user's voice of facial features are recognized.

In some embodiments an individual recognized by a facility control unit 18 or control server 26 could look at an LED light fixture 10 and speak the words "call John Q" who is located at a remote location where "John Q" is recognized by another LED light fixture 10 or LED dongle device 12 at the remote location. Transmissions may occur over broadband over power line or pulsed light communication signals. Communications would be available in any location which has LED light fixtures 10, or an electronic device 30 having an LED dongle device 12 connected to a network integrated into an LED pulsed light communication system.

In at least one embodiment, a camera 36 is integral to at least one LED light fixture 10 in a room. The camera 36 is in electrical communication with a controller 20 comprising facial recognition software. The camera 36 in conjunction with the facial recognition software and the controller 20 may include one or more preset customized environmental settings, such as temperature, heating, cooling, and/or lighting to name a few. For example, in at least one embodiment, a teacher/professor could walk into a room where the teachers facial features were recorded by the camera 36, communicated to the controller 20, processed by the facial recognition software, where the controller 20 in turn activates a preset environmental condition such as activating an LED light fixture 10 disposed above the teacher/s/professors desk. The controller 20 may simultaneously activate a fan to increase air circulation within a classroom. At a later time, a student may enter the classroom and the camera 36 will record the facial features of the student, communicate the student's image to the controller 20 to process the facial recognition, and the controller 20 in turn may activate a preset environmental condition such as activating an LED light fixture 10 disposed over a student's desk to provide illumination and/or pulsed light communications over the student's desk.

In some embodiments, the controller 20 may include lighting or other environmental presets for activation in any combination of electronic devices 30 upon the facial recognition of one or more individuals within an area, where the camera 36 has recorded the image of the individual. In some embodiments, the controller 20 may be programmed to not activate, deactivate, or issue an alarm if the camera 36 has recorded an image of an individual which is not recognized or authorized within a certain area or zone. In some embodiments, only one LED light fixture 10 in an area includes a camera 36 and in other embodiments, each or any combination of LED light fixtures 10 includes a camera 36.

In at least one embodiment, the camera 36 on the LED light fixtures 10 which in turn are in communication with the controller 20, will recognize the departure or exit of a student or teacher from a classroom, and will issue a deactivation command to turn an LED light fixture 10 off above a student's desk. The detection of the absence of a teacher or student may also be accomplished through the processing of images from the camera 36 by the facial recognition software. It should be understood that the use of the camera 36 and facial recognition processing for customization and/or regulation of an environment is not restricted to schools and may be utilized in any area, home, business, or government facility without limitation and the types of uses are not restricted to the embodiments disclosed.

In other embodiments, the LED light fixtures 10 may be in communication with a control or system server 26 having access to databases of information. In this embodiment, and individual may verbally ask an LED light fixture 10 or dongle device 12 a question which is processed with voice recognition and converted into electrical signals recognizable by a computing device where a response to the verbal inquiry will be provided through the microphone 38 on the LED light fixture 10 or LED dongle device 12.

In some embodiments, the pulsed light communication system in communication with a control server 26 has established a user profile. Identification of the current user profile occurs through facial recognition and/or voice recognition software through the LED light fixture 10. The control server 26 based on the user profile may generate a communication through the LED light fixture 10 and initiate a communication through a speaker 40 such as "John Q your flight has been delayed" or "John Q you have an appointment in 10 minutes."

In at least one embodiment, a variation of an eight conductor cable, or category six cable, would provide two channels which would vary the voltage to the light emitting diodes 124, 2100 effecting the pulsed light output to accomplish embedded pulsed light communication. Pulsed light communication is a very effective way of managing the intensity levels for the pulsed light output used in communication, while simultaneously providing 100% communication capabilities.

FIG. 1 depicts an exemplary embodiment 110 of an LED light and communication system. FIG. 1 shows a server PC 112 connected via a USB cable 114 to a server optical transceiver (XCVR) 116, and a client PC 118 connected via a USB cable 120 to a client optical transceiver 122. The server PC 112 is in communication with a network 123 via a CAT-5 cable, for example. The server optical XCVR 116 and the client optical XCVR 122 are substantially similar in at least one embodiment. An exemplary optical XCVR (or, simply, "XCVR") circuit includes one or more LEDs 124 for transmission of light and one or more photodetectors 126 for receiving transmitted light. LEDs and photodetectors are well known to those of ordinary skill in the art and, as such, their specific operation will not be described in detail. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal may then be fed into the receive pin of the RS232 to USB module.

In some embodiments, a 9V battery may be used to power the amplifier circuitry. Significant noise is generated by switching high brightness LEDs on and off at 200 mA and 500 kbps, for example. Powering the amplifier with a battery may reduce these noise problems by reducing or removing transients.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, data compression, data decompression, up converting, down converting, coding, interleaving, pulse shaping or any other digital modulation communication and/or signal processing techniques known by those of ordinary skill. Similarly, such XCVRs can include demodulation circuitry that extracts the data from the received signal. Modulation and demodulation techniques for modulating light signals are described in U.S. Pat. Nos. 4,732,310, 5,245,681, and 6,137,613, the entire contents of each being expressly incorporated herein by reference.

In some embodiments, the use of XCVRs as light sources can reduce energy consumption and simplify communications by reducing the filtering or modulation complexities necessary to distinguish data signals from extraneous lighting sources.

Figure 12:
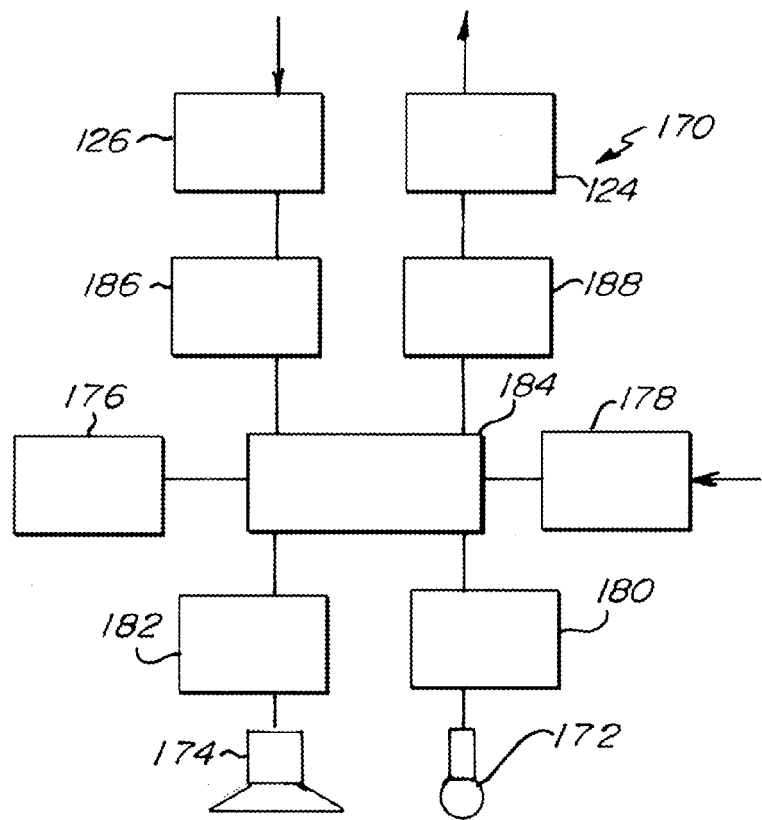
FIG. 12 is a block diagram of an alternative embodiment of the LED light control assembly and system.

Some embodiments of an LED XCVR light fixture may include any or all of the following devices: a microphone 172, a speaker 174, a rechargeable battery 176, and a video camera or camera 178, as shown in the simplified block diagram of FIG. 12. In at least one embodiment, the microphone 172 is in communication with an analog-to-digital converter (ADC) (not shown) for converting the analog speech input to a digital signal. An amplifier circuit 180 can be used to boost the microphone signal. The signal can be amplified prior to or after the ADC. In some embodiments, the speaker is communication with a digital-to-analog converter (DAC)(not shown) for converting the received digital signal to an analog output. An amplifier circuit 182 can be used to boost the speaker signal. The signal may be amplified prior to or after the DAC.

The processor 184 shown in FIG. 12 converts the digital signals from the microphone/amplifier to data packets that may be used for transmission by the optical XCVR 116. Similarly, the processor 184 converts the data packets received by the optical XCVR 116 to audio out signals directed to the speaker 174. The processor 184 can convert data packets received from or directed to the video camera 178.

Furthermore, the optical XCVR 116 may include non-volatile memory (FLASHRAM, EEPROM, and EPROM, for example) that may store firmware for the optical XCVR 116, as well as text information, audio signals, video signals, contact information for other users, etc., as is common with current cell phones. In some alternative embodiments, a harddrive may be used instead of these semiconductor-based memory devices.

The optical XCVR 116 may include one or more photodetectors 126 for receiving transmitted LED or other light signals, and one or more LEDs 124 for transmitting LED signals, as shown in FIG. 12. In some embodiments, an optical signal amplifier 186 is in communication with the photodetectors 126 to increase the signal strength of the received light signals. In at least one embodiment, the LEDs are in operative communication with an LED power driver 188, ensuring a constant current source for the LEDs.

In some embodiments, an optical XCVR 116 may include circuitry that performs modulation, demodulation, data compression, data decompression, up converting, down converting, coding, interleaving, pulse shaping, and other communication and signal processing techniques, as are known by those of ordinary skill in the art.

In at least one embodiment, each and every optical XCVR 116 is embedded with a unique code, similar in principle to the MAC address of a computer, for example. The optical XCVR 116 broadcasts the unique code at regular intervals, at irregular intervals or with each transmitted data packet if desired. Optical XCVRs located within the user's building and near the user may then receive the unique code transmitted by another optical XCVR 116 or dongle or key device 12.

There are numerous applications of such a design. For example, in some embodiments, an optical XCVR 116 may be engaged to a door lock. When a user with an optical XCVR name tag approaches a locked door, the name tag may broadcast the unique code, and an optical XCVR in communication with the door lock may receive the code, and if acceptable, unlock or open the door. A table of acceptable codes may be stored in a memory device that is in communication with, and accessible by, the door's optical XCVR. Alternatively, the door's optical XCVR may transmit a code to a facility control unit 18 which compares the user's code against a table of approved codes and then sends a response either allowing or denying access.

As stated above, the LEDs may be bi-directional. In at least one embodiment, the optical XCVR 116 is comprised of bi-directional LEDs. In such an embodiment, the optical XCVR 116 is constructed and arranged such that at least one of the bi-directional LEDs allows parallel transmitting and receiving of light signals.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

In some embodiments, an optical signal amplifier 186 is in communication with the photodiodes 126 to increase the signal strength of the received light signals. In at least one embodiment, the LEDs are in operative communication with an LED power driver 188, ensuring a constant current source for the LEDs.

In some embodiments, optical XCVRs may be placed in numerous locations as lighting sources. In some embodiments, an XCVR as integral to a ceiling mounted or other type of light fixture may in turn be in direct communication with a computer, processor, microprocessor, mainframe computer or server, and/or other computing device as earlier described through the use of wire, cable, optically via pulsed light communication, over a Broad Band Power Line system or over any other type of communication system.

In one embodiment a series of XCVRs are in communication with the system processor, mainframe computer or server, through sequential transmission and receipt of pulsed light communication signals. In one embodiment the series of XCVRs are in communication with the system processor, mainframe computer or server, through the Broad Band Over Power Line Communication System. In one embodiment the series of XCVRs are in communication with the system processor, mainframe computer or server through the use of cable, wire, or other communication media.

In one embodiment the communication system including the XCVR may be incorporated into a hand held or portable unit. In other embodiments the communication system may be incorporated into a device such as a cellular telephone.

In accord with at least one embodiment of the invention, LEDs 124, 2100 are used to transmit through an optical communication channel several kinds of data, including identity, location, audio and video information. The use of an optical communication link provides large available bandwidth, which in turn permits multiple feeds of personal communication between LED light sources and dongles or keys 12 similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of an access dongle or key 12 and associated person can be restricted to a particular room, hallway or other similar space.

Prior art GPS systems and cell phone triangulation techniques are typically only accurate to one or several hundred feet. Horizontally, this prior art precision is adequate for many applications. However, vertically several hundred feet could encompass twenty floors in an office or apartment building. In some embodiments, an optical transceiver is capable of precision to a room or LED room light fixture 10, for improved location identification than otherwise previously available.

It is anticipated that each transmission of a communication pulsed light signal will include a code/identifier 24 representative of the originating XCVR 116. Optionally additional intermediate XCVRs may add a communication pulsed light signal code or identifier 24.

In one embodiment, a control server 26 may initiate an inquiry to locate the identification code 24 corresponding to an optical XCVR 116. In this embodiment, the control server 26 would transmit a signal outwardly through the optically connected XCVRs 116 to request identification of a particular XCVR identification code 24. In one embodiment the inquiry may be global, or may be limited to specific periods of time or other specific conditions such as location. In one embodiment each individual XCVR 116 upon receipt of the command inquiry may forward by pulsed light signals the identification codes 24 of all XCVRs within a particular location, because identity codes 24 are being continuously transmitted by each optical XCVR.

In accordance with another alternative embodiment of the present invention, building lighting may be modulated with time and date stamps or the like. In some embodiments, video recordings made within a system using modulated illumination will have an optical watermark automatically embedded therein. The embedding of such identifiable signals ensures the integrity of video recordings made under these lights.

If audio and/or video is additionally enabled, either through optical XCVR communications badges or separate optical XCVR wall or ceiling mounted devices, the video can be used to capture the last-known conditions of a user or an area.

Today's satellite navigated Global Positioning are augmented with the use of a Global Positioning System Routing System (GPSRS). The burden on GPS satellites may be reduced by embedding unique identifier information 24 and pre-documented exact location of an entity or asset. The unique GPSRS identifier 24 may be incorporated into LED light fixtures 10 or fixture controllers 42, switches 624, facility control units 18, remote servers, power supplies 22, control servers 26 or any other electrical device 30 which may be in a communication chain for communication of information, data packets, or commands or other types of communication or information transfer. This GPS-based location may then improve location-based services by providing real time location identification. Today's satellites update a location every 3 seconds. The information about the location of an entity or asset is always referenced back to a remote reference table. Current location measurements using satellites also require 3 or 4 satellites to improve the triangulation methods needed for locating a place or entity.

Location based services within a VLEC infrastructure will have the added advantage of improved and secure content. Personal Navigation devices will have the added advantage of providing improved coordination and collaboration methods by providing an increase in friend to friend location services. A friend to friend location services is an optional service whereby a personal list of friends or family members equipped with VLEC technology GPSRS devices can be created in a database and that database is managed by the group participants. When needed participants utilize a Visible Light Embedded Communication (VLEC) GPSRS client device that associates with a VLEC host and then with a connection through a controller 20 that connects or interfaces over BPL to the Internet. The information/communication will then traverse the Internet and arrive at the predetermined location based on a designed collaboration (containing all Internet protocol addresses subnets and ports designed for this purpose) by the friends involved to create this network. A control server 26 may contain reference, relationship, awareness or look-up tables and establish in a millionth of a second, the location of the entity they are seeking. This information is then embedded or encapsulated into the data stream and transceived throughout the Internet 46. Today's cumbersome RF calculations require algorithmic math computations that are constantly changing and therefore reduce the accuracy of locating the device in real-time. A reference back to the previous or last known location requires constant updates. Couple this with the inherent latency's of today's devices and effectiveness is reduced. Based on RF applications, there may be a need to measure the RSSI (radio signal strength indicator) and relate this information to another calculation table before probable table coordinates may be applied in order to perform a triangulation calculation of the client device. The RF Location based services rely heavily on assisted GPS technology. This technology is very taxing and expensive on computers, and contributes to a poor economy of scale approach for businesses. GPSRS will embed location information which in turn facilitates ease of use.

In some embodiments, the VLEC system will incorporate GPSRS technology. Currently, Internet protocol (IP) security allows an individual to access infrastructural systems from anywhere in the world. In some embodiments, the VLEC system is incredibly secure requiring appropriate passwords or necessary equipment thereby preventing 'faking' identities and gaining unauthorized access to IP protected systems.

In some embodiments, each control element, switch, activation device, keypad, button, dial, photodetector, LED lighting element, a dongle or key device, sensor, monitor, or other devices used to establish communication within a pulsed light communication system may include a unique location identifier 24 such as GPSRS. In some embodiments, not all of the control elements are required to include LED communication devices, and some control elements will be in direct communication with a control server 26 via wires. In alternative embodiments, a control element may be wired, where the wire extends to an intermediate pulsed light communication hub. The intermediate pulsed light communication hub may include a unique location identifier 24, controller 20, photodetector(s) 14 and LED's and is adapted to receive pulsed light communication signals and to process the received pulsed light communication signals into electrical signals to be passed over the wire to a particular control element which may be used to change the status of another control element.

In some embodiments, each LED light fixture 10, LED dongle or key device 12, and each control element includes a specific location identifier 24 which may be similar to the GPSRS location address, or an alpha-numeric, or numeric identifier as assigned to the control element to precisely locate the control element relative to the map, diagram, drawings, image, model and/or blueprint of a structure as included within a facility control unit 18.

Figure 13:
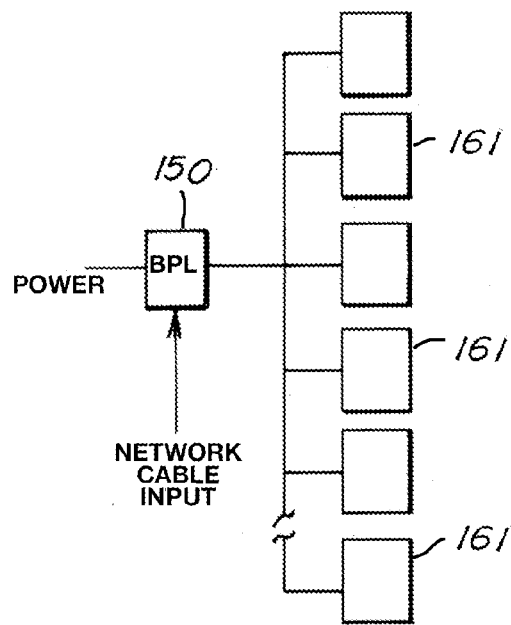
FIG. 13 is a block diagram of an alternative embodiment of the LED light control assembly and system.

FIG. 13 illustrates a simplified block schematic diagram of an electrical circuit used to couple power and data to one or a plurality of LED light sources 161. Power, which may be either AC or DC current is coupled through a power line bridge 150 with data from a network cable input, for example. The source of the data may include various computer outputs such as control processor output or network connections such as commonly found on Local Area Networks (LAN), Wide Area Networks (WAN) or through the Internet. In accord with one embodiment, the wiring between power line bridge 150 and LED light source 161 is shielded by passing through a conduit or the like, defining a Shielded Broadband-over-Power-Line (S-BPL) connection that is both resistant to interfering communications and also produces almost no radiant energy.

In at least one embodiment, a Visible Light Embedded Communications (VLEC) apparatus, network, and/or system is disclosed. In one embodiment, a VLEC Light Emitting Diode (LED) light fixture 10 is coupled to an electronic device 30 through an optical communications channel.

In some embodiments, an optical transmitter and receiver are provided and enable communication over optical communications channel. A microphone 38, loudspeaker 40, microphone and speaker combination, or dual-purpose device may be provided to integrate an auditory communication channel between an LED light fixture 10 and nearby individuals or other animate or inanimate objects. A video camera 36 may be incorporated to capture video or still pictures.

In at least one embodiment, VLEC light panel includes a plurality of LEDs and optical detectors. One or more optical detectors may be provided, and may either be broad spectrum detectors or alternatively color-filtered or sensitive to only a single color.

In some embodiments, more than one client is potentially coupled through a common host, and is potentially using the same communications channel as another client. When this occurs multiplexing or network communications techniques may be implemented. Among these, but certainly not limited thereto, are such techniques as static or dynamic assignment of unique communications channels, or Time-Division Multiplexing (TDM) of a single channel with appropriate conflict resolution.

Communication may further be shared with optically-enabled telephones, television, music, internet, public address, computing devices of all sorts, ranging from hand-held devices such as Personal Digital Assistants (PDAs), to massive mainframe computers, and including Personal Computers (PCs), printers, network storage devices, building maintenance wiring such as thermostats, HVAC systems, fire alarms, motion detectors, and any other electrical or electronic apparatus existing or appearing within a room or space, other security and safety devices, appliances, manufacturing machinery, and so forth. Essentially, any device which incorporates or can be made to incorporate sufficient electronic circuitry may communicate with a VLEC host to exchange information at any time. Advantageously, many different conditions or devices may be simultaneously monitored and/or controlled when they are broadcasting information through the preferred network, because they are operating on a wide-bandwidth optical link. This information can be used anywhere on the network, which includes other rooms or a central or control server 26.

In accord with one embodiment of the invention, LEDs are used to transmit through optical communication channel several kinds of data, including identity, location, audio and video information. The use of an optical communications link provides large available bandwidth, which in turn permits multiple feeds of personal communication between LED light fixtures 10 and other devices or clients in bandwidths similar to or in excess of that of cell phones.

In some embodiments, an ultra wide band or low duty cycle lighting BPL: back bone is generally identified by reference numeral 400. In some embodiments, the VLEC host fixtures and clients will each be assigned a unique Machine Access Code and Electronic Serial Number. The Machine Access Codes and Electronic Serial Numbers will be assigned by the certified manufacturer's facility and matched against a unique relationship table residing on various certified control servers 26. The client devices 30 may then move about a LAN, an entire office building, a WAN or other network and achieve maximum throughput rates similar to that of the location they originated. An added benefit of the preferred visible light embedded communications comprised by optical communications channel is that, with increased bandwidth, back end software for synchronizing data on PDAs and other mobile devices may be improved by almost 5 fold over RF applications as the transport mediums, changing the communications channel bottleneck from RF.

Figure 14:
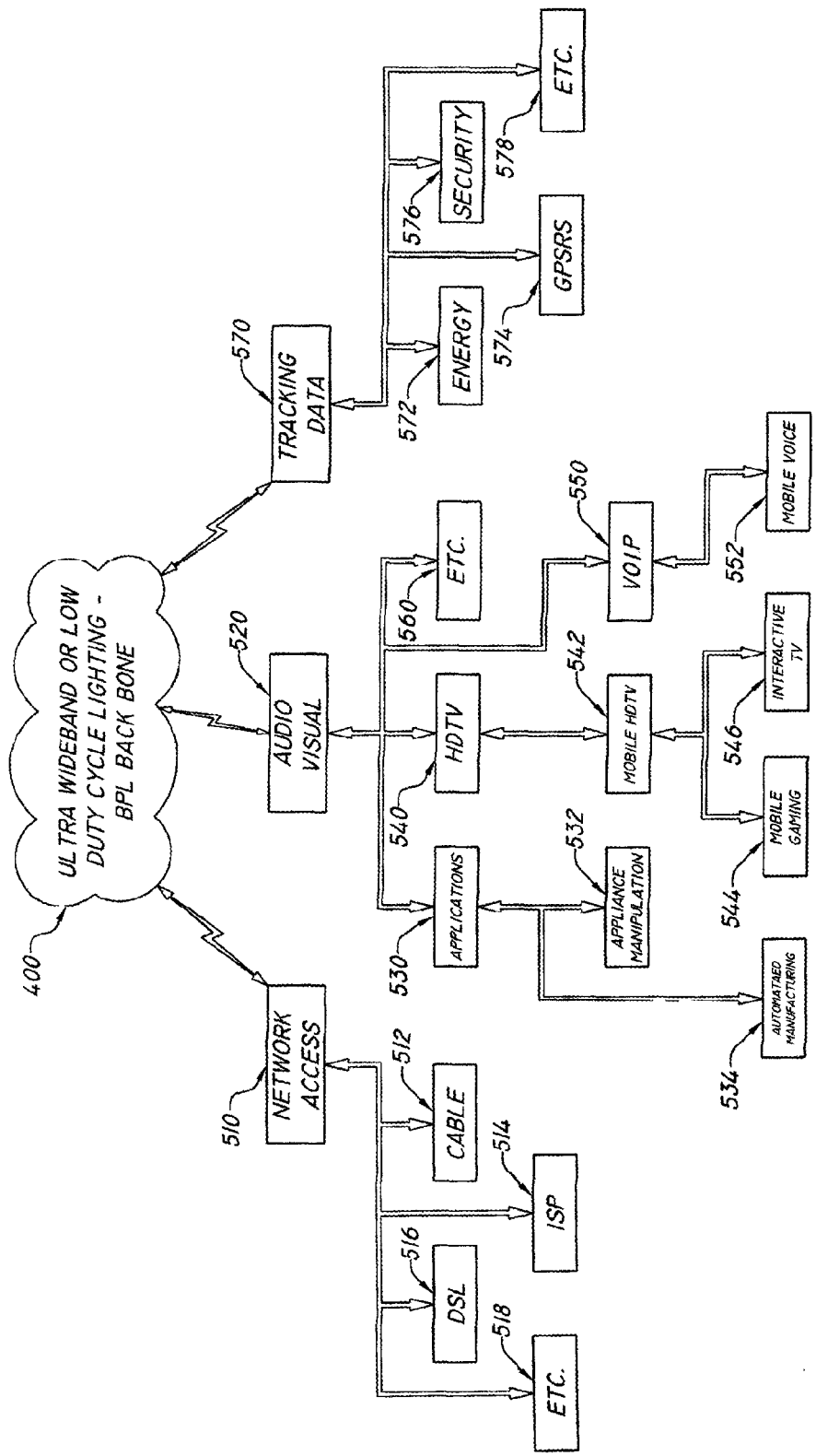
FIG. 14 illustrates by hierarchal chart one embodiment of an illustrative sample of the types of data communications to which the present invention may be applied either singly or in any combination.
Figure 15:
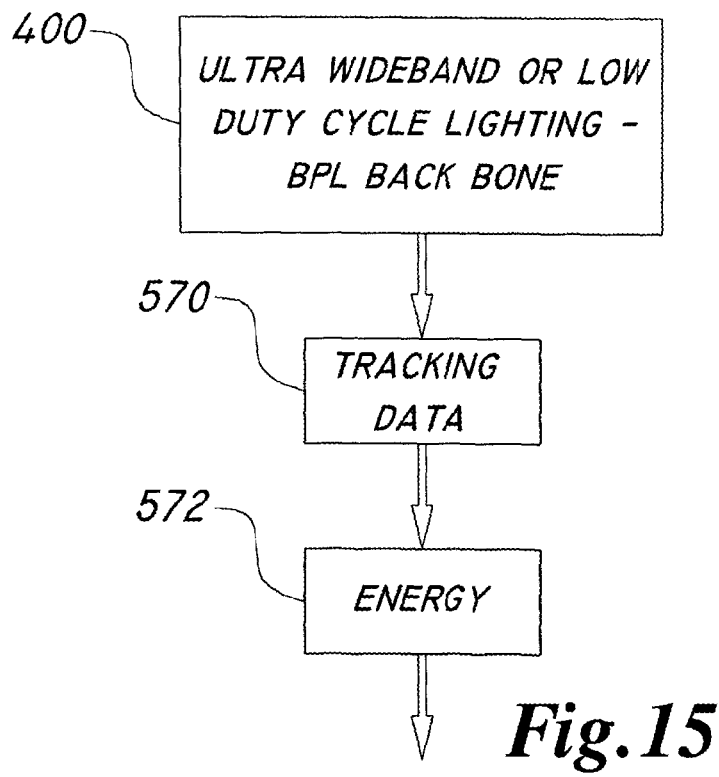
FIG. 15 illustrates by hierarchal chart of an alternative embodiment of an application of the teachings of the present invention.
Figure 16:
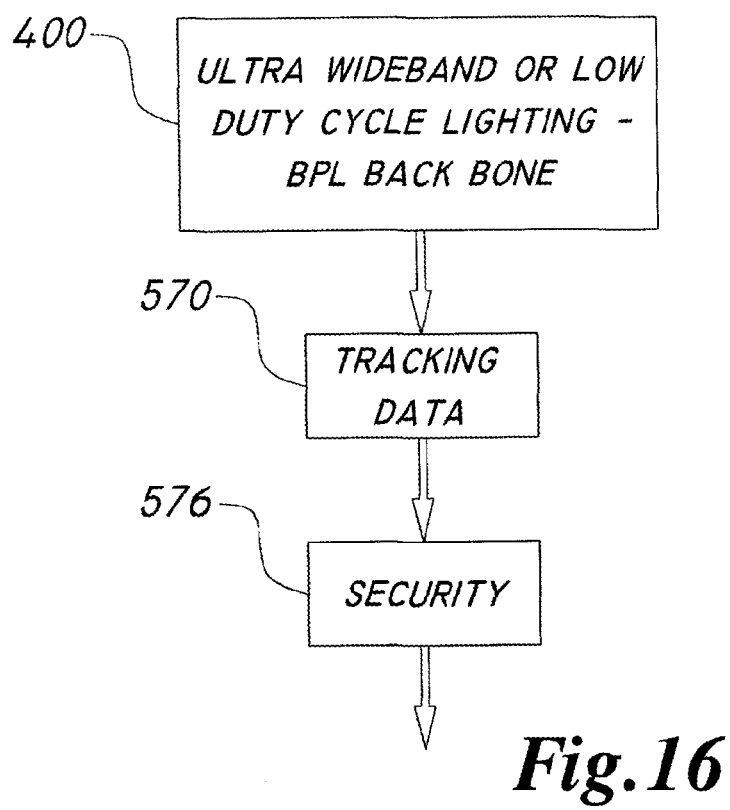
FIG. 16 illustrates by hierarchal chart one embodiment of an illustrative application of the present invention.
Figure 17:
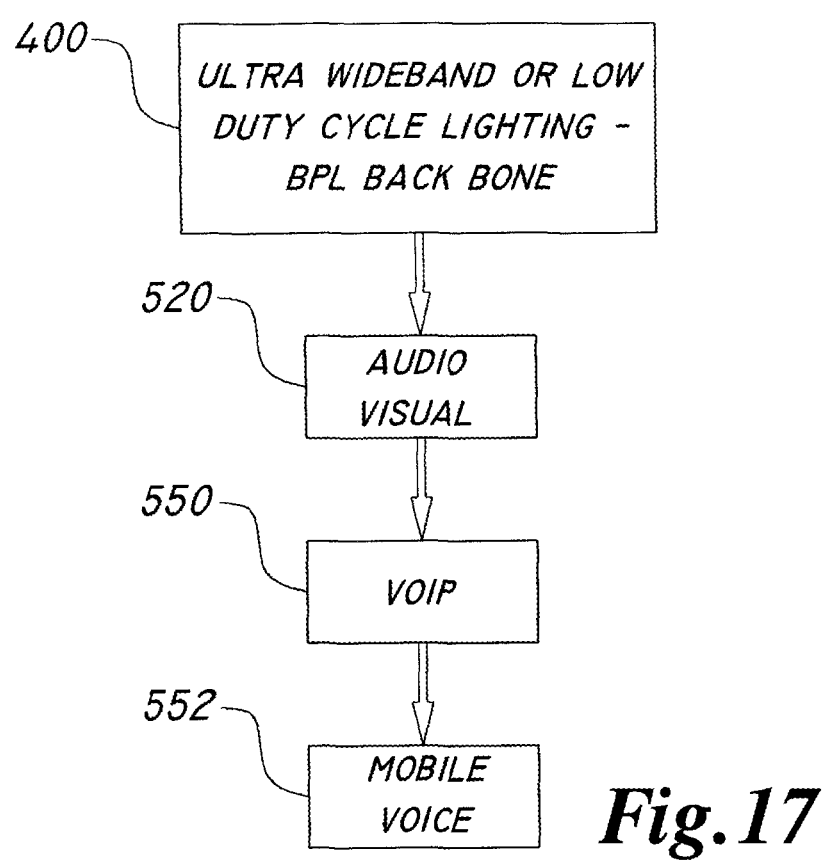
FIG. 17 illustrates by block diagram an alternative embodiment of an application of the teachings of the present invention.

FIG. 14 illustrates many different types of exemplary communications that may be provided incorporating the VLEC technology of one embodiment of the invention. Access to the World Wide Web will be enabled through network access 510 to allow users the benefit of web surfing. VLEC technology allows this access to be untethered and nomadic, even though beyond a building or space the network access 510 may be further coupled using conventional cable 512, Internet Service Provider (ISP) 514 links such as satellite or dial-up, DSL 516, or other suitable link 518. AV communications 520 may include various device interface applications 530 such as appliance communications or manipulation 532 and automated manufacturing 534. HDTV 540 is further contemplated, including mobile HDTV 542, mobile gaming 544 and interactive TV 546, but other types of video are additionally contemplated herein, including Slow-Scan TV (SSTV) or other known systems for capturing video information. Telecommunications and personal communications may further be enabled, for exemplary purposes using Voice Over Internet Protocol (VOIP) 550 and mobile voice 552. Other A/V applications are generically identified at 560. In another contemplated communications category, tracking data 570 may be gathered and used based upon the unique addresses assigned to VLEC host fixtures. The tracking information may be used for energy management 572, Global Positioning Satellite Routing Systems (GPSRS) 574, security 576, and other tracking applications 578. While communications are conceived as occurring between a plurality of hosts and clients simultaneously, in many instances one client will only be coupling one data stream at a time with a host. To better illustrate this, FIGS. 15-17 illustrate examples of single data category exchanges that might occur between a host and client.

Figure 18:
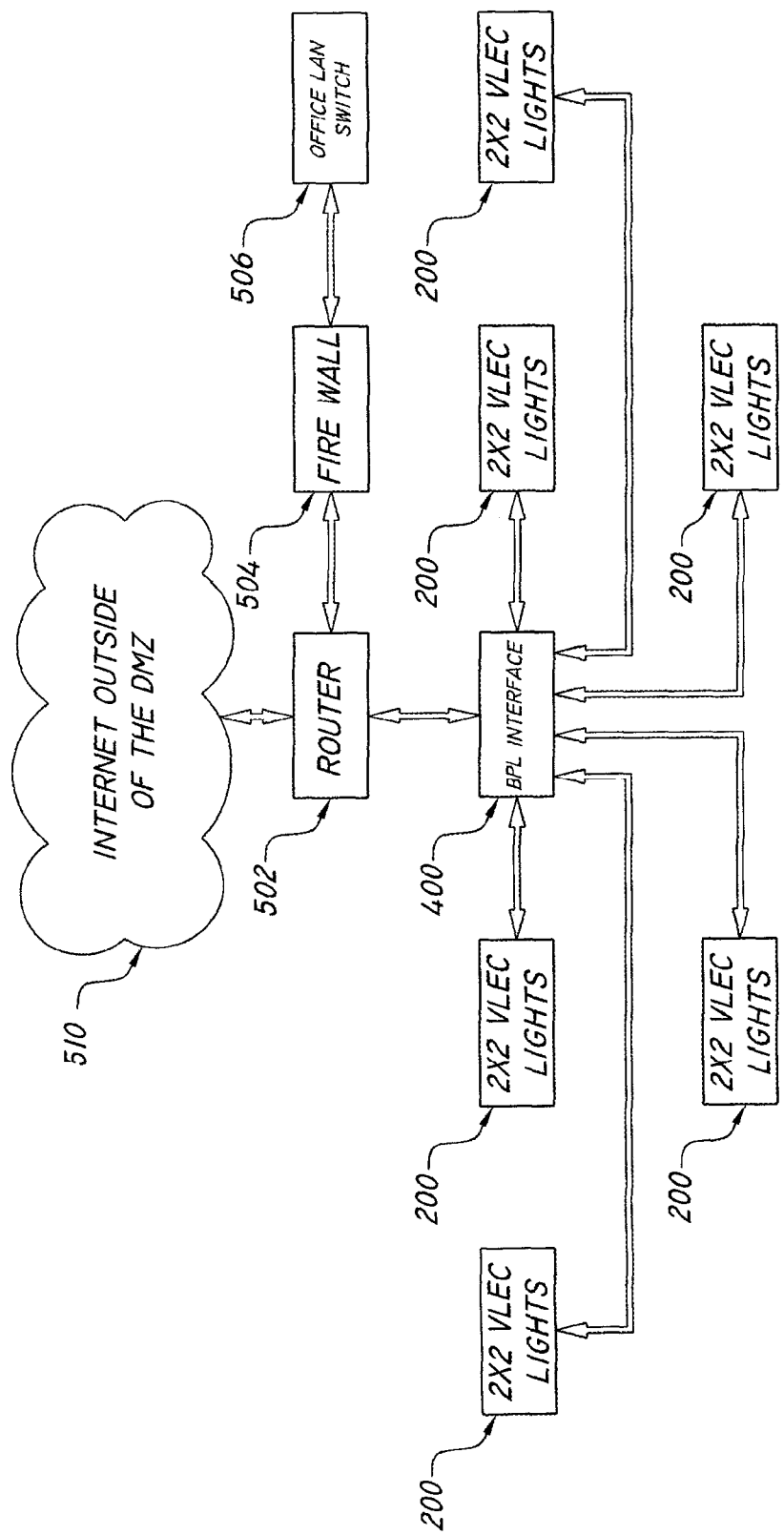
FIG. 18 illustrates by block diagram one alternative embodiment of the LED light control assembly and system.
Figure 19:
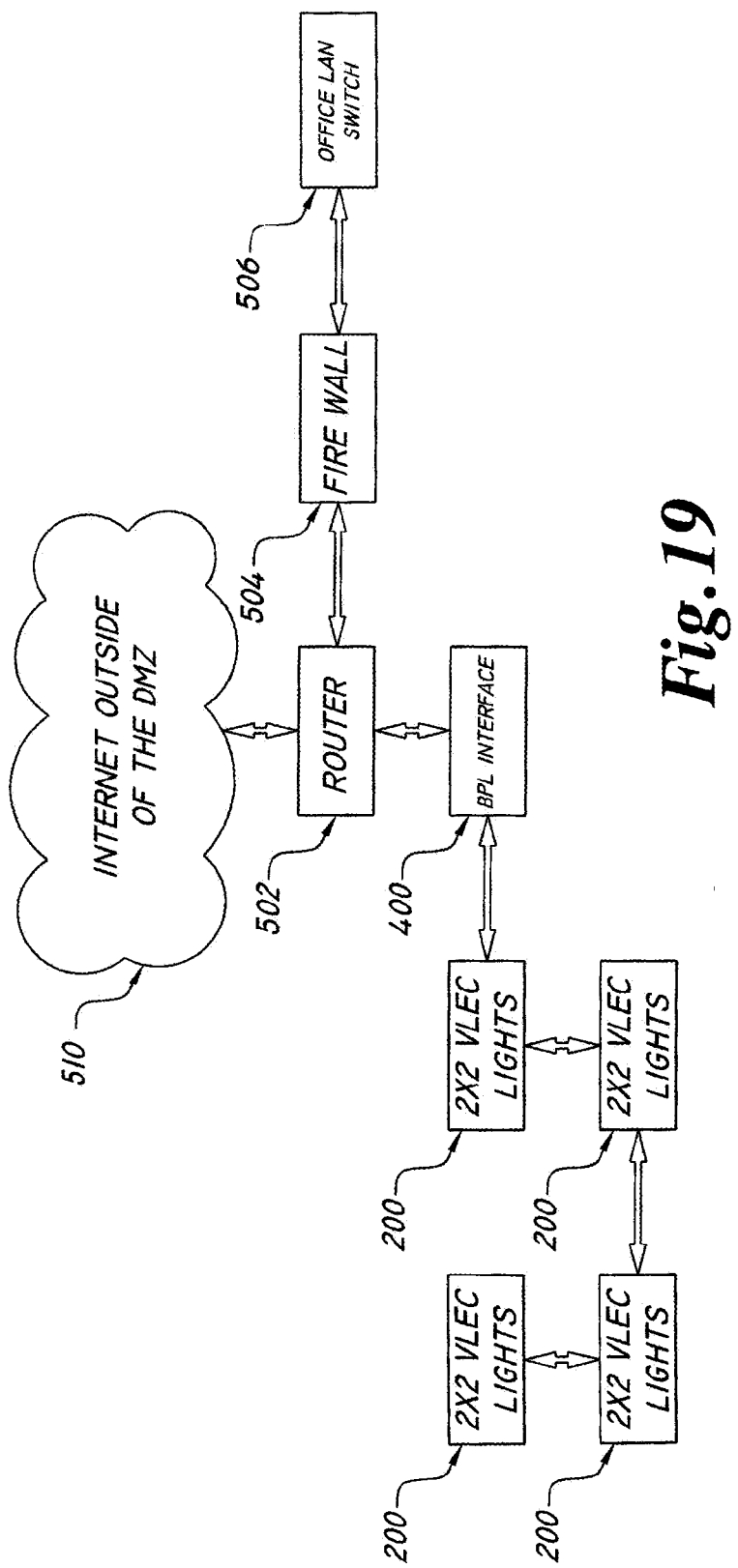
FIG. 19 illustrates by block diagram one alternative embodiment of the LED light control assembly and system.

In one embodiment, FIG. 18 illustrates one possible configuration of network related components in combination with one possible configuration of VLEC related components. As illustrated therein, the Internet 510 may be accessed through a router 502, which might, for exemplary purposes, be coupled through a hardware or software firewall 504 to a standard office LAN and switch 506. While not illustrated, firewall 504 may also optionally be provided between router 502 and BPL interface 400. From BPL interface 400, a plurality of VLEC hosts 200 may be provided, each directly coupled to BPL interface 400. In contrast, FIG. 19 illustrates a plurality of VLEC hosts 200, only one which is directly wired to BPL interface 400, the remainder relying upon optical-to-optical communications between VLEC hosts 200. In other words, in one embodiment, directly wiring each VLEC host 200 to BPL interface 400 may occur, but where desirable providing wireless VLEC communications between VLEC hosts 200 may occur, such that a communication from a client may pass through one or more optical-to-optical links before being coupled into a wired link.

Even in spaces not separated by physical objects, programmable signal response timing methods may create broadcast ranging in VLEC transmissions such that communication between a VLEC enabled apparatus may only occur at specified distances. In addition, because of higher achievable transmission rates, security will be further improved as more advanced encryption systems may be encoded into a VLEC wireless transmissions.

In some embodiments, the use BPL by the VLEC system may enable more advanced telecommunication and broadband services. For example, the hurdles of the "Last Mile" could potentially be avoided by transmitting data signals over a utility company's infrastructure in tandem with existing fiber optic network transport. Combined with the internal distribution of VLEC light fixtures throughout a building, the VLEC system may provide unlimited data hot spots without the latency caused by traditional physical limitations. Within a ubiquitous network environment using a VLEC system, customers may enjoy higher data speeds and security throughout an entire facility. In some embodiments, a VLEC system may be integrated with VoIP telephone services.

In some embodiments, a VLEC system may communicate data at a rate of 3 Mbps. In some embodiments, a VLEC system may reduce lighting energy consumption in a commercial building by 50%-90%.

In at least one embodiment, the VLEC system provides at least two major services, communication and lighting, for one cost. The VLEC system provides networking capabilities as well as continued monitoring and maintenance of VLEC light fixtures and communication system where lighting maintenance and related operational costs are provided by the VLEC lighting fixture owners. In some embodiments, such operational costs include: electrical consumption; lamp replacement and disposal; ballast replacement; lens replacement and cleaning; costs associated with requisition and employee distractions or interruptions; paperwork for purchase and defective returns as well as paperwork and operational costs for shipping, receiving, and distribution.

In some embodiments, a VLEC system and VLEC light fixture will include a camera, microphone, speaker, and sensory equipment integration. Cameras and other integrated devices may be used as environment sensors, detecting human traffic or ambient light, such as sunlight. In some embodiments, the camera, microphone, speaker and/or sensory equipment may reduce lighting energy consumption when a room is unoccupied or when ambient light conditions allow for reduced indoor lighting intensity.

In some embodiments, the VLEC system may include facial recognition software (together with camera, microphone, and speaker technology) which may be incorporated into a VLEC light fixture, where calls may be made directly to the VLEC light fixture under which a person is standing. The person being called will communicate back by simply speaking near the light fixture. Such a system could eliminate the need to broadcast messages to an entire facility to ensure that the person being paged is reached. In some embodiments, the VLEC system may include other biometric recognition software such as voice recognition software, retinal scanner software, finger print or other digit or palm recognition software to name a few.

In some embodiments, the VLEC system also provides IT Savings, Air Conditioning Savings, Wireless Security, Network Service Dependability, Environmental Stewardship, and Energy Mandate Compliances.

In some embodiments, the coupling of the VLEC system with a BPL network will provide integrated networks using BPL technology to enable the physical deployment of increased and enhanced security services, such as providing VLEC light fixtures enabled with surveillance technology.

In some embodiments, the VLEC system will incorporate an analog communication scheme (i.e. OFDM signaling) as well as integrated carrier signal technology. In some alternative embodiments code spreading modulation may be used which may be similar in operation to GPS Bandwidth sharing which may also be used. In some embodiments an individual may contrast code spreading modulation to frequency spreading modulation to optimize performance considerations. In alternative embodiments, Orthogonal Frequency Division Multiplexing (OFDM) and/or Orthogonal Signal Division Multiplexing (OSDM) and/or a direct logic digital circuit or direct logic circuitry field programmable gate array may be used to optimize performance considerations. Further the VLEC system will incorporate global positioning system routing service (GPSRS) capabilities and remote access management for integration with utility companies. Further, every electrical component forming the VLEC system or communication with the VLEC system will incorporate a global positioning system routing service (GPSRS) identifier and GPSRS recognition capabilities and remote access management for integration with utility companies or other communication or data/information systems.

In some embodiments, VLEC light fixtures may be installed throughout an entire building space and offer comprehensive lighting and communication services based on a digital communication scheme. With this communication scheme, each VLEC light fixture may support networking and communication capabilities for one or more computing devices, such as laptop computers. If twelve VLEC light fixtures are installed in a room, then twelve laptops or other VLEC system enabled devices, such as networked printers or telephones, may access the VLEC system network using the VLEC light fixtures.

In some embodiments, the VLEC system will incorporate an analog communication scheme, such as an Orthogonal Frequency-Division Multiplexing (OFMD) enabled communication scheme. With OFDM technology, each VLEC light fixture will support several computing devices simultaneously, as each LED in an VLEC light fixture becomes its own, independent communication point, capable of transmitting hundreds of communication channels simultaneously. Therefore, each VLEC light fixture will be capable of supporting a virtually unlimited number of computing devices.

In addition, by tuning the components in BPL circuitry, the VLEC system may accommodate the conversion of OFDM signals into light signals with very limited hardware.

In some embodiments, VLEC light fixtures may communicate with a computing device in a line-of-sight configuration. With the integration of carrier signal technology, VLEC light fixtures may be capable of communicating using a non-line-of-sight configuration. Being under a VLEC light fixture will not be a prerequisite to communicating through the VLEC system network. In at least one embodiment, communication through the VLEC system will be possible using reflected or ambient LED light signals.

In some embodiments, as a packet of information travels from its source destination to its final destination, it is continually evaluated by each communication node (VLEC light fixture or other GPSRS enabled network device) through which it passes. Each communication node interrogates the packet of information to discover the packet's last known destinations and its intended final destination, and checks that information against its current location and intended subsequent location to determine if any discrepancies exist. In addition, each communication node interrogates the packet of information to discover the time of the transmission and/or receipt from the packet's last known destinations to verify or determine if any timing or delay discrepancies exist during the communication or over the communication route. Each data packet is therefore subjected to continual and ongoing authentication by each communication node (VLEC light fixture or other GPSRS enabled network device) through which it passes. If no discrepancies are identified then the packet is tagged with unique identifier information from the interrogating communication node and sent to the next node along its path, where it is again evaluated using the information from the previous node and those preceding it. If a discrepancy exists, the packet cannot proceed within the VLEC system. This procedure establishes security for the data packet in real time and real space.

Figure 20:
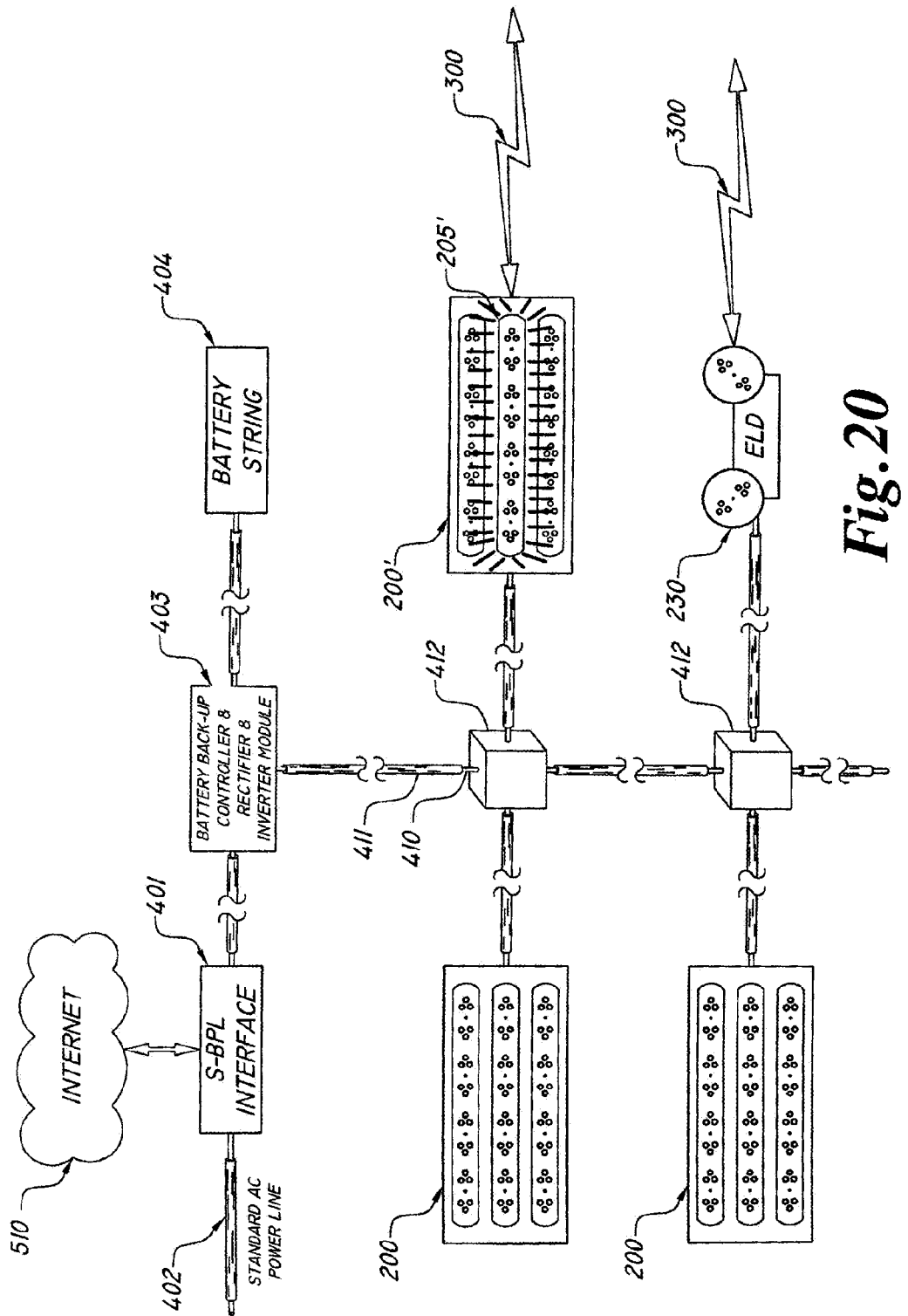
FIG. 20 illustrates by block diagram one alternative embodiment of the LED light control assembly and system.

In accord with one embodiment of the invention shown in FIG. 20, the wiring 410 between S-BPL interface 401 and LED light panels 200 is shielded by passing through a conduit 411 or the like and any appropriate junction boxes 412, defining a Shielded Broadband-over-Power-Line (S-BPL) connection that is both resistant to interfering communications and also produces almost no radiant energy.

In one embodiment as shown in FIG. 20 the VLEC system has the capacity to provide low power communications for energy management, emergency back-up, security and special applications utilizing alternative power sources such as batteries 404 or solar cells. Since each individual LED light panel 200 may be separately controlled, unnecessary lights may be extinguished in an emergency or during periods of nonuse. In some embodiments, the remaining lights may also or alternatively be used to maintain nominal communications channels within the building. The signals in such instance may be unable to be carried through power lines, and so may alternatively be implemented through an optical-to-optical repeater function from one light to the next such as described with reference to FIG. 19, to travel entirely through a chain of LED light panels 200. Additional Emergency Lighting Devices (ELD) 230 may also be controlled by a suitably designed battery back-up, controller, rectifier and inverter module 403.

Relatively recently, artisans have also proposed using so-called E-lines for extremely high bandwidth, low attenuation transmission. Such transmission schemes are, for exemplary purposes, proposed in U.S. Pat. Nos. 6,104,107 and 7,009,471, the entire contents of each being expressly incorporated herein by reference. While the present invention is fully operational using known or well-established transmission techniques and resulting bandwidths, and so is completely independent of whether these E-line transmission techniques work and are applicable or not to the present invention, the present invention further contemplates improvements to bandwidth using useful and functional transmission techniques and the incorporation of the same where operationally suitable.

Figure 21:
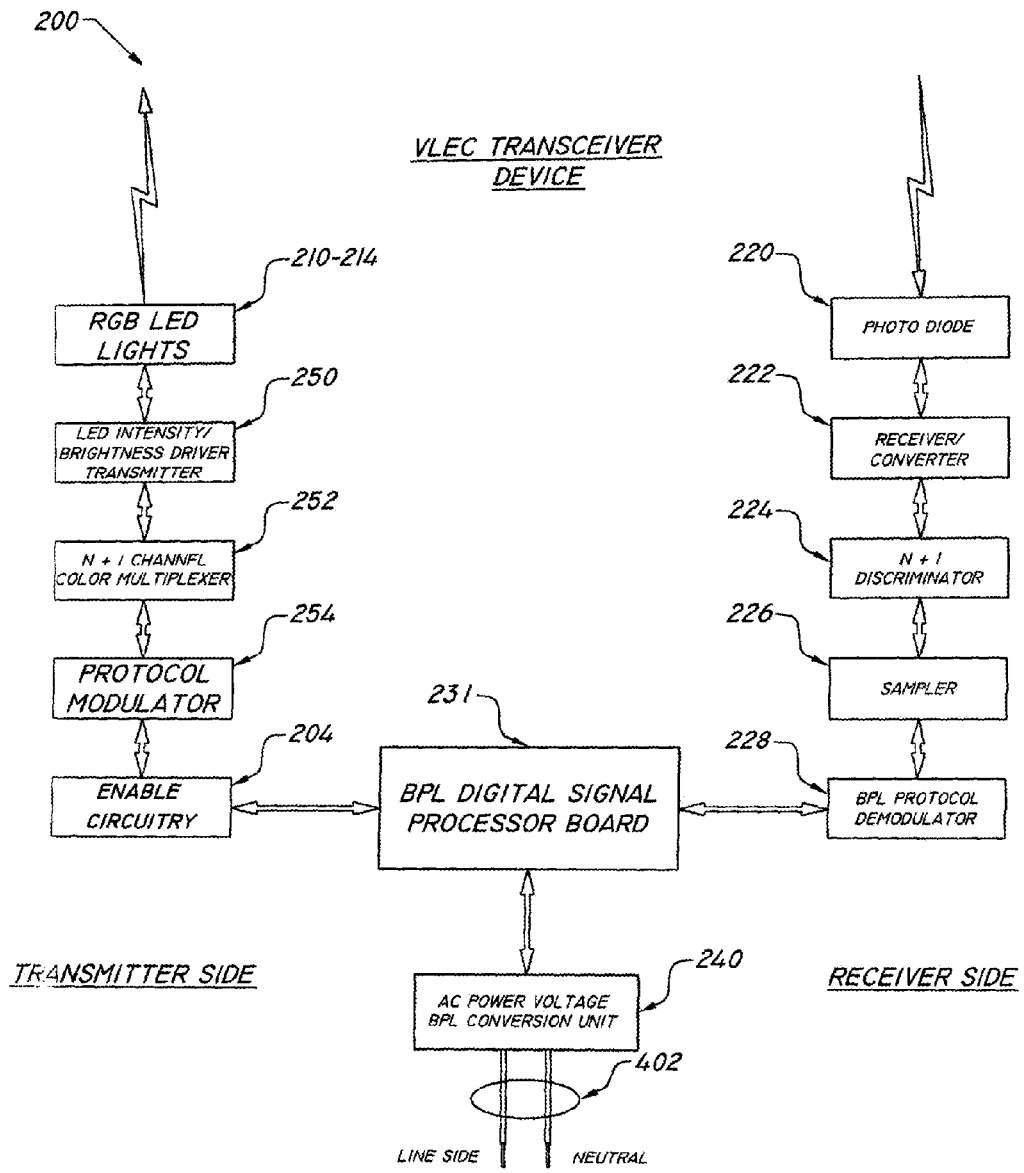
FIG. 21 illustrates by block diagram one alternative embodiment of the LED light control assembly and system.

FIG. 21 illustrates that a Visible Light Embedded Coded (VLEC) System features can include the responsibility for the validation of client devices by means of recognizing the client, then verifying the client against a small integrated relational look-up table. If the client device is foreign to the VLEC fixture, a verification request is then sent to a certified and redundant host core recognition service outside the network. This is similar to today's telecommunications networks. The client devices can be activated and de-activated by many forms. One such way involves 2 steps.

Step one is to power on the device. Step two is when the device must be authenticated and validated by the host look-up tables, which will provide permission levels depending on the requirements. The result of an unauthorized device will activate several processes. One, deactivate the client or host device. The second is to relay real-time location information about the device to the proper authorities.

An S-BPL transceiver 200 may be provided to receive and transmit data from/to the S-BPL enabled electrical circuit. The particular interface implemented may vary. Currently a number of existing interfaces could be used, such as Universal Serial Bus (USB), Ethernet, Media Independent Interface (MII), etc, and the particular choice of interface could further depend on the S-BPL transceiver used, as will be apparent to those skilled in the art.

A Digital Signal Processor or the like 231 is provided for program control that can transmit/receive data to/from BPL communication network through transceiver 200. The Digital Signal Processor 231 in an embodiment may respond to commands received on a network through S-BPL coupling 240 to manipulate enable circuitry 204, and may also issue commands or send data to network if needed. If the transmit portion of enable circuitry 204 is enabled, these commands/data will also be passed to the optical link.

Enable circuitry 204, may in one embodiment be enabled to turn on or off the LED optical transmitter 250, as well as change the characteristics of the light, such as brightness and even color mix when multicolor LEDs are used. The Digital Signal Processor circuitry 231 may also manipulate the ability for BPL or any other medium transport known arts of communication network, to send and/or receive data to or from another adjacent optical link. This feature would provide the ability for the VLEC host to act as a client as well.

Driver circuitry 250 and LED(s) 210-214 will pass any signals to any optical link for other devices designed to communicate. Driver circuitry 250 may, in one embodiment, simply be appropriate buffering, isolation, modulation or amplification circuitry which will provide appropriate voltage and power to adequately drive LED emitter 210-214 into producing a visible light transmission. Exemplary of common driver circuits are operational amplifiers (Op-amps), transistor amplifiers and gates and NAND gates, though those skilled in the art of signal conditioning will recognize many of the optional circuits and components which might optionally be used in conjunction with the present invention. Also, it is desirable to use a modulation scheme with the signal so as to provide the intended design of duality as a general lighting fixture. The transmit circuitry may have to provide a means of modulation in this case, also preferably incorporated into driver circuitry 250. The type of modulation will be decided using known considerations at the time of design, selected for exemplary purposes from FM, AM, PPM, PDM, PWM, OFDM, and other derivatives of QAM schemes in the known arts.

Similar to but preferably complementary with the transmission circuitry, receiver circuitry 222 receives data from the optical link detected by photo sensor 220. Receiver circuitry 222 will appropriately amplify, and may further convert a data bearing electrical signal into Binary or Digital pulses. As but one example of such conversion, demodulate circuitry 228 may additionally demodulate a data bearing electrical signal, if the data stream has been modulated by an optical host. A suitable sampling circuitry 226 and discriminator 224 will condition the data bearing electrical signal to yield appropriate and pre-determined information as a received data signal. The data bearing electrical signal is then demodulated and passed onto the DSP circuitry. From here the signal will contain protocol and payload packets that will propagate back onto the BPL Medium infrastructure via known art applications.

FIG. 22 illustrates a sample data packet 260 that might for exemplary purposes be used to communicate data through a preferred VLEC apparatus. Data packet 260 might include a CTS (Clear To Send) header 261, followed by validation 262. The main data content will be carried within payload 263, followed by a destination identifier 264, acknowledge 265, and packet verify 266.

FIGS. 23 and 24 illustrate different VLEC pulsing schemes 270 and 280, respectively, depending upon desired visible illumination levels. FIG. 23 illustrates a series of pulses 271-276 which, if averaged, are generally illuminating an LED through more time than not. The human eye produces a chemical process that averages the amount of light through time to provide descriptive visions interpreted by the brain. With enough pulses of long enough duty cycle, the human eye will discern illumination. The level of illumination can be controlled by amplitude or duty cycle variations, as may be preferred, and selected in such a way as to not interfere with a particular data modulation scheme.

In contrast to VLEC pulsing scheme 270, the ultra-low duty-cycle lighting communications pulsing scheme 280 of FIG. 24 intentionally reduces the duration of each pulse 281, 282 relative to the duration 283 between pulses. This in turn substantially reduces the duty-cycle, and can be used to dim or visibly extinguish an LED, while still providing communications through the LED. When extinguished, the duration of a pulse is shortened just enough to provide space for valuable information and the time between pulses are extended adequately to be undetectable by the human eye.

Ultra low duty cycle lighting technology can work positively by continuing to provide critical data to networks and people. With the appearance of being turned off, the lighting network can continue to communicate information. A second valuable trait is the very low energy consumption of this technology. This can be useful in a power outage, and so might preferably be implemented in combination with the apparatus of FIG. 20. The ability to communicate information in dark rooms is further beneficial as part of a energy conservation effort, since less energy is being used for illumination. Further, if the unauthorized person brings a portable illumination source such as a flashlight, optical detector 220 may detect the additional illumination and signal unauthorized presence.

While the foregoing discussions reference the illumination of a single LED or RGB LED, further contemplated herein is the separate control of a large number of LEDs. In such case, where full illumination is desired, several LEDs may be providing illumination, while a separate LED handles communications. Likewise, in the case of an ultra-low duty cycle demand, communications may be divided among a plurality of LEDs, thereby reducing the on-time percentage required within any individual LED, thereby permitting more data to be transferred without perceptibly increasing the illumination level from an individual LED.

Building management in accord with another embodiment of the invention further includes automated secured access control to apparatus such as doors, drawers, electronic computer operations, thermostats, and any other devices that may be electronically controlled. By means of LED communication, the location of unauthorized devices as well as persons can be tracked or polled by the LED communication system or VLEC system 602. Doors, either locked or unlocked, can be manipulated in response to the location or movement of devices or persons in communication with the LED communication system.

In some embodiments, remote access management (RAM) software 600 will allow accurate monitoring and control of individual VLEC light fixtures 10 from a centralized computing location within a VLEC system 602 equipped building. With the remote access management 600 the VLEC light fixtures 10 may be programmed to turn on/off during specific times of the day, increase/decrease in brightness or compensate for lighting conditions occurring within daylight hours. With these features, a building owner employing the VLEC system 602 may more accurately monitor and manage energy lighting consumption in a building.

In at least one embodiment, a user of a VLEC system 602 may remotely control the lighting and communication environment in a building through automated management features. For example, RAM 600 controlled VLEC lighting will have the ability to actively respond to activity within a building, such as human traffic. With daylight harvesting, RAM 600 may program VLEC light fixtures 10 to automatically reduce lumen output when sunlight is present in a room.

In some embodiments, RAM 600 will broaden the scope of VLEC system 602 services to include other security and communication features, such as centralized visual surveillance 604 incorporating security cameras 36 installed on the VLEC light fixtures 10. Incorporating intercom and facial recognition into such a VLEC system 602 may enhance security within a facility as well as providing intercom announcements directly to an individual within a VLEC system enabled environment.

In some embodiments, the provision of Remote Access Management 600, within a VLEC system 602 may allow local power utilities to integrate with the VLEC system 602 to create total grid management capabilities 606. With smart-grid technology enabled by VLEC system remote management features, a utility company can monitor and stabilize power consumption across one or more power grids. For example, during peak consumption, a utility company may remotely reduce lumen output across a grid by an imperceptible 2% or 3% for a short period of time.

Figure 25:
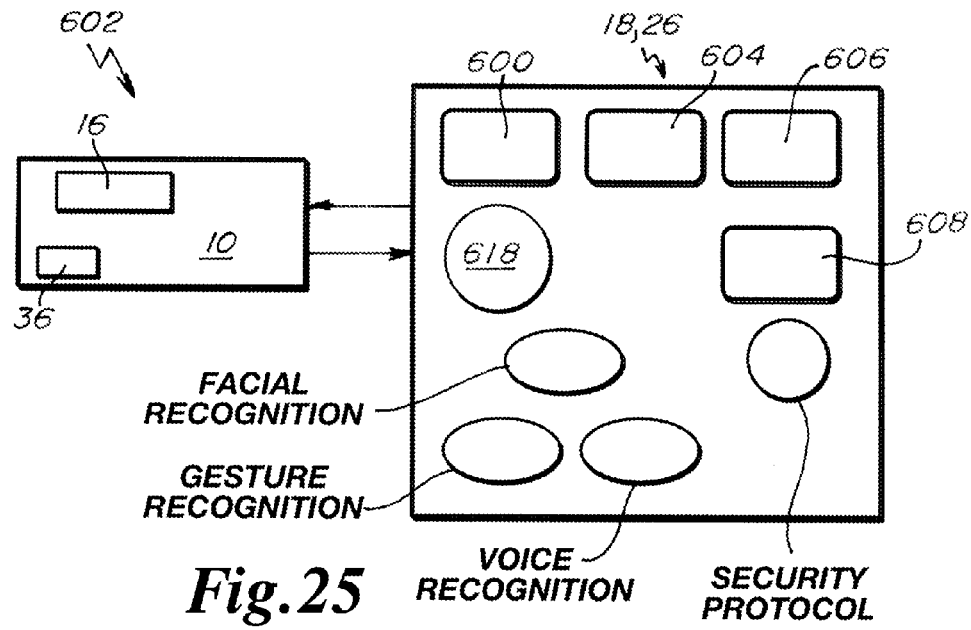
FIG. 25 is an alternative block diagram of an alternative embodiment of the LED light control assembly and system.
Figure 26:
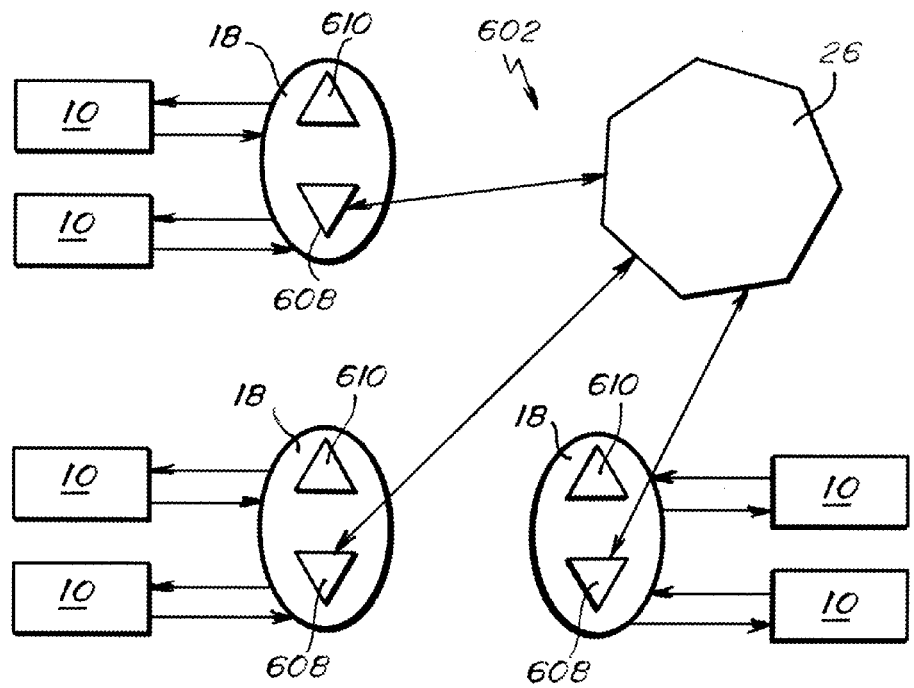
FIG. 26 is an alternative block diagram of an alternative embodiment of the LED light control assembly and system.
Figure 27:
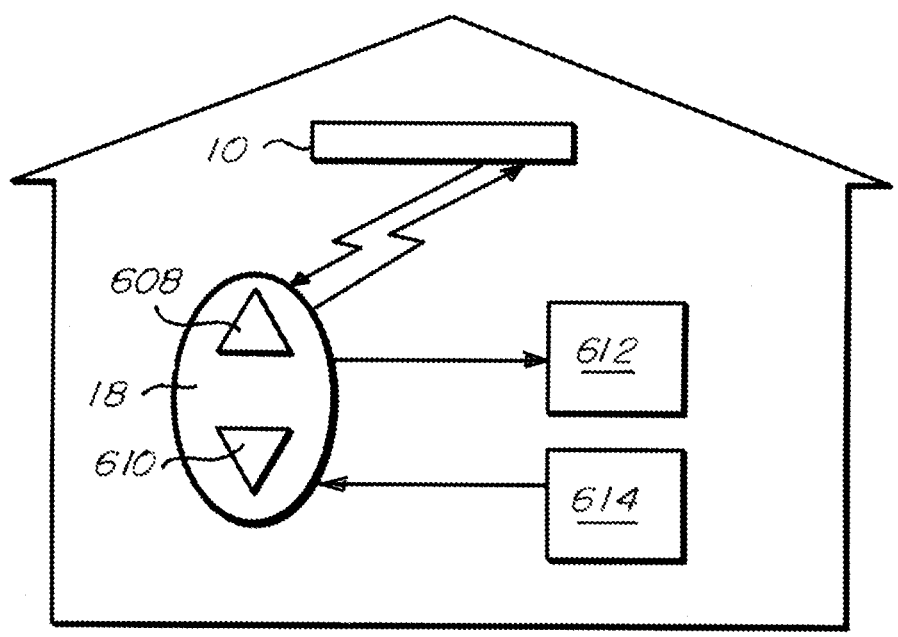
FIG. 27 is an alternative block diagram of an alternative embodiment of the LED light control assembly and system.
Figure 28:
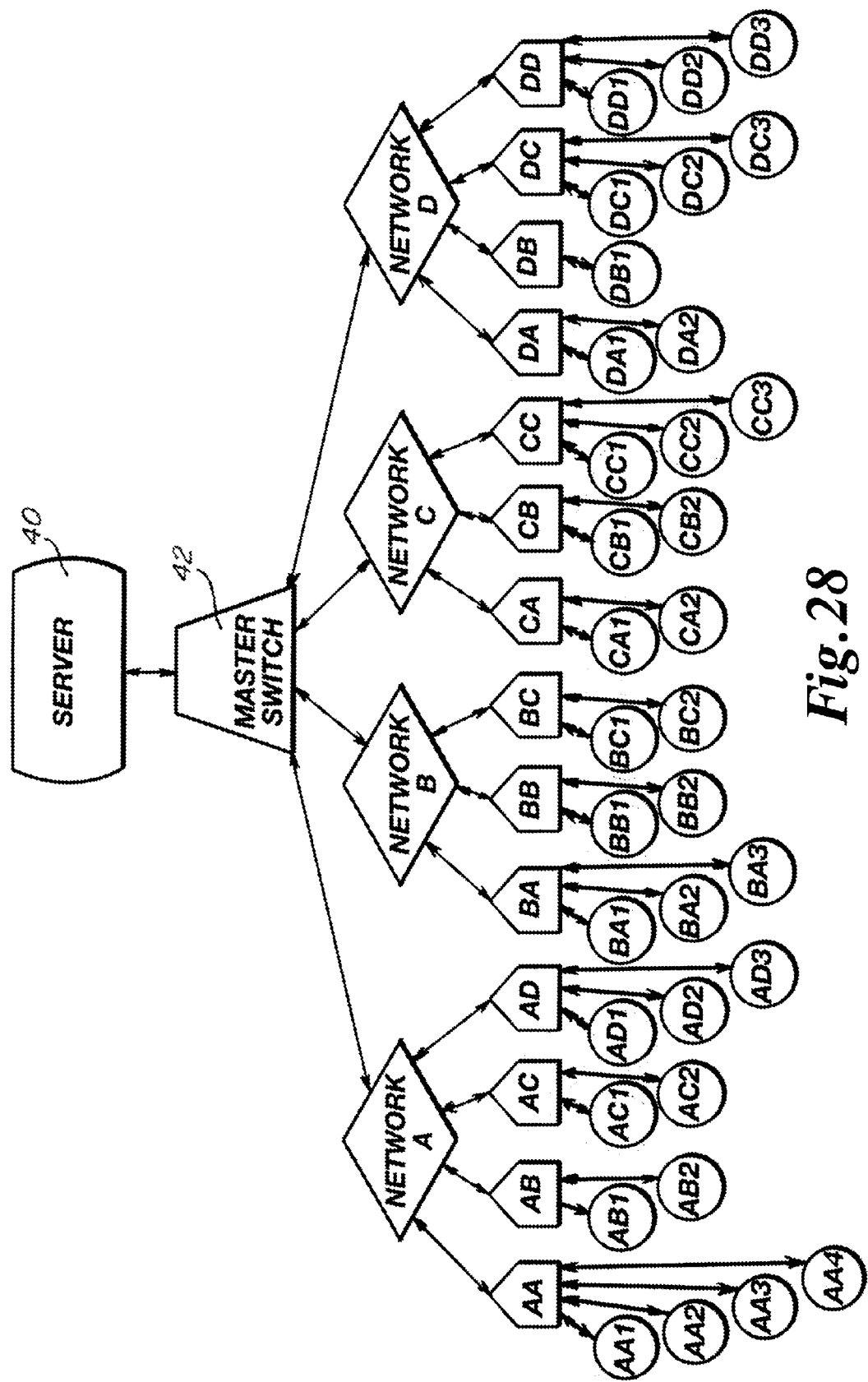
FIG. 28 is an alternative block diagram of an alternative embodiment of the LED light control assembly and system.
Figure 33:
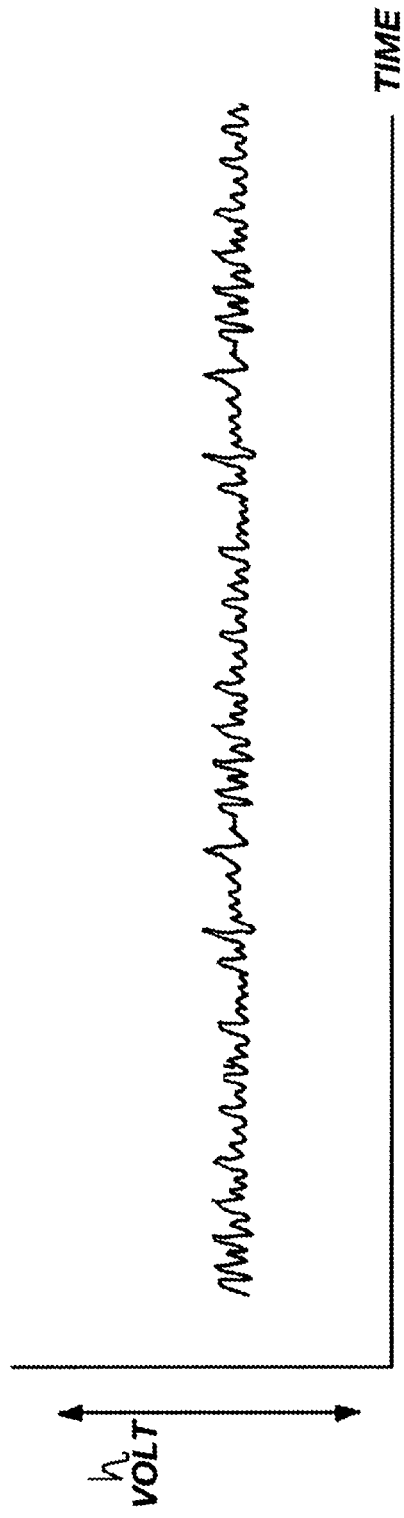
FIG. 33 is an alternative waveform diagram of an alternative duty cycle.
Figure 34:
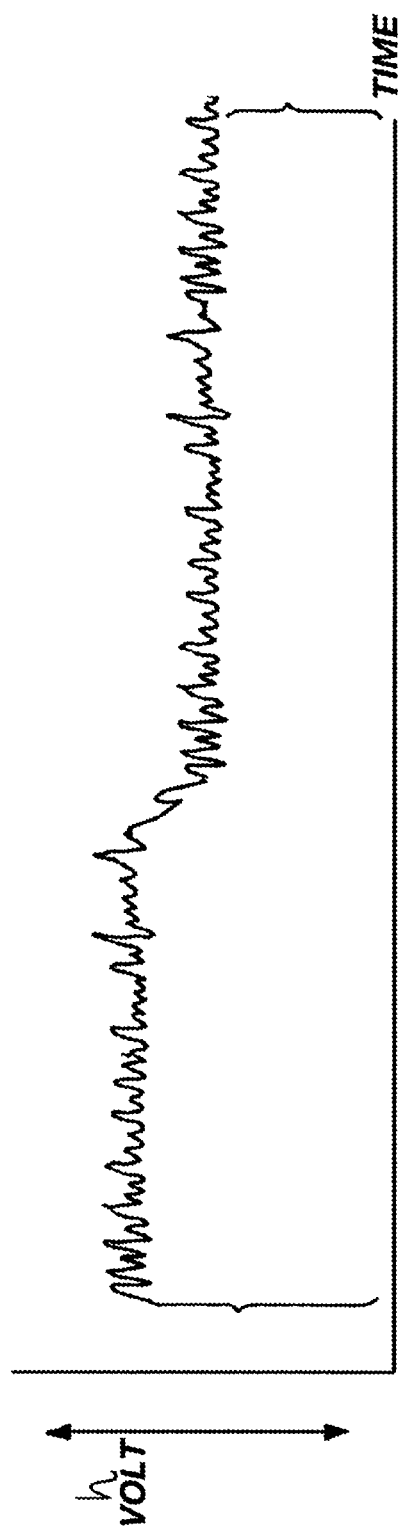
FIG. 34 is an alternative waveform diagram of an alternative duty cycle.
Figure 37:
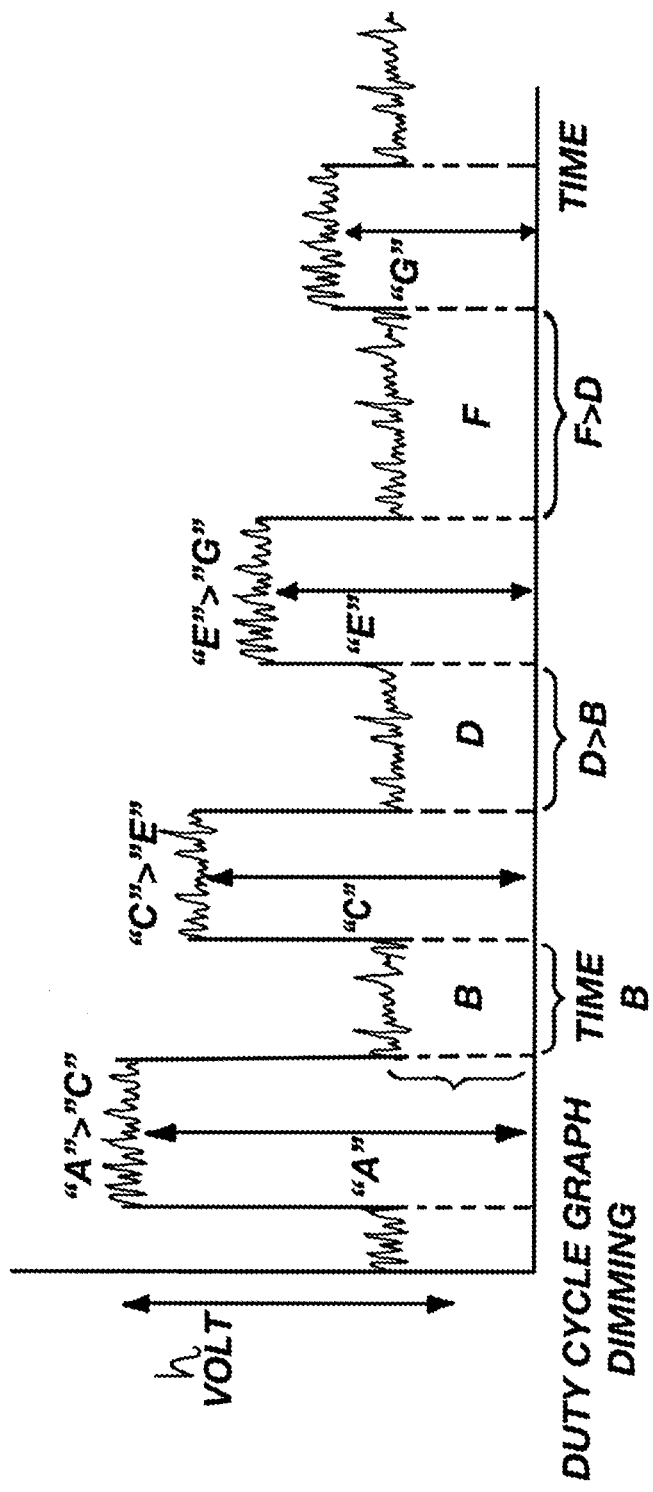
FIG. 37 is an alternative waveform diagram of an alternative duty cycle for the LED light control assembly and system.
Figure 38:
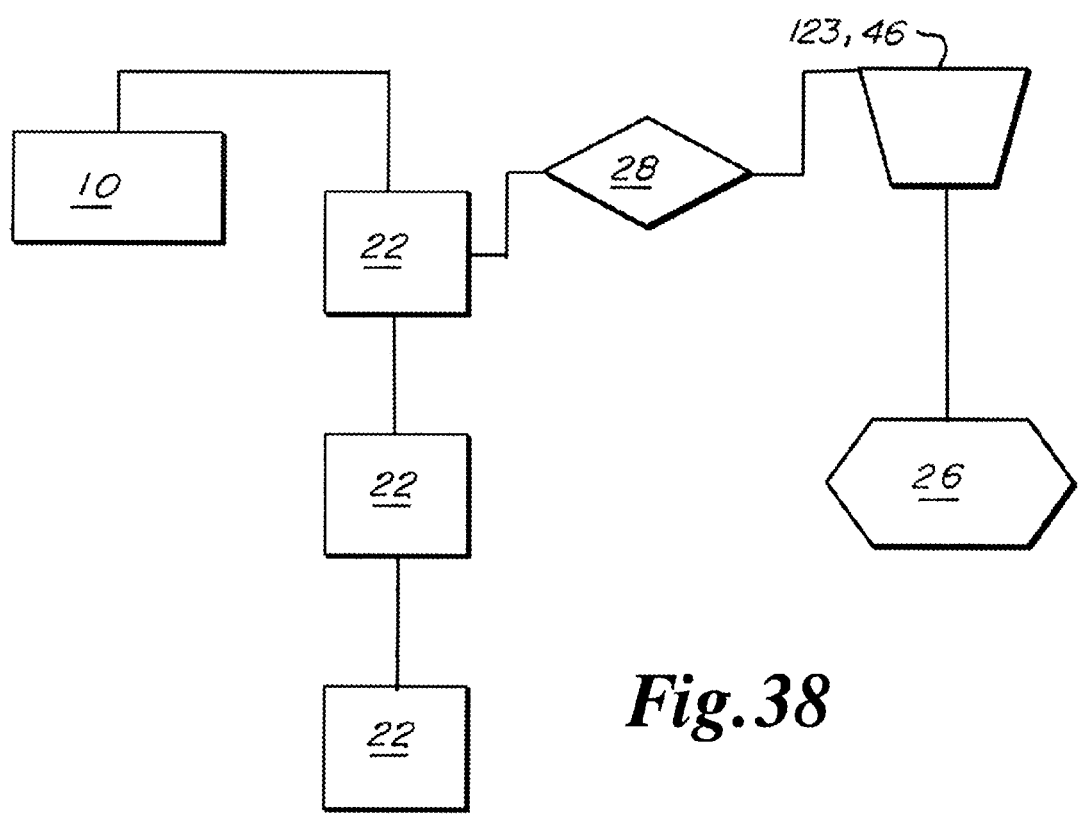
FIG. 38 is an alternative block diagram of an alternative embodiment of the LED light control assembly and system.

A computer located at a remote location such as a facility control unit 18 or a control server 26 may receive/record the data generated in association with the regulation and use of the LED light fixtures 10. The computer may process any number of different transactions. Any data may be retrieved for generation through a website interface 608 for transmission over a power line or through pulsed LED light communication signals via the LED/s or the USB device 12. LED pulsed light communication signals may also be transmitted out of the USB device 12 for receipt by the Charlie unit 16 integral to an LED light fixture 10 for transmission to the facility controller 18 and website 608. It should be noted that a control server 26 may simultaneously receive and process data from any number of websites representative of any number of facilities or geographic areas each having any desired number of fixture controllers 42 and/or LED lights or LED light fixtures 10 (FIGS. 25 and 26).

In some embodiments, the solid state characteristics of LEDs allow enhanced control of energy consumption and light output through automated computer systems. For example, LED lights may be dimmed to provide additional energy savings. Fluorescent lights, by comparison, are not only difficult to dim, but the process of dimming can shorten the life of a fluorescent bulb. In a building incorporating a VLEC system 602, dimming may be controlled via synchronization with environmental stimuli to create a smart lighting environment which actively accounts for sunlight and saves energy by automatically dimming the LED lights within a VLEC light fixture 10 when sunlight conditions allow.

In some embodiments, VLEC lighting systems 602 may allow for further energy management for building owners as well as load management for power utilities. Power companies may have the ability to manage imperceptible reductions in lighting output across entire sections of a building, city block, or power grid. This feature would benefit the power utility and the customers, especially where peak energy consumption is high and energy demand outpaces infrastructural capacity.

The ability to stabilize electrical consumption is important to utility companies, which must build grid infrastructure (i.e. power lines, transformers, generating facilities, etc.) to accommodate peak consumption periods of a day. This peak infrastructure is expensive to build and not efficiently utilized during non-peak consumption hours (when electrical consumption across a grid is significantly decreased). Therefore, stabilizing consumption across a grid is valuable to utility companies reducing the need to build electrical infrastructure. Also, electrical consumption reductions realized when energy efficient VLEC lights are deployed reduces peak infrastructure need.

In some embodiments, the use of a VLEC system 602 and/or network facilitates the monitoring of power consumption within a building, and control of power usage, further stabilizing power consumption across an electrical grid. For example, a VLEC system 602 enabled building with controls integrated into its elevator system may balance intermittent elevator usage and subsequent power consumption with lighting or illumination output. In some embodiments, the VLEC system 602 may recognize when an elevator is in use, and may simultaneously reduce lighting consumption across designated areas of a building by imperceptible quantities, but with the effect of balancing power consumption within the building. In a building with integrated HVAC systems, HVAC consumption may be used to balance power consumption.

In some embodiments, the reduction in lighting output, or power relocations among various pieces of equipment established through the use of the VLEC system 602, would be imperceptible to the unknowing individual, the ability to reallocate power and stabilize electrical consumption within a single building, throughout a full city block, or across an entire power grid would conserve electricity and reduce a utility company's need to build expensive peak infrastructure.

In at least one embodiment, an operating exchange 610 is utilized in association with a pulsed light communication system 602, using LED pulsed light communication signals embedded within illumination generated from LED light fixtures 10. In some embodiments the operating exchange 610 is incorporated into the infrastructure of a building or structure utilizing LED light fixtures 10 and other operating systems. In some embodiments, an individual may speak any language or have any educational background or training, and the individual may be able to immediately and intuitively operate the operating exchange 610 for LED pulsed light and communication system 602 and building operative systems. In some embodiments, the operating exchange is not dependent on culture or gender training or knowledge of an individual.

In some embodiments, the operating exchange 610 is used to control all of the LED light fixtures 10 and operating parameters within a structure or building. In some embodiments, the operating exchange 610 facilitates an individual's ease of use of LED light fixtures 10 and other functions within a building. In some embodiments, the operating exchange 610 may be incorporated into more or less than all of the LED light fixtures 10 or operating systems for a building.

In some embodiments, a computer or webpage 608 on a computer may include drawings, diagrams and/or blueprints of a structure, where the operating exchange 610 permits an individual to manipulate operating systems 612 and controls 614 within a building through activation/deactivation or manipulation through the computer or webpage 608. In some embodiments, an individual may focus on a desired location on a drawing, diagram and/or blueprint in order to access a system control 614 to toggle the system control 614 to a desired setting. The desired location on the drawing, diagram, and/or blueprint may represent electronic switches and/or controls 614 for building operating systems 612. In some embodiments, the switches and/or controls 614 may communicate feedback as to the current status of a system setting. In some embodiments, the drawings, diagrams and/or blueprints as included in a computer include markers/identifiers such as rectangles or other shapes which represent LED light fixtures 10 or groups of LED light fixtures 10 or other systems 612 or system controls 614. In some embodiments, the computer may also include indicators as to operational performance such as the amount of electricity being used or the setting of a system such as operation at a maximum or high level, as opposed to operation at a low setting.

In at least one embodiment, the operating exchange 610 includes indicators as to the setting and/or operational status of building systems or features such as LED light fixtures 10, or other building operating systems 612, such as a thermostat.

In at least one embodiment, the operating exchange 610 includes indicators for LED light fixtures 10 such as the color, or color setting, for LED's within the LED light fixtures 10. In some embodiments, the color of the LED's within the LED light fixtures 10 may vary.

In some embodiments, each building including LED light fixtures 10 also includes a computer having a map of the location of each of the LED light fixtures 10, where each LED light fixture 10 includes a unique location identifier 24 which may have GPSRS Global Positioning System Routing System information.

In some embodiments a controller which may be a fixture controller 42 is used in association with each individual LED light fixture 10 and in other embodiments one or more facility control unit 18 are engaged to any number of fixture controllers 42. Combinations of fixture controllers 42 and facility control units 18 may be utilized in any structure and variations of configurations may be utilized dependent on installation requirements within existing structures, new construction, renovation, remolding, and/or upgrading of elderly structures.

In some embodiments it is anticipated that one or more LED light fixture controllers 42 and facility control units 18 may be utilized in electrically independent environments such as facilities which have an independent electrical source such as a wind turbine. In these situations the LED fixture controllers 42 and facility control units 18 may independently calculate, or may be in communication with a control server 26 to calculate lumen consumption, data lumen hours, and/or data lumen minutes or combinations thereof for billing directly to a data lumen hour consumer.

The fixture controllers 42 include pulsed light communication LED's, photodetectors in order to communicate the sensed status of the feature or function for communication to the facility control unit 18 through the use of pulsed light communication signals. In alternative embodiments a sensor may be integral with or in communication with the feature or function under consideration, and the feature or function may include LED's, photodetectors and control units in order to communicate the sensed status of the feature or function directly to the facility control units 18 through the use of pulsed light communication signals, or alternatively through one or more intermediate pulsed light communication locations or devices, without the use of wires integral to the sensors.

In some embodiments, variables used to calculate lumen consumption may include the age and type of existing wiring for a structure if the same is to be used in the generation of LED illumination and pulsed light communications, or the necessity for new wiring for a structure. LED light fixture replacement and compatibility for substitution of an LED light fixture panel for an existing light fixture, and any electrical or structural modifications may also be variables to be included in lumen consumption calculations.

In some embodiments, three or more LED light fixtures 10 in an adjacent room may be controlled by a wire electrically connected to a fixture controller 42. Pro FTM signals, called the data, may ride over the wire simultaneously with the provision of power. In some embodiments, modules on the LED light fixture 10 decode pulsed light communications information. In some embodiments, the LED light fixture 10 receives OFTM signals and converts the signals into an Ethernet standard computer format which then may be injected down into a facility control unit 18.

In some embodiments, the facility control unit 18 and/or each control element includes a processor, or controller which includes a security protocol to restrict activation or a change of status of a facility setting until such time as a security protocol has been satisfied. Any security protocol may be communicated directly through pulsed LED light communication signals, or through an intermediate pulsed LED light communication hub, or via an electrical signal passed over a wire.

In some embodiments, the processor/controller 16 in communication with each fixture controller 42 receives control signals, activation signals, or change of status signals which were generated from a facility control unit 18, or other remotely located control server 26, or other system server. In some embodiments, the processor/controller 16 is in communication with each fixture controller 42 which may generate a device or operational status signal to be received by a facility control unit 18, remotely located control server 26, or other system server. The device or operational status signal in some embodiments is generated and transmitted by pulsed LED light communication signals.

In other embodiments, functions such as microphones 38 and speakers 40 may be regulated as well as cellular telephones if equipped with a pulsed light communication interface such as a dongle or key device 12. In some embodiments, cellular telephones may be deactivated within a building through manipulation of the virtual cyber-building control items.

In at least one embodiment a facility control unit 18 is in communication with the LED XCVR light fixtures 10 within each facility, where the facility control unit 18 aggregates all connections from LED light fixtures 10 back through one or more power units 22 or power unit controllers 28 for communication to a control server 26 through use of the internet.

The status of a particular feature or function may be communicated to the facility control unit 18 or controller by pulsed light communication signals from LED's and controllers as integral to, or in communication with the features or functions under consideration. In alternative embodiments a sensor may be integral with or in communication with a feature or function under consideration. The feature or function may include LED's, photodetectors and controllers in order to communicate the sensed status of the feature or function directly to the facility control unit 18 through the use of pulsed light communication signals. Alternatively, the sensed status may be communicated through a fixture controller 212 or one or more intermediate pulsed light communication locations or devices, without the use of wires integral to the sensors.

In at least one embodiment, information as related to electrical usage may be measured, collected and/or calculated and stored in the memory of the facility control unit 18 or controller. The facility control unit 18 or controller may periodically communicate the measured, collected and/or calculated electrical usage to a control server 26 which may be remotely located relative to the facility. The control server 26 may process electrical usage and generate bills from a billing system 618.

In some embodiments, the facility control unit 18 is in communication with, and transfers information and data to a control server 26 which may be a mainframe computer which may be located at a remote location. One or more facility control units 18 may be utilized to access account specific information on site or to control communications, illumination or other functions within a facility.

In some embodiments, information may be retrieved at a facility control unit 18 such as accounts receivable, accounts payable, general ledger, and/or expenses for a desired period of time. In some embodiments, an accounting system may be run remotely and may be communicated through the LED pulsed light communications. One or more facility control units 18 may be utilized to access account specific information on site or to control communications, illumination or other functions within a facility. In some embodiments, the facility control units 18 receive information, data, and/or communications by pulsed light communication signals generated from the LED light.

In some embodiments, a room may include any number of LED light fixtures 10. Each LED light fixture 10 may be operating the same, or have a different setting resulting in different operation. In at least one embodiment, the data lumen hours or minutes for each LED light fixture 10 may be recorded or regulated independently with respect to any other LED light fixture 10. A composite amount of data lumen hours or minutes may be calculated from the independent LED light fixtures 10 and communicated to a facility control unit 18 or a control server 26.

In at least one embodiment, two physical servers are provided as facility control units 18 or mainframe servers which are configured to be identical for redundancy. In some embodiments, VHM (Virtual Host Machines) A and B may be duplicate physical control servers 26 at a facility or remote location. Each VHM server may have the VMware operating system, allowing for numerous VPS (Virtual Private Server)

to reside on each VHM server. The VPSs on VHM-A are exactly duplicated on VHM-B for redundancy.

In some embodiments, a VPS may use a CentOS operating system and run Apache Web services. The VPS may also include a database (currently MySQL). In some embodiments, the VPS may be used for the web site that provides remote control of VLEC light systems.

In some embodiments, the VPS monitors the VLEC light systems.

In some embodiments, the VPS may be copied for use as a FMU or Facility Management Unit which may be used to monitor and to control a facility.

In at least one embodiment a facility control unit 18 is in communication with each facility where the facility control unit 18 aggregates all connections from LED light fixtures 10 back through one or more power units 22 or power unit controllers 28 for communication to a control server 26 through use of the internet. The control server 26 may be called a facility management unit or a unit controller and comprises a computer. The control server 26 may include a web server and a website 608. The website 608 allows an individual to control the LED lights or LED light fixtures 10 and to monitor how much energy is being used. The website 608 may also regulate at least one security authorization which may be logon criteria including passwords and user verifications or other desired security measures. Following logon an individual may control the lights of a facility. An individual may use the website 608 to issue commands to the individual power units 22 in order to activate or deactivate LED lights or LED light fixtures 10 or to change the intensity or the color or the timing of the LED lights or LED light fixtures 10 to be on or off in a preset schedule or on an as needed basis.

The facility control unit 18 may also include feature program presets. The facility control unit 18 may also include image and/or sound recordings and/or camera 36. In at least one embodiment the control of facility features and functions occur over communications transmitted as pulsed light communications from LED light fixtures 10 and photodetectors which are constructed and arranged to receive, and to generate, pulsed light communication signals. In at least one embodiment, the facility control unit 18 includes facial recognition software, voice recognition software or other types of recognition software to name a few.

In at least one embodiment the features or functions of a facility may be run through cycles or stages, or tests may occur through commands communicated by pulsed light communications. The status of a particular feature or function may be communicated to the facility control unit 18 or controller by pulsed light communication signals from LED's and control units 16 as integral to, or in communication with the features or functions under consideration.

The features or functions of the facility may include LED light fixtures 10 which may include a plurality of LED's, and the LED's may be individually controlled by the facility control unit 18 or controller through the interface of the facility website 608 which will communicate commands through pulsed light communication signals. In some embodiments the facility website 608 and facility control unit 18 or controller may communicate to an individual detailed status information and/or settings for all of the possible connected lights, features, and/or functions within a facility.

In at least one embodiment the website 608 includes a user interface that allows an individual to control the LED lights or LED light fixtures 10 or to activate the light switches on the wall at specific desired locations or to activate other building systems.

In one embodiment a wire may be run to specific locations within a facility where the ends of the wire include sensors to sense the current status or setting of an LED light, LED light switch, or status of a building function such as a light, thermostat, door, elevator, lock, camera, speaker, microphone or any other type of feature which may be sensed, manipulated, monitored or controlled. The sensed status is displayed on the website 608 for the facility. The facility control website 608 may include a touchscreen to monitor and to manipulate switches or to alter the status of a facility feature. The facility control website 608 facilities the selection of one or more, or all, of the features to control, and via the website, screens regulate the functions of the facility through the website interface. In certain embodiments an individual may control all lights simultaneously for both warm and cool light settings, or settings in between warm or cool, or an individual may control the warm or cool settings individually through the use of sliding features on a touchscreen, which may be used to change the intensity of the LED lights.

In some embodiments the control page of the website 608 enables an individual to establish and to set up programs for control of features and/or functions or lights for an individual room, were specific lights over a cubicle or other area are controlled remotely by the facility website 608 and facility control unit 18 or controller.

An individual having the correct login, password and security information may access the facility webpage interface 608 from any remote location where internet access is available, in order to regulate or control the functions or features of a facility. An individual may control the lights or other functions or features with the preset settings, or the individual may selectively set the lights, function, or feature so long as the individual has an internet connection, which may be provided by a dongle or key device 12 including a photodetector and LED's for communication through pulsed light communication signals. In some embodiments, access to the facility webpage interface 608 may occur through the use of a desktop computing device, a transportable or laptop computing device, a cellular telephone device, a tablet computing device or any other communication device providing communication over the internet.

Logging onto the website 608 may establish access to a multi-facility management unit control page. The website interface 608 may show all of the power units 22 that are in a facility and all other LED light fixtures 10 or other features of the facility or plurality of facilities. An individual may select which power units 22 to control or an individual may select all of the power units 22 for control. An individual may alternatively activate select individual LED lights or LED light fixtures 10 to change light intensities. In at least one embodiment the website 608 includes a user interface that allows an individual to control the LED lights or LED light fixtures or to activate the light switches on the wall at specific desired locations.

In another embodiment, the website 608 will have programmed presets alternating warm light and cool light to provide a difference in the color intensity during illumination within certain locations inside or exterior to a structure at pre-selected times.

The website control interface enables control each individual light fixture 10 or LED light emitting diode. The website 608 may communicate or receive detail information to or from a power unit 22 regarding the settings and status for all 16 of the possible connected light fixtures 10 and usage of each LED light fixture 10 or LED light emitting diode.

In some embodiments, all of the information related to wattage used in a pulsed light communication system may be collected on the power unit controller 28. A control server 26 may be set up at a remote location that will retrieve power/wattage usage information from the power unit controller 28, and enter the information into one or more servers 26, where the information communicated to and processed by a billing system 618 for generation of bills to users of the LED light fixtures 10 for consumption of illumination, pulsed light communications, data lumens per hour, or data lumens per minute or other measurement unit.

The website interface 608 may also provide access to data of particular vendors or customers to provide a status of LED light fixtures 10. Functions such as accounts receivable, accounts payable, general ledger, may be assessable through the offsite control server 26. For example, the accounting system may be accessible remotely through the LED light fixtures 10, USB device 12 and Charlie units 16 which are capable of sending and receiving pulsed LED light communication signals.

In some embodiments, the website 608 provides a multi-facility management unit control page within each facility where the website 608 enables control of individual LED lights and/or LED light fixtures 10. The controls of LED light fixtures 10 may be provided by the use of touchscreen sliders which may regulate the intensity or color of the LED lights.

In one embodiment, light switches may be mounted in a wall and a wire may be run to sense pins on the power unit controller 28, enabling activation of a switch controlling the light panels. A touchscreen monitor may be in communication with the power unit 22, power unit controller 28, and/or website 608.

In some embodiments, all of the usage information as far as the wattage used may be collected on the power unit controller 28.

In some embodiments, a power unit 22 is used in association with a facility control unit 18. Each power unit 22 may support up to sixteen light fixtures. Power units 22 may be daisy-chained together. Each power unit 22 may also accommodate hard wired wall switches, or touch panels for direct control of fixtures.

In some embodiments, a Power Unit Controller (PUC) 28 is located at a datacenter of the facility, where an internet connection is available. If there will be more chains of power units 22 connected to the PUC 28 than there are Ethernet ports available, then a switch may be placed between the PUC 28 and the power units 22. The PUC 28 may control DHCP functions for communications. The PUC 28 also controls and monitors the LED light fixtures 10 by SNMP communication with the power units 22. The PUC 28 accumulates usage data from the power units 22, which is periodically retrieved by the monitoring control servers 26. The PUC 28 may contain a web server, with a website 608 for controlling and programming the VLEC light fixtures 10. This control website 608 will be available from any device that can display web pages {i.e. phones, tablets, computers, etc.}, provided the proper authorization is set up for a device or user.

Current available network security and authorization techniques can be used to ensure access is limited appropriately.

The monitoring control servers 26 may include databases that accumulate usage statistics for all the PUCs 28, power units 22, and VLEC light fixtures 10. The monitoring control services 26 may have an interface that allows operators to check the history and status of infrastructural apparatus or use of infrastructural apparatus. The monitoring control servers 26 may be configured to initiate alarms when there are issues with any hardware in the field, and/or network connectivity to that hardware. In some embodiments, the provider of the VLEC system is made aware of a problem immediately when it occurs, possibly even before the customer is aware of a problem.

The monitoring control servers 26 may also perform the necessary calculations on the accumulated data to provide the appropriate billing information to the billing system 618.

The power unit 22 may be housed in a rectangular box having a plurality of RJ-45 plug in slots which include a controller. This power unit 22 consists of a power supply, an injector board which has the sixteen ports for POE connections to the lights and also a switch, such as a Cisco switch, which is integrated into the power unit 22.

In some embodiments, the PUC 28 may record how many watts are being used on each preset and the electrical usage such as 158 watts to generate light. The PUC 28 may provide a test mode which runs the lights through stages, where the lights cycle through warm light and cool light, off and back on, to confirm functionality. The power unit 22 in some embodiments provides 600 watts of power to the light panels.

In some embodiments the control server 26 polls the power unit controller 28 and/or power units 22 at regular intervals to received usage data. Data monitored by the power unit controller 28 and/or power units 22 and communicated to the control server 26 include but is not necessarily limited to frequency, voltage, current and usage of each LED, string of LED's or groups of LED's. In some embodiments, LED light fixtures 10 may include one or more strings of cool white LED's and warm yellow LED's. In some embodiments each power unit 22 may be in electrical communication with up to thirty two strings of LED's.

In some embodiments, the power units 22 gather data every second and the power unit controllers 28 gather data from the power units 22 every second, or on another regular basis. The control servers 26 perform calculations on the data to convert watts used to data lumen hours consumed where the calculations are then stored in memory prior to billing. In some embodiments, the raw data and the data lumen hours calculations are communicated and stored on a redundant or back up server.

In some embodiments the calculated data lumen hours are communicated to another computer for aggregation, processing and billing. The information related to composite aggregations processing and billing of data lumen hours may also be stored on a separate computer for redundancy.

In some embodiments, a fixture controller 42 may include a meter 620 or a supplemental meter 622 to record lumen generation and/or pulsed light communication data usage. In some embodiments a supplemental meter 622 may be used between a fixture controller 42; a facility control unit 18; and/or a controller server 26 on a structure to minimize or to eliminate the necessity to rewire an existing structure. In some embodiments, a supplemental meter 622 which may include a supplemental recorder may accumulate data from a plurality of LED light fixtures 10 and/or fixture controllers 42 within a structure.

In some embodiments, a monitoring or a metering board may be located underneath the switch that meters the amount of electricity used.

In some embodiments, a facility may have two or more electrical meters 620. A first electrical meter will be a meter from an electrical provider such as a power company or other electrical source. A second meter will be a meter for recording and/or calculating illumination and data lumens per hour or minute consumption. The second meter would transmit the accumulated information and data concerning data lumen hours to the control server 26 for processing, to calculate compensation due from a customer for the usage of the data lumen hours for illumination and data communication.

In at least one embodiment, sub-meters are used in the conversion of an existing structure or facility to the use of LED pulsed light for illumination as well as data transfer and communications. In existing construction, in some embodiments, each LED light fixture may include a sub-meter which in turn may be in communication with either a fixture controller 42 or a facility control unit 18 where each sub-meter collects data related to data lumen hours or data lumen minutes from each light fixture 10. The information of data lumen generation/consumption from each LED light fixture 10 may be accumulated and communicated to a control server 26 for processing and generation of an invoice to a customer regardless as to the external or internal source of electricity provided to the individual LED light fixtures 10.

In at least one embodiment, a control server 26 will provide a means to control lighting apparatus of a facility while simultaneously enhancing and redefining security systems, facility operational systems, security cameras, public address systems as well as other systems within a building/facility.

In at least one embodiment, the control server 26 includes data tables and algorithms which process received recorded data from the fixture controllers 42 and/or the facility control units 18 which are used to generate a return signal to the facility controllers 42 and the fixture controllers 42 to adjust electrical input into the LED light sources to optimize the generation of lumens and pulsed light data communications.

In at least one embodiment the stored data within the data tables and algorithms will be directed to optimization of variables as identified herein some of which being color; intensity levels, degradation as a result of time or use; historic usage as well as other variables. In addition, the control server 26 includes data tables and billing algorithms which are used to process data and information received from the fixture controllers 42 and/or the facility control units 18 to generate and calculate the data lumen hours and/or data lumens per minute utilized at a facility, and to generate a periodic customer invoice for the customers consumption of the data lumen hours, data lumen minutes, data usage, and/or illumination usage at a particular LED light fixture or facility or other designated geographic area or location.

In some embodiments, a control server 26, facility control unit 18, and/or fixture server 42 permits an individual to simultaneously engage in a plurality of activities such as internet access and usage during a pulsed light communication, such as a video and/or verbal communications between individuals.

A control server 26 located at a remote location may include/record the data generated in association with the regulation and use of the LED light fixtures 10. The control server 26 may also process any number of different transactions. Any data may be retrieved for generation through the website interface 608 for transmission over a power line or through pulsed LED light communication signals via the LED/s or the USB device 12. LED pulsed light communication signals may also be transmitted out of the USB device 12 for receipt by the Charlie unit 16 for transmission to the control server 26 and website 608. It should be noted that the control server 26 may simultaneously receive and process data from any number of websites 608 representative of any number of facilities or geographic areas each having any desired number of fixture controllers 42 and/or LED lights or LED light fixtures 10. In some embodiments, the control server 26 is a mainframe computer.

In at least one embodiment the control server 26 measures and/or calculates the photons of light used as illumination and as emitted in pulsed light communications. The control server 26 may also measure and/or calculate the data exchanged in association with the lumens generated through the provision of illumination and pulsed light communications. Lumens, photons and data transmitted by the LED's in association with the generation of illumination and pulsed light communications may be measured and identified in units of measurement such as data lumen hours or data lumen minutes to name a few. The lumen consumption for a customer may be dependent on any number of variables, some of which may include the age of one or more LED's; the efficiency of one or more LED's; the resistance across one or more LED's; the color of the illumination exiting the LED's; the past history of use of the one or more LED's; the volume of data transmitted by the one or more LED's; the past history of use and/or nonuse of the LED's, as in the total duration that the LED's have been off; the number of times that the LED's have been turned on or off; the lumen intensity changes to the one or more LED's; and/or in combination the setting and the historic settings for the voltage duty cycle for the one or more LED's.

In at least one embodiment the method for the provision of lumens to a customer may include regional considerations as well as residential considerations in pricing as related to the simultaneous provision of lumens as illumination and pulsed light communications to a customer. In addition, in at least one embodiment a particular room within a residential structure may include a controller 20 having an awareness of location and function within an overall structure lighting and communication system.

In some embodiments, the calculation of lumen consumption will include an assessment of variables which may be present for an LED light which may vary in intensity, vary in proficiency level, vary in degradation, vary in color such as LED's produced in yellow which are less efficient as compared to LED's produced in white, where these and other variables are interrogated or received by the controller 20 or control server 26. In some embodiments, the control server 26 has the capability to send a signal/instruction back (or upstream) to the controller 20 in communication with a particular light fixture 10, in order to adjust the LED light fixture 10, to alter the level of electricity to be provided to the LED light fixture 10, to modify or enhance lumen output, or regulate performance. In turn, the control server 26 will calculate the previous lumen generation/consumption and the adjusted lumen generation/consumption for inclusion within client invoices to be paid by the customer to the lumen provider. In some embodiments compensation for an amount of electricity is paid to the electrical provider by the lumen provider on behalf of the customer. In some embodiments the customer receives invoices for the generation of data lumen hours, data lumen minutes, or some other quantity of lumen consumption/generation where data lumen hours or minutes includes usage of light for illumination and/or data or information transfer or communication.

In some embodiments lumen hour production may be calculated by metering or net metering of either light or electricity. In some embodiments the calculation for compensation for data lumen hour consumption may include calculations derived from metering, net metering and multipliers associated with the variables as identified herein, and/or other variables which affect lumen and pulsed light communication output such as the volume data usage.

In some embodiments, the LED lights change intensity, turn on and off, and change color. Each of those factors use a different amount of electricity and produce different data characterized as a data lumen hour.

In one embodiment, the invention is directed to the sale—resale of light and how the light is sold. In at least one alternative embodiment, the invention is directed to how the sale or resale of the light is calculated especially in circumstances in which a light will vary in intensity and/or has different efficiency levels depending on time of production and use. In some embodiments, yellow colored LED's are less efficient than white LEDs. In at least one embodiment, all of these different factors and variations are calculated by a microcontroller which is ultimately being interrogated by a computer/server to process the data related to the variables and to generate calculated sums to be used in billing algorithms or processing on a billing computer. In at least one embodiment, the computer/server calculates the data lumen hours 34, and/or data lumen minutes or other periodic measurement unit. In at least one embodiment of the invention, data lumen hours are produced, metered and sold.

The use of electricity from an electrical source to produce photons of light may initiate from an external source such as a power company or an internal source which in one embodiment may be a wind turbine or other electricity generating source.

In at least one embodiment, a customer of the light photons will be responsible to provide compensation for and/or installation of the LED light fixtures 10. In at least one alternative embodiment, the method to provide data lumen hours will occur through taking over a customer's entire power bill with an electrical provider.

In an alternative embodiment, the method to provide data lumen hours will occur through use of an outboard meter in electrical communication with the LED light fixtures 10, and the communication to a power company of data from a sub-meter for the calculated data lumen hours as a second invoice. A client will tender a payment for general use of electricity, and electricity for specific use in generation of data lumen hours as processed within a control server 26. In this embodiment, the electricity provider would need to accept the data/information from the sub-meter for billing to an electrical consumer.

In at least one embodiment, a separate and distinct data lumen hour meter will be connected to a discrete circuit for the LED light fixtures 10.

One problem with the use of data lumen hours occurs with respect to installation in existing construction without renovation.

In at least one embodiment, it is difficult to use a meter 620 or sub-meter 622 and to chase or track existing wiring through the building to a discriminating box in order to use a meter or sub-meter to measure data lumen hours. Data recorded at each supplemental or sub-meter 622 may be assimilated and combined to formulate and calculate data lumen hour usage and an amount of compensation to paid for the data lumen hour consumption.

In at least one embodiment, in existing construction, a large centralized switch may be provided having a meter 620, and a plurality of sub-meters 622 may be electrically connected to, and in communication with, the centralized switch where each sub-meter may measure data for calculation of data lumen per hour consumption.

In at least one embodiment, a sub-meter is positioned proximate to an LED light fixture 10. In other embodiments, a sub-meter 622 may be at a distance removed from an LED light fixture 10. In some embodiments, a sub-meter 622 may be electrically connected upstream and/or downstream, from each LED light fixture 10 and either one or both of the sub-meters may be proximate to, or spatially removed from an LED light fixture 10, in any combination without restriction.

In at least one embodiment, a sub-metering function may be utilized on a per LED light basis, within each LED light fixture 10, and in other embodiments, the data collection function may be incorporated as a feature of a "smart LED" used in an LED light fixture 10. In at least one embodiment, a digital potentiometer may be used with each LED light fixture 10.

In some embodiments, metering may occur through interruption of a switch which may be electrical or mechanical connected to the ground, or based on load.

In at least one embodiment, a meter 620 or sub-meter 622 collects data concerning electrical consumption before and after an LED light fixture 10 in a manner similar to the measurement of electrical resistance across the LED light fixture 10, and a calculation will occur because a certain amount of electrons will be converted to photons. In other embodiments, a meter 620 or sub-meter 622 may include a light sensor with a meter to measure light output.

In some embodiments, the measured or calculated light output will vary based on individual LED light source efficiencies including the level of operation and color. The measured data may be compared to known tables of data over time to provide the measured or calculated value for data lumen hours.

In some embodiments, variables used in calculation of data lumen hours or minutes include varying illumination intensity, varying LED light intensity, the color of the LED's, the frequency of the duty cycle for the LED's during operation; the periods of time that the LED's are on or off; the frequency service; the electricity provided to the LED's; the adjusted electricity provided to the LED's, the type of LED's; the manufacturer or the LED's and the volume of data communicated through the LED's to name a few. In some embodiments, another variable in the consideration of a data lumen hour is the geographic location of the LED light fixtures. These and other variables when considered and summarized yield a different amount of data lumen hours/minutes for individual LED's as well as LED light fixtures 10.

In some embodiments, the calculation of data lumen hours 34 may also include an initial activation fee which may be invoiced separately or financed into the expense of a data lumen hour.

In at least one embodiment, a calibration meter may be used in the calculation of data lumen hours or data lumen minutes. The calibration meter may be used to compare a threshold value as stored on the control server 26 representative of a minimum level of performance for LED's on an LED light fixture 10. The calibration meter may be used to identify with an individual LED failure or an LED light fixture 10 failure. Identification of a failure in turn results in the issuance of a signal from either the fixture controller 42. Facility control unit 18, and/or control server 26 to re-route pulsed light communications to isolate and create an alternative route around the identified failure. In some embodiments the calibration meter may be either between the fixture controller 42 and the facility center unit 18; between the Charlie Unit 16 and the facility center unit 18; between the Charlie Unit 16 and the control server 26; between the fixture controller 42, and the control server 26; and between the facility central unit 18 and the control server 26. In some alternative embodiments the calibration meter may be either upstream or downstream from a power unit controller 28.

In some embodiments a user may select the quality of illumination to be provided to an area or facility. In some embodiments the selection of a higher quality of color if light will result in an increased data lumen per hour or minute expense. In some embodiments it will be in the discretion of the user to balance quality and/or considerations provided as illumination against the expense associated with higher quality color as calculated as DLh or DLm.

In some embodiments, the types of electrical devices 30 to be regulated by facial recognition of images captured by the camera 36 as engaged to an LED light fixture 10 include but are not necessarily limited to HVAC systems, computers, speakers, intercoms, microphones, lights, fans, personal computing devices, portable computing devices, and/or cellphones, to name a few.

It should be noted that in some embodiments that the environment to be regulated by the controller using the facial recognition of images may include any desired configuration or combination of variables as identified herein or as available for regulation by manipulation of an electronic device 30. In some embodiments, the controller may regulate any combination of a plurality of light fixtures or LED light fixtures 10 to maximize the utility of an environment which simultaneously minimizes electrical cost. In some embodiments, the controller using the facial recognition software may also include preset configurations for activation, deactivation, color, brightness, or dimming of illumination in any combination.

In some embodiments, the fixture controller 42 or facility control unit 18 may record how many watts of electricity are being used on a preset environmental setting and the electrical usage such as 158 watts to generate light. The LED light fixture 10 or facility control unit 18 may provide a test mode which runs the lights through stages, where the lights cycle through warm light and cool light, off and back on, to confirm functionality. The website control interface 608 enables control of each individual light fixture 10 or LED light emitting diode.

The fixture controller 42 or facility control unit 18, website 608, and/or interface enable the selection or customization of programs for individual areas or rooms, individual groups of lights or specific lights, or areas such as over a cubicle or other location. All of the information related to wattage used may be collected on a power unit controller 28. A control server 26 may be provided at a remote location which will retrieve power/wattage usage information from the power unit controller 28, and enter the information into one or more servers, where the information may be communicated to, and processed by, a billing system 618 for generation of bills to users of the LED light fixtures 10.

In some embodiments, an electronic device 30 may include memory to record data, usage, or communications occurring through the dongle device 12. The electronic device 30, may transfer in real time, or at a future date to a control server 26, data or communication usage so that tables related to geographic location, duration of time, and other variables may be processed in association with one or more algorithms to determine a billing cost to a user. An algorithm may be utilized to calculate and to translate usage into data lumens per hour or data lumens per minute for billing purposes to a client.

In at least one embodiment, an electronic device 30 which may interface with a dongle device 12 may include pre-stored payment or credit card information to provide compensation for communications or data access via pulsed light communications. In addition, the credit or payment authorization may be available for other types of transactions including communications over a cellular network, microwave, satellite or some other type of communication other than, or in addition to, pulsed light communication signals. Meters 620, or metering/timing software may be used to record illumination, and/or communication and/or data usage. In some embodiments, the payment or credit authorization may also include security protocols such as password/login criteria. The security information may be provided orally through voice recognition and in other embodiments through numeric or alphabetical characters.

In at least one embodiment, if a person chooses to take a call originating and/or occurring through the use of LED pulsed light communications, the control server 26 may identify that person for billing purposes. In at least one embodiment, the control server 26 would record the length of time of the communication. The identity of the individual would enable either billing or payment through a credit card authorization. Alternatively, payment information may be requested at the onset of the communication request.

In some embodiments, identification and payment authorization may be pre-established or information may be provided on a use basis.

In some embodiments, information may be retrieved at a facility control unit 18 such as accounts receivable, accounts payable, general ledger, and/or expenses for a desired period of time.

In some embodiments, billing for pulsed light communications would occur in a manner similar to a cellular telephone. In some embodiments, pulsed light communication may be integrated into known communication techniques and pulsed light communications may be piggy backed or integrated into a cellular signal for receipt by an individual on an airplane in transit from one location to another.

In some embodiments, access to a database may be made available to a user on an expense per use basis or other billing increment. Pre-payment authorization may be made through verbal exchange with the LED light fixture or payment authorization may be made simultaneously with the use of the LED pulsed light communication system.

In at least one embodiment, if an authorized user elects to accept a communication through the LED light fixture then the user is identified for billing purposes and prepayment protocols may be initiated or payment options may be accessed in real time. In some embodiments, the duration and usage of the communication is metered for billing purposes. In at least one embodiment, a control server 26 may request a payment password prior to the transfer of a communication to a user.

In at least one embodiment, a payment authorization may be made by a user inserting a dongle device 12 into an electronic device 30 and the user pushing a payment button which will initiate the activation for the LED's on the dongle device 12 to initiate a pulsed light communication containing the payment authorization information. An LED light fixture 10 including the photodetectors receives the pulsed light communication including the payment authorization information, which then proceeds with the completion of the communication.

In some embodiments, the VLEC system enhances cyber security establishing electrical smart grids, which may be based on standard Internet protocol.

In some embodiments, the VLEC system with GPSRS technology may eliminate cyber-security concerns. With GPSRS technology, a VLEC network use is tied to physical locations instead of easily manipulated passwords. Every packet of information sent over a GPSRS enabled infrastructure is tagged with a GPSRS coordinate identified with the communication node (VLEC light fixtures 10 or other GPSRS enabled network device) which may be used to access and support the network. In some embodiments, every packet of information sent over a GPSRS enabled infrastructure may also be tagged with a receipt and/or transmission time stamp by each respective communication node (VLEC light fixtures 10 or other GPSRS enabled network device) which may be used to access and support the network. Data or information to be communicated within the VLEC system will be continually tagged and/or updated with GPSRS identifiers from transmitting and receiving locations within the VLEC system. Only those packets of information tagged with the correct coordinate location (and any intermediate location along with any other necessary passwords or identifying material) have access to the system. As such, an infrastructure control may only allow access from predetermined locations (using a predetermined VLEC light fixture 10 or GPSRS enabled network device) such that the packets of information desiring access are coded with the appropriate GPSRS coordinates. In some embodiments, every VLEC light fixture 10 may be operationally tied to a GPSRS location, and will not communicate if removed from its authorized location and installed elsewhere.

In one embodiment, a location or facility providing internet access, which is concerned about security, may simultaneously provide one or more networks having different levels of security for designated areas within a structure or location, where the networks utilize optical transceivers and visible light communication signals.

For example a provider of internet access at a location may provide any desired number of internet networks, one of which may be identified as a blue network, which is a network utilizing optical transceivers and visible light communication signals. In this example an individual may walk into a public area and access the internet in a manner similar to an individual accessing the internet using a cell phone or other communication device such as a laptop computer or tablet computing device. The individual may access the Internet through the use of the pulsed light or visible light communication signals via an LED light link key 12. The key 12 may be built into a device, or releasably connected to the device.

In at least one embodiment, consider a situation where an individual is in the lunchroom at NASA or another public or private gathering area, and is accessing the internet over a network using an optical transceiver and visible light communication signals. In this example the optical light transceiver will include a light sensor which may have an indicator around the light sensor which may change colors dependent upon the network being accessed by an individual. For example, if a network having a first level of security is designated as the Blue Network then the indicator around the light sensor may be Blue and be observed by individuals located in the NASA lunchroom. The internet signal from the communication device used by the individual will include a signal, code, or communication which is received by the light sensor of the optical transceiver, where the signal, code, or communication will be recognized as having a designated level of security, in turn causing the indicator to emit a visible color representative of the internet network being used and level of security access for the designated area.

In one embodiment, if an area is designated as a general or public security area, and the Blue indicator color is selected for the internet network and security level in this area, then an individual in this area accessing the internet will cause the indicator to emit a Blue light. A second or additional network having a higher security level may be designated by the color Red. An individual located in a public area, such as the lunchroom example as identified above, where the network security is designated for the color Blue, attempting to access a Red or more secure network, will cause the indicator on the transceiver to emit red light, which in turn will provide to individuals and security personnel at least a visual signal that someone is attempting to use a higher security network in an area designated for low security access. This color emission would in turn signal an investigation into an unauthorized network access based on the selected security area.

In some embodiments, a light sensor may be located in a lunchroom as identified above, or adjacent to the optical transceiver, which upon receipt of a signal would initiate an indicator to glow blue, so that anyone looking at the indicator would know that the network, internet access, or communication was occurring over the blue network. In some embodiments a blue network may be designated as a network for a guest or visitor.

In some embodiments, the indicator which may be a ring around an LED, photodetector, on a dongle device 12, or LED light fixture 10 which may emit observable light of different colors. If someone came in to the NASA conference room or lunchroom, sat down, and then started to work on an unauthorized network, which might be a network having top secret security clearance, (Red network) then individuals present in the area designated as a network for a guest or a visitor (Blue area) would be able to identify access to an incorrect network.

The recognition of the appropriate network security and the control of the indicator may be accomplished through the use of software, hardware or a combination of software and hardware which may be integral to or separated from an optical transceiver. An optical receiver including the appropriate network recognition function may be referred to as a Charlie Unit 16. The Charlie Unit 16 used to visually indicate what network is being utilized, may be an annunciator or signal to visually communicate attempts to gain unauthorized access to secure networks from designated low security areas. If an individual were to access a Wi-Fi network and then try to break into a more secure network, then no one would be able to identify this attempt.

To accomplish the provision of separate networks, a managed switch may be utilized behind or upstream from an optical transceiver so the pulsed light communication signal then becomes the link, almost similar to a wire and Jack on the wall. In this situation an area would not utilize different jacks for every different network. Through the use of optical transceivers and through the use of one or more managed switches, only one device may be required to provide access to multiple different networks having alternative security clearances. In at least one embodiment the managed switches are capable of software switching to different networks, which in turn provides access to different levels of security.

In at least one embodiment, access to different levels having different security authorizations may occur through the use of identifiers such as a Mac code for a device. When an individual has possession of a designated client access device, which may be plugged into a computer or other electronic communication device, the designated client access device may light up and provide a pulsed LED light communication signal. In at least one embodiment the a unique Mac or other code may be recognized by the managed switch, and infrastructure behind the managed switch, to determine whether or not an individual is authorized to communicate with one or more networks or networks having different security authorization parameters.

In at least one embodiment, the Charlie Unit 16 may provide varied pulses which may be identified as sync pulses or synchronization pulses. The sync pulses retain data so that a processor integral to, or separated from, an optical transceiver may recognize and discern the data and/or the sync pulses.

In at least one embodiment the utilization of synchronization pulses may be readily recognized by the managed switch and/or processor integral or removed from an optical transceiver to either permit or restrict access to a particular network functioning in a manner similar to a master key system for a building. In some embodiments, sync pulses function as certain keys and provide access or authorization to certain networks or doors while some keys may only open a single network or door. In at least one embodiment access into a network may be regulated by a managed switch, synchronization pulses and/or from a hardware standpoint.

In some embodiments, the designated client access device may include any type of identification or authorization code similar to a PC or a Mac address which would function as a different set of signaling. The identification or authorization code used during optical communications would be unique, so that access and/or a transmission based upon an identification or authorization code for a RED network would be gibberish and unrecognizable for a GREEN network. In at least one alternative embodiment access into different network environments would be regulated by a hardware key as compared to an identification or authorization code. In at least one alternative embodiment, access into different network environments would be regulated by a combination of software incorporated into a managed switch and a hardware key. In at least one embodiment it would not be possible to access a particular network with an incorrect pulse identification which would physically prevent access to a restricted network. In at least one embodiment for the master key, one or more branches or sub keys may be available such as key "A" may have branches such as AB, AA, AC, AD, AE and underneath branches additional sub-branches may be available, so one pulse may provide authorization and/or access into one network or area, another modulation for the pulse, the timing of the pulse, or sync of the pulse may provide authorization and/or access to other networks.

Managed switches 624 as used with the power units 22 and/or the power unit controllers 28 may be available from Cisco and may vary significantly in price. Managed switches 624 may also vary in speed and flexibility for the isolation of signals between networks to prevent jumping from one network to another network in violation of security protocols.

In at least one embodiment the light as generated from an optical transceiver may be used as a portal for access to a managed switch 624, which in turn provides access to a designated network.

In at least one embodiment, independent variable features may be incorporated into the managed switch 624 for access to independent networks, which may also include variable capability for the timing pulses and/or sync pulses. Variations utilized in association with the timing pulses and/or sync pulses may include but are not necessarily limited to variations which are similar to AM or FM modulation communication schemes. In some embodiments the timing pulses and/or sync pulses may be, or may include, digital encryption methods or techniques. It should be noted that the types of variations to be utilized in association with the timing pulses and/or sync pulses is not restricted to the types identified herein and may include other types or variations to accomplish the desired data or other communication transfer occurring through pulsed light communications as embedded within illumination provided to a user.

In at least one embodiment the above features accomplish network differentiation or access differentiation for an individual using a network. In at least one embodiment, an individual obtains access to a network by passing a first hardware door, then the individual may obtain access to the managed switch 624 and/or the software doors prior to connection to a desired network.

In at least one embodiment, a more proficient network switch, acting as a managed switch 624, provides higher security between different networks. In at least one embodiment, a hardware door is provided in addition to a software door prior to access to a desired network thereby improving the overall security for network usage.

If the duty cycle for the LED light devices is discontinued then the LED light emitting diodes terminate communication of pulsed light signals. Varying the voltage and maintaining a duty cycle provides continuous communication of pulsed light signals.

In at least one embodiment, the voltage provided to the LED light sources is varied and not terminated or interrupted to enable continuous and uninterrupted pulsed light communication without losing data packets, or attempting to pick up dropped communication data packets. Pulsed light communication signals are provided through a variable cycle to eliminate the necessity for digital potentiometers and extra circuitry.

The control of the diode intensity by varying the pulse width duty cycle of operation does not sacrifice communication.

In some embodiments, the duty cycle for the LED light sources is varied but is not terminated. In some embodiments, having a duty cycle where power is periodically terminated to an LED light source breaks the continuous chain and flow of a communication causing pulsed light communications to fill memory for a device while waiting for power to be returned to the LED's and for communication to resume. Because of the frequency of the flashes, continuous communication is not optimized if electricity is periodically terminated to the LED's. Continuous communication in some embodiments may be provided by adjusting the electricity provided to the LED light sources, where electricity is continuous, yet the amount of electricity is pulsed, (variable duty cycle) which does not interrupt a pulsed light communication signal.

In some embodiments, the voltage provided to the LED's is varied to provide a continuous LED pulsed light communication signal. This embodiment eliminates the necessity to pick up information packets which were dropped during electrical interruption. In some embodiments, the use of a variable cycle to dim LED's eliminates the need for digital potentiometers and extra circuitry.

One problem associated with embedded pulsed light communication is related to the reduced intensity of the LEDs during a known duty cycle which interferes with the communication signal. The present invention, in at least one embodiment, provides pulsed embedded light communication without interfering with the communication signal by varying the duty cycle of the pulse wave form, which deviates from the duty cycle traditionally provided to the LEDs.

In the past, the duty cycle exposed to LEDs did not permit constant and continuous communication. In the past, the variation of the known duty cycles caused complications and a slow down of pulsed light communications, and in certain instances actually stopped the communication. During operation of some LEDs, the termination of power to the LED's caused interruptions in the embedded pulsed light communication signals reducing the value and efficiency of pulsed light communication.

In at least one embodiment, the invention varies the voltage to the LEDs using injector circuits having variable voltage control circuits and/or variable power supply or miniature variable power supplies. In at least one embodiment, the use of variable injector circuits having variable voltage control and/or power supply (which may be miniature) maintains the efficiencies and running the LEDs to improve the performance, quality, and operation of embedded pulsed light communication signals. In at least one embodiment, the variable voltage as provided to the LEDs maximizes the efficiencies and transmission of embedded pulsed light communication's while simultaneously providing a desired output of illumination. In at least one embodiment the use of variable voltage as provided to the LEDs provides or enables the embedded communication pulses to have total exclusivity to any variation in pulses. In some embodiments, power may be provided to the LED's over the Ethernet.

In some embodiments where there is fixed voltages, improved performance may be provided through the use of variable voltages which mostly aid in communication, but also aid in efficiencies and the intensity of the light. In some embodiments variable voltages may occur over two channels over an Ethernet, so that control of the color may occur, thereby reducing the more yellow light and increasing the more white light or cool light. Warm light may also be referred to as hot and cool light may be referred to as cold. In certain embodiments it is desirable to reduce the provision of hot light, the cold light and both hot and cold light. It is desirable to not terminate or to turn the duty cycle off, so that a pulsed LED light generated communication signal may continue to be sufficiently strong, so that the signal may continue to communicate. In the past the known duty cycle terminated power at regular intervals which in turn increased the difficulty to maintain continuous communications while simultaneously providing a perceived reduction in light emission or illumination. The provision of reduced and/or terminated pulsed light duty cycles increased the difficulty to communicate and/or slowed down the pulsed LED light communications.

Normally a duty cycles operates by providing LED's within an LED light fixture 10 a standard communication comprising a data pulse train driving the current into the LEDs. The light output from the LEDs is modulated based on that data pulse train provided to the LEDs. In the past, the LED lights were dimmed in order to embed another train of pulses inside the data pulse train, so that a blanking out of the whole system occurs, to shut the lights off completely at regular intervals. When the lights are on at regular intervals then data continues to be emitted from the lights. However, when the lights are off completely at regular intervals then no data is being transmitted through the standard dimming approach. This effect is equally applicable to color changing with respect to dim to cool, dim to warm, or with respect to any desired variation in color which would occur along with the desired level of dimming of the lights.

Instead of embedding an on/off blanking signal procedure in order to dim the lights, in one embodiment the lights are on at all times so the data is moving all the time. In order to transmit pulsed light communication signals as embedded within the light, in one embodiment, a lower total current as compared to the average current is provided to the to the LEDs. By lowering the voltage and giving a continuous light emission or illumination, a constant capability is provided to send data pulse trains. This embodiment does not sacrifice what could be 50% of the communication capability of a traditional pulse train. The continuous provision of at least some current to the LED's does not result in a sacrifice of band width. In at least one embodiment where continuous current is provided the band width is not sacrificed because the LED's are not being turned on and off and the ability to provide a continuous transmission of embedded data communication is maintained because the pulsed light is not modulated in and on/off manner.

FIGS. 29 through _ represent a number of duty cycle graphs. In at least one embodiment during a period of time where the current is applied to the LED's to provide illumination, variations may be provided to the current to create a data pulse stream. In the past the current is either on or off providing a data pulse stream and a duty cycle which is on or off giving the perception to the human eye that the light is less intense because it is turning on and off very rapidly. In this instance a human eye starts to see less photons and believes that that light is dimming. During the duty cycle when the current is off and the pulse width is at zero, there is no light, and it is dimming the total illumination observed, which simultaneously prevents data communications during the periods of time when the current is zero, which in turn prevents/reduces the available time for transmission of communication data lowering band width.

When the light is turned back on and the human eye starts perceiving illumination which in turn enables data to be turned back on and included in the illumination. The duty cycle as known is in a repetitive sequence of on/off, on/off, repeating.

In the traditional duty cycle data may only be transmitted within illumination pulses when current is being provided to the LEDs. There is no light between pulses so there is no ability to carry data when your carrier is off, which reduces your ability to carry data.

In at least one embodiment the voltage provided to the LED's is varied. However, the voltage is always on, and no period of time is provided in which the duty cycle or the voltage is off. As a result, data may then be embedded into a continuous or constant data stream providing a 100% band width carrier. In at least one embodiment the provision of variable and continuous voltage provides higher band width.

In some embodiments the provision of continuous and variable voltage provides a smoother illumination dimming capability. In at least one embodiment the LEDs operate at higher efficiency. In the traditional model an increase in the duration of off time provides less light accomplishing dimming of the illumination source. In at least one embodiment, the LEDs of the present invention are not off, and dimming occurs by a reduction in the current or voltage applied to the LEDs thereby reducing illumination and accomplishing dimming without terminating power to the LEDs.

In certain embodiments if the number of LEDs utilized on an LED light fixture 10 is increased, then the available LED diodes may be operated at a lower intensity. Due to the increased number of available LEDs in the LED light fixture 10 the overall desired light output is maintained. The running of an increased number of LEDs at a lower intensity increases the efficiency of the LEDs significantly. In at least one embodiment the height or amount of voltage applied to the LEDs may be varied to provide a more efficient running of the diodes which results in the efficient operation of the LEDs and the provision of a desired level of illumination.

In at least one embodiment illumination is provided as a service, namely as a vehicle for data communication, as opposed to the provision exclusively of illumination. In this embodiment the use of an increased number of LED light emitting diodes or units is desirable to maximize the provision of the services for data communication as well as illumination for a designated area.

In some embodiments, the use of a variable power supply, enables the use of two set of diodes independently. For example, channel "A" runs the warm set of diodes, and channel "B" runs the cold diodes. The hot and cold channels may then have separate voltage controls identified as injectors which may be synonymous with a variable power supply. In at least one embodiment current is injected into the LED's and different current injectors are utilized for different channels.

In a first embodiment a light emitting diode light assembly and system provides pulsed light communications and/or illumination, the system comprising:

A plurality of light emitting diode light fixtures, each of the light emitting diode light fixtures comprising a plurality of light emitting diodes;

At least one power unit in electrical communication with the plurality of light emitting diode light fixtures; and A control server in electrical communication with the at least one power unit, the control server comprising a processor, memory and website, the website comprising an interface, the interface being constructed and arranged to issue commands to the at least one power unit to regulate illumination or pulsed light communications emitted from the plurality of light emitting diodes.

In at least one second embodiment in accordance with the first embodiment, each of the light emitting diode light fixtures comprises at least one photodetector and a control unit in electrical communication with the at least one photodetector and the plurality of light emitting diodes, the at least one photodetector being constructed and arranged to receive a pulsed light signal, the control unit being constructed and arranged to communicate the received pulsed light signal to the control server.

In at least one third embodiment in accordance with the second embodiment, the control server is in further electrical communication with the plurality of light emitting diode light fixtures.

In at least one fourth embodiment in accordance with the third embodiment, the interface is constructed and arranged to issue commands to the plurality of light emitting diode light fixtures.

In at least one fifth embodiment according to the fourth embodiment, the system further comprises at least one sensor in electrical communication with at least one of the plurality of light emitting diode light fixtures, the sensor communicating the status of at least one of the plurality of light emitting diodes to the control unit or the control server.

In at least one sixth embodiment according to the fifth embodiment, the at least one sensor communicates the status of at least one of the plurality of light emitting diode light fixtures to the control unit or the control server.

In at least one seventh embodiment according to the sixth embodiment, the at least one sensor monitors electricity provided to at least one of the plurality of light emitting diode light fixtures or at least one of the plurality of light emitting diodes.

In at least one eight embodiment according to the sixth embodiment, the interface comprises a touchscreen, the touchscreen being constructed and arranged to change at least one of a status, intensity, color, timing and schedule, for illumination or pulsed light communications emitted from at least one of the light emitting diodes.

In at least one ninth embodiment according to the sixth embodiment, the system further comprises at least one switch in electrical communication with at least one of the control server, the control unit, the power unit, at least one of the light emitting diode light fixtures, and at least one of the plurality of light emitting diodes.

In at least one tenth embodiment according to the sixth embodiment, each of the plurality of light emitting diode light fixtures comprises a unique identifier.

In at least one eleventh embodiment according to the tenth embodiment, each of the power units comprises a unique identifier.

In at least one twelfth embodiment according to the eleventh embodiment, each of the control units comprises a unique identifier.

In at least one thirteenth embodiment according to the twelfth embodiment, the unique identifier for at least one of the light emitting diode light fixtures, the power unit, and the control unit is incorporated into a data packet, the data packet being embedded within the pulsed light communication.

In at least one fourteenth embodiment according to the sixth embodiment, the system further comprises a facility control unit in electrical communication with and disposed between the plurality of light emitting diode light fixtures and the control server.

In at least one fifteenth embodiment according to the seventh embodiment, the interface is constructed and arranged to change at least two of the status, intensity, color, timing and schedule, in any combination, for illumination or pulsed light communications emitted from at least one of the light emitting diodes.

In at least one sixteenth embodiment a light emitting diode light assembly and system provides pulsed light communications and/or illumination, the system comprising:

a plurality of light emitting diode light fixtures, each of the light emitting diode light fixtures comprising a plurality of light emitting diodes;

at least one power unit in electrical communication with the plurality of light emitting diode light fixtures; and a control server in electric communication with the plurality of light emitting diode light fixtures, the control server comprising a processor, memory and a website, the website comprising an interface, the interface being constructed and arranged to issue commands to the plurality of light emitting diode light fixtures to regulate illumination or pulsed light communications emitted from the plurality of light emitting diodes.

In a seventeenth embodiment, a light emitting diode light assembly and system provides pulsed light communications and/or illumination, the system comprising:

a plurality of light emitting diode light fixtures, each of the light emitting diode light fixtures comprising a plurality of light emitting diodes;

at least one power unit in electrical communication with the plurality of light emitting diode light fixtures; and a control server in electric communication with the at least one power unit and the plurality of light emitting diode light fixtures, the control server comprising a processor, memory and a website, the website comprising an interface, the interface being constructed and arranged to issue commands to the at least one power unit or the plurality of light emitting diode light fixtures to regulate illumination or pulsed light communications emitted from the plurality of light emitting diodes.

Incorporated by reference herein in their entireties are the following U.S. patent application Nos.: 13/706,864; 14/557,705; 14/546,223; 14/546,218; 14/537,470; 14/290,152; 14/288,917; 14/270,670; 14/227,375; 14/208,129; 14/208,125; 14/208,103; 14/208,090; 14/207,955; 14/207,934; 14/050,759; 14/050,765; 61/927,663; 61/927,638; and U.S. Pat. Nos. 6,879,263; 7,046,160; 7,439,847; 7,902,978; 8,188,861; 8,188,878; 8,188,879; 8,330,599; 8,331,790; 8,542,096; 8,543,505; 8,571,411; 8,593,299; 8,687,965; 8,744,267; 8,751,390; 8,886,045; 8,890,655; 8,890,773; and 8,902,076.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

I claim:

1. A light emitting diode light assembly and system providing pulsed light communications and/or illumination, the system comprising:
   a. a plurality of light emitting diode light fixtures, each of said light emitting diode light fixtures comprising a plurality of light emitting diodes, at least one photodetector and at least one control unit, said plurality of light emitting diodes generating light as illumination, said at least one control unit being in communication with said plurality of light emitting diodes and said at least one photodetector, said at least one control unit being constructed and arranged for transmission of at least one transmitted communication signal, and said at least one photodetector being constructed and arranged for receipt of at least one received communication signal, said at least one transmitted communication signal being embedded within said illumination, each of said at least one transmitted communication signal and said at least one received communication signal comprising a plurality of rapid flashes of light, said rapid flashes of light having a frequency which is not observable to an individual, wherein said rapid flashes of light are configured for transmission of information or data;
   b. at least one power unit in electrical communication with said plurality of light emitting diode light fixtures; and
   c. a control server in electric communication with said plurality of light emitting diode light fixtures, said control server comprising a processor, memory and a website, said website comprising an interface, said interface being constructed and arranged to issue commands to said at least one control unit to regulate illumination or pulsed light communications emitted from said plurality of light emitting diodes.

2. A light emitting diode light assembly and system providing pulsed light communications and/or illumination, the system comprising:
   a. a plurality of light emitting diode light fixtures, each of said light emitting diode light fixtures comprising a plurality of light emitting diodes, at least one photodetector and at least one control unit, said plurality of light emitting diodes generating light as illumination, said at least one control unit being in communication with said plurality of light emitting diodes and said at least one photodetector, said at least one control unit being constructed and arranged for transmission of at least one transmitted communication signal, and said at least one photodetector being constructed and arranged for receipt of at least one received communication signal, said at least one transmitted communication signal being embedded within said illumination, each of said at least one transmitted communication signal and said at least one received communication signal comprising a plurality of rapid flashes of light, said rapid flashes of light having a frequency which is not observable to an individual, wherein said rapid flashes of light are configured for transmission of information or data;
   b. at least one power unit in electrical communication with said plurality of light emitting diode light fixtures; and
   c. a control server in electric communication with said at least one power unit and said plurality of light emitting diode light fixtures, said control server comprising a processor, memory and a website, said website comprising an interface, said interface being constructed and arranged to issue commands to at least one of said at least one power unit, said at least one control unit, and said plurality of light emitting diode light fixtures to regulate illumination or pulsed light communications emitted from said plurality of light emitting diodes.

3. A light emitting diode light assembly and system providing pulsed light communications and/or illumination, the system comprising:
   a. a plurality of light emitting diode light fixtures, each of said light emitting diode light fixtures comprising a plurality of light emitting diodes, at least one photodetector and at least one control unit in electrical communication with said at least one photodetector and said plurality of light emitting diodes;
   b. at least one power unit in electrical communication with said plurality of light emitting diode light fixtures; and
   c. a control server in electrical communication with said at least one power unit, said control server comprising a processor, memory and website, said website comprising an interface, said interface being constructed and arranged to issue commands to said at least one power unit to regulate illumination or pulsed light communications emitted from said plurality of light emitting diodes wherein said at least one photodetector is constructed and arranged to receive a pulsed light signal, and said at least one control unit is constructed and arranged to communicate said received pulsed light signal to said control server.

4. The system according to claim 3, further comprising at least one sensor in electrical communication with at least one of said plurality of light emitting diode light fixtures, said sensor communicating the status of at least one of said plurality of light emitting diodes to said at least one control unit or said control server.

5. The system according to claim 4, wherein said at least one sensor monitors electricity provided to at least one of said plurality of light emitting diode light fixtures or at least one of said plurality of light emitting diodes.

6. The system according to claim 5, said interface being constructed and arranged to change at least two of said status, intensity, color, timing and schedule, in any combination, for illumination or pulsed light communications emitted from at least one of said light emitting diodes.

7. The system according to claim 4, said interface comprising a touchscreen, said touchscreen being constructed and arranged to change at least one of a status, intensity, color, timing and schedule, for illumination or pulsed light communications emitted from at least one of said light emitting diodes.

8. The system according to claim 4, further comprising at least one switch in electrical communication with at least one of said control server, said at least one control unit, said power unit, at least one of said light emitting diode light fixtures, and at least one of said plurality of light emitting diodes.

9. The system according to claim 4, each of said plurality of light emitting diode light fixtures comprising a unique identifier.

10. The system according to claim 9, each of said power units comprising a unique identifier.

11. The system according to claim 10, each of said at least one control units comprising a unique identifier.

12. The system according to claim 11, wherein said unique identifier for at least one of said light emitting diode light fixtures, said power unit, and said at least one control unit is incorporated into a data packet, said data packet being embedded within said pulsed light communication.

13. The system according to claim 4, further comprising a facility control unit in electrical communication with and disposed between said plurality of light emitting diode light fixtures and said control server.

14. A light emitting diode light assembly and system providing pulsed light communications and/or illumination, the system comprising:
- a. a plurality of light emitting diode light fixtures, each of said light emitting diode light fixtures comprising a plurality of light emitting diodes, at least one photodetector and at least one control unit in electrical communication with said at least one photodetector and said plurality of light emitting diodes;
- b. at least one power unit in electrical communication with said plurality of light emitting diode light fixtures; and
- c. a control server in electrical communication with said at least one control unit, said control server comprising a processor, memory and website, said website comprising an interface, said interface being constructed and arranged to issue commands to regulate illumination or pulsed light communications emitted from said plurality of light emitting diodes, wherein said at least one photodetector is constructed and arranged to receive a pulsed light signal, and said at least one control unit is constructed and arranged to communicate said received pulsed light signal to said control server.

* * * * *